United States Patent
Brown et al.

(10) Patent No.: US 11,071,293 B2
(45) Date of Patent: Jul. 27, 2021

(54) NOZZLES WITH INTERCHANGEABLE INSERTS FOR PRECISION APPLICATION OF CROP PROTECTANT

(71) Applicant: Blue River Technology Inc., Sunnyvale, CA (US)

(72) Inventors: Thomas Welch Brown, Santa Clara, CA (US); Eric M. Gawehn, Mountain View, CA (US)

(73) Assignee: BLUE RIVER TECHNOLOGY INC., Sunnyvale, CA (US)

( * ) Notice: Subject to any disclaimer, the term of this patent is extended or adjusted under 35 U.S.C. 154(b) by 171 days.

(21) Appl. No.: 16/154,578

(22) Filed: Oct. 8, 2018

(65) Prior Publication Data
US 2020/0107537 A1    Apr. 9, 2020

(51) Int. Cl.
| | |
|---|---|
| A01M 7/00 | (2006.01) |
| A01G 7/06 | (2006.01) |
| B05B 12/04 | (2006.01) |
| B05B 13/02 | (2006.01) |

(52) U.S. Cl.
CPC .............. *A01M 7/006* (2013.01); *A01G 7/06* (2013.01); *A01M 7/00* (2013.01); *A01M 7/0089* (2013.01); *B05B 12/04* (2013.01); *B05B 13/0278* (2013.01)

(58) Field of Classification Search
CPC ...... A01M 7/006; A01M 7/0089; A01M 7/00; B05B 12/04; B05B 13/0278; A01G 7/06
USPC ....... 239/159, 163, 172, 722, 390, 391, 396, 239/428.5, 553, 3, 590, 590.3, 600
See application file for complete search history.

(56) References Cited

U.S. PATENT DOCUMENTS

| | | | |
|---|---|---|---|
| 5,176,322 A | 1/1993 | Sartor | |
| 6,276,617 B1 * | 8/2001 | Lenhardt | A01G 25/16 239/590 |
| 7,357,337 B2 * | 4/2008 | Ferrari | E03C 1/08 239/428.5 |
| 8,191,795 B2 * | 6/2012 | Grimm | A01M 7/0089 239/551 |
| 8,851,403 B2 * | 10/2014 | Thomas | B05B 1/02 239/428.5 |

(Continued)

FOREIGN PATENT DOCUMENTS

| | | |
|---|---|---|
| EP | 0 326 045 A2 | 8/1989 |
| WO | WO 2015/013723 A2 | 1/2015 |

OTHER PUBLICATIONS

European Patent Office, Extended European Search Report and Opinion, EP Patent Application No. 19202116.0, dated Feb. 6, 2020, eight pages.

*Primary Examiner* — Steven J Ganey
(74) *Attorney, Agent, or Firm* — Fenwick & West LLP

(57) ABSTRACT

A treatment system for spraying treatment fluid onto plants in a field is described. The treatment system includes a configurable treatment mechanism including an array of nozzles and valve assemblies coupled into manifolds, and manifold assemblies. The nozzle comprises a nozzle housing and an insert assembly contained within the nozzle housing. When coupled, a top casing including a fluid inlet and a bottom casing including at least one fluid outlet form the nozzle housing. The insert assembly comprises at least one nozzle insert to fluidically couple the fluid inlet and the fluid outlets such that fluid entering from the fluid inlet exits the nozzle housing through the fluid outlets.

27 Claims, 35 Drawing Sheets

(56) References Cited

U.S. PATENT DOCUMENTS

| | | | |
|---|---|---|---|
| 8,919,680 B2 * | 12/2014 | Grether | E03C 1/084 239/428.5 |
| 9,492,055 B2 | 11/2016 | Feddema | |
| 2003/0019949 A1 | 1/2003 | Solie et al. | |
| 2003/0234301 A1 * | 12/2003 | Swan | B05B 7/0425 239/428.5 |
| 2016/0165875 A1 | 6/2016 | Kubacak | |
| 2018/0243771 A1 | 8/2018 | Davis et al. | |

* cited by examiner

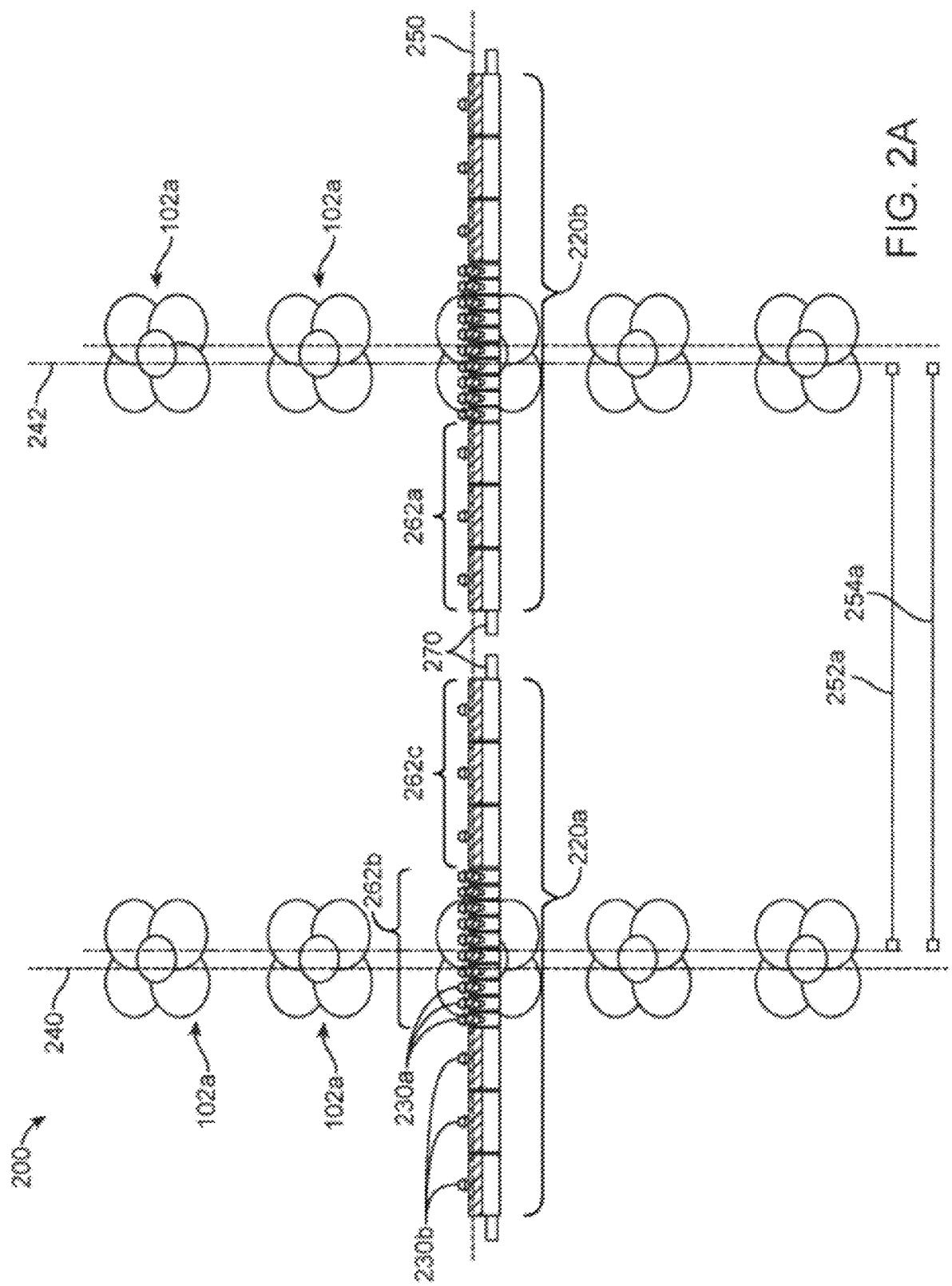

Bolted Nozzle 1600

NOZZLES WITH INTERCHANGEABLE INSERTS FOR PRECISION APPLICATION OF CROP PROTECTANT

BACKGROUND

Field of Disclosure

This application relates to a system for applying treatment fluid to plants in a field, and more specifically to nozzle structures for dispensing treatment fluid.

Description of the Related Art

Current methods of spraying crop protectant on a post-emergent crop typically fall in two categories: a total field broadcast sprayer, or a hooded broadcast sprayer. A total field broadcast sprayer indiscriminately applies treatment fluid to crops in a field, while the hooded broadcast sprayer introduces components to limit the ability of the treatment fluid to affect crops in adjacent fields. The resolution of these sprayers is minimal, with the broadcast sprayers generally applied on a field level.

There are a few broadcast sprayers that limit the amount of spray applied to a field by applying color recognition software to a camera coupled to the detect the presence of 'green' to indicate plants to spray. To date there is no solution for sprayers to apply treatments to targeted areas in a more specific way than 'green/not green,' nor is there a way to apply treatment to plants in rows having varying crop row widths with minimal overspray, and further no way to accomplish variable spray patterns.

SUMMARY

Described is a nozzle for dispensing a treatment fluid to one or more plants in a field. The nozzles each include a top casing and a bottom casing removably coupled to form a nozzle housing. The top casing includes a fluid inlet through which treatment fluid can enter the nozzle housing and the bottom casing includes at least one insert opening through which treatment fluid can exit the nozzle housing. The length of the bottom casing of the nozzle housing can vary and resultantly the number of insert openings included in the bottom casing can vary as well. Accordingly, the nozzle can be any number of sizes.

An insert assembly is positioned within a fill cavity created by the coupled bottom casing and top casing. The insert assembly includes at least one nozzle insert that fluidically couples the fluid inlet and the insert opening. Treatment fluid enters the nozzle via the fluid inlet, passes through the nozzle insert towards the insert opening, and exits the nozzle towards the field through the nozzle outlet. The size of the insert assembly can be based on the size of the nozzle and the number of insert openings. The structure of the insert assembly affects characteristics of the treatment fluid when exiting the nozzle. The characteristics can include the spray pattern, droplet size, and the flow rate.

The fluid inlet of each nozzle is coupled to a valve assembly controlling the volume of treatment fluid entering the fluid inlet and a manifold assembly to position the nozzle above plants as the machine travels through the field. Multiple nozzles including any number of nozzle inserts may be simultaneously coupled to a single manifold assembly to expand the range of the treatment fluid being sprayed over the field. Nozzles can be coupled to a manifold assembly that rotates to adjust the angle of the treatment fluid as it exits the nozzle such that the machine more effectively dispenses treatment fluid to plants of different heights as it passes through the field.

BRIEF DESCRIPTION OF DRAWINGS

Figure (FIG. 1A is a side view illustration of a system for applying a treatment fluid to plants in a field, according to one embodiment.

FIG. 2A illustrates a tube manifold assembly, in one example embodiment.

The figures depict embodiments for purposes of illustration only. One skilled in the art will readily recognize from the following description that alternative embodiments of the structures and methods illustrated herein may be employed without departing from the principles of the invention described herein.

DETAILED DESCRIPTION

I. Plant Treatment System

Figure 1A:
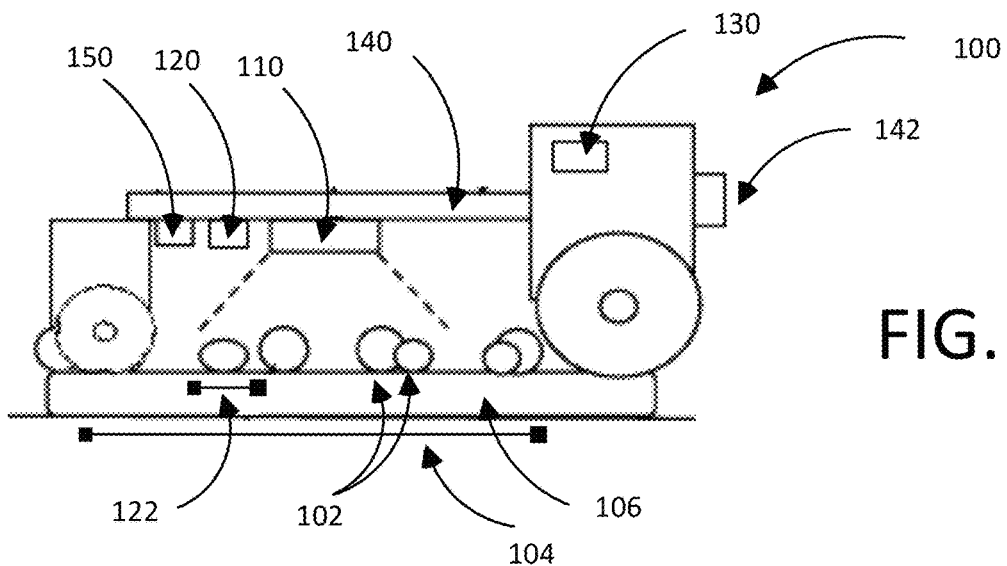
FIG. 1B is a front view illustration of a system for applying a treatment fluid to plants in a field, according to one embodiment.
FIG. 1C is an illustration of the fluidic components and couplings of the system, according to one example embodiment.
FIG. 1D is an illustration of the fluidic components and coupling of the system including front and back pressure regulators, according to one example embodiment.
Figure 1B:
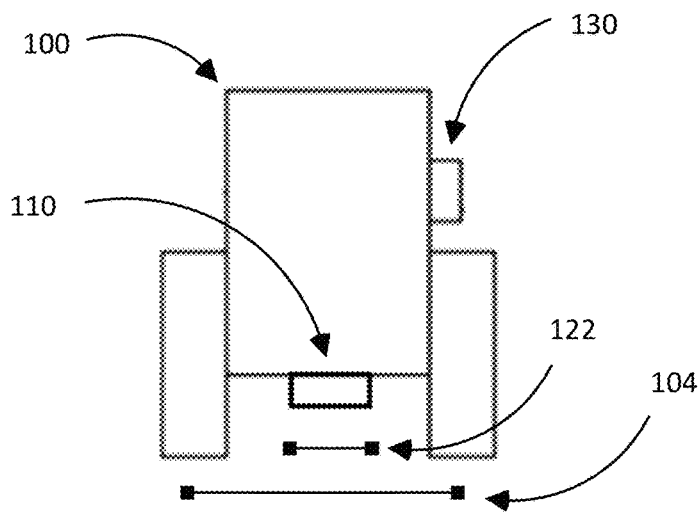

FIG. 1A is a side view illustration of a system for applying a treatment fluid to plants in a field and FIG. 1B is a front view illustration of the same system. The system 100 for plant treatment includes a detection mechanism 110, a treatment mechanism 120, and a control system 130. The system 100 can additionally include a mounting mechanism 140, a verification mechanism 150, a power source, digital memory, communication apparatus, or any other suitable component.

The system 100 functions to apply a treatment to one or multiple plants 102 within a geographic area 104. Often, treatments function to regulate plant growth. The treatment is directly applied to a single plant 102 (e.g., hygroscopic material), but can alternatively be directly applied to multiple plants, indirectly applied to one or more plants, applied to the environment associated with the plant (e.g., soil, atmosphere, or other suitable portion of the plant environment adjacent to or connected by an environmental factor, such as wind), or otherwise applied to the plants. Treatments that can be applied include necrosing the plant, necrosing a portion of the plant (e.g., pruning), regulating plant growth, or any other suitable plant treatment. Necrosing the plant can include dislodging the plant from the supporting substrate 106, incinerating a portion of the plant, applying a treatment concentration of working fluid (e.g., fertilizer, hormone, water, etc.) to the plant, or treating the plant in any other suitable manner. Regulating plant 102 growth can include promoting plant growth, promoting growth of a plant portion, hindering (e.g., retarding) plant or plant portion growth, or otherwise controlling plant growth. Examples of regulating plant 102 growth includes applying growth hormone to the plant, applying fertilizer to the plant or substrate 106, applying a disease treatment or insect treatment to the plant, electrically stimulating the plant, watering the plant, pruning the plant, or otherwise treating the plant. Plant growth can additionally be regulated by pruning, necrosing, or otherwise treating the plants adjacent the plant.

The plants 102 can be crops, but can alternatively be weeds or any other suitable plant. The crop may be cotton, but can alternatively be lettuce, soy beans, rice, carrots, tomatoes, corn, broccoli, cabbage, potatoes, wheat or any other suitable commercial crop. The plant field in which the system is used is an outdoor plant field, but can alternatively be plants within a greenhouse, a laboratory, a grow house, a set of containers, a machine, or any other suitable environment. The plants are grown in one or more plant rows (e.g., plant beds), wherein the plant rows are parallel, but can alternatively be grown in a set of plant pots, wherein the plant pots can be ordered into rows or matrices or be randomly distributed, or be grown in any other suitable configuration. The crop rows are generally spaced between 2 inches and 45 inches apart (e.g. as determined from the longitudinal row axis), but can alternatively be spaced any suitable distance apart, or have variable spacing between multiple rows.

The plants 102 within each plant field, plant row, or plant field subdivision generally includes the same type of crop (e.g. same genus, same species, etc.), but can alternatively include multiple crops (e.g., a first and a second crop), both of which are to be treated. Each plant 102 can include a stem, arranged superior (e.g., above) the substrate 106, which supports the branches, leaves, and fruits of the plant. Each plant can additionally include a root system joined to the stem, located inferior the substrate plane (e.g., below ground), that supports the plant position and absorbs nutrients and water from the substrate 106. The plant can be a vascular plant, non-vascular plant, ligneous plant, herbaceous plant, or be any suitable type of plant. The plant can have a single stem, multiple stems, or any number of stems. The plant can have a tap root system or a fibrous root system. The substrate 106 is soil, but can alternatively be a sponge or any other suitable substrate.

The treatment mechanism 120 of the system 100 functions to apply a treatment to the identified plant 102. The treatment mechanism 120 includes an active area 122 to which the treatment mechanism 120 applies the treatment. The effect of the treatment can include plant necrosis, plant growth stimulation, plant portion necrosis or removal, plant portion growth stimulation, or any other suitable treatment effect. The treatment can include plant 102 dislodgement from the substrate 106, severing the plant (e.g., cutting), plant incineration, electrical stimulation of the plant, fertilizer or growth hormone application to the plant, watering the plant, light or other radiation application to the plant, injecting one or more working fluids into the substrate 106 adjacent the plant (e.g., within a threshold distance from the plant), or otherwise treating the plant. The treatment mechanism 120 is operable between a standby mode, wherein the treatment mechanism 120 does not apply a treatment, and a treatment mode, wherein the treatment mechanism 120 is controlled by the control system 130 to apply the treatment. However, the treatment mechanism 120 can be operable in any other suitable number of operation modes.

The system 100 can include a single treatment mechanism 120, or can include multiple treatment mechanisms. The multiple treatment mechanisms can be the same type of treatment mechanism, or be different types of treatment mechanisms. The treatment mechanism 120 can be fixed (e.g., statically coupled) to the mounting mechanism 140 or relative to the detection mechanism 110, or actuate relative to the mounting mechanism 140 or detection mechanism 110. For example, the treatment mechanism 120 can rotate or translate relative to the detection mechanism 110 and/or mounting mechanism 140. In one variation, the system 100 includes an assembly of treatment mechanisms, wherein a treatment mechanism 120 (or subcomponent of the treatment mechanism 120) of the assembly is selected to apply the treatment to the identified plant 120 or portion of a plant in response to identification of the plant and the plant position relative to the assembly. In a second variation, the system 100 includes a single treatment mechanism, wherein the treatment mechanism is actuated or the system 100 moved to align the treatment mechanism 120 active area 122 with the targeted plant 102. In a third variation, the system 100 includes an array of treatment mechanisms 120, wherein the treatment mechanisms 120 are actuated or the system 100 is moved to align the treatment mechanism 120 active areas 122 with the targeted plant 102 or plant segment.

Figure 1C:
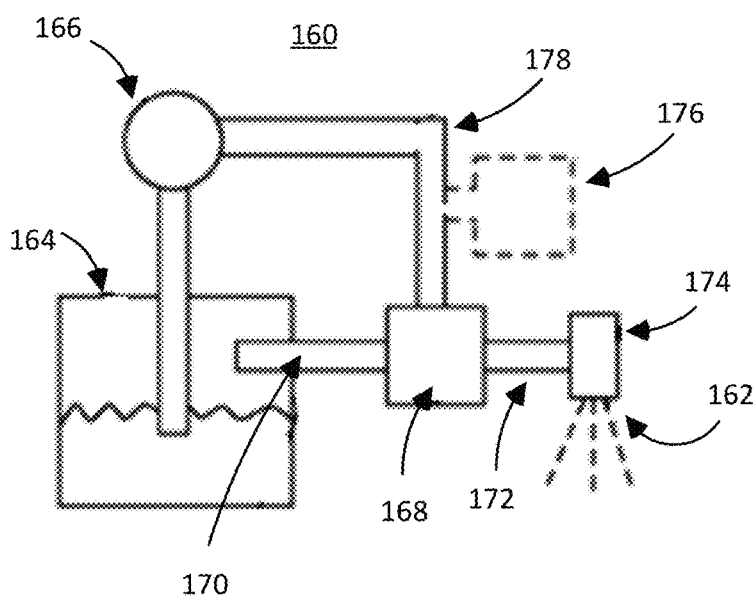

In one configuration, as shown in FIG. 1C, the treatment mechanism 120 can include a spray mechanism 160 wherein the active area includes a spray area. The spray mechanism functions to spray a jet or spray to apply a treatment to the active area 122, but can alternatively or additionally function to apply a force (e.g., a cutting force) to a portion of the plant (e.g., plant stem, leaf, branch, root, or any other suitable plant portion) or substrate, or function to treat the plant in any other suitable manner. The spray mechanism does not spray working fluid in the standby mode, and sprays a working fluid in the treatment mode. The working fluid can be water, fertilizer, growth hormone, or any other suitable fluid. The working fluid is emitted (e.g., sprayed) at a spray pressure of approximately 5-30 psi, within a margin of error (e.g., a 5% margin of error, 2% margin of error, etc.), but can alternatively be emitted at a pressure of 90 psi or at any other suitable pressure. The spray is emitted from the treatment mechanism 120 when positioned within several centimeters (e.g., 1 cm, 5 cm, 10 cm, etc.) of the substrate 106 surface, but can alternatively be positioned a meter away from the substrate surface, or positioned any suitable distance away from the substrate surface.

The spray mechanism includes a nozzle 162. The nozzle 162 is oriented at a 90 degree angle relative to the substrate plane (e.g., pointing straight down at the substrate plane), but can alternatively be oriented at a 45 degree angle, 30 degree angle, 2 degree angle, or any other suitable angle relative to the substrate plane. The nozzle 162 can alternatively be actuatable relative to the mounting mechanism or detection mechanism. The nozzle 162 or its constituent components can be operable in any suitable number of modes to produce any number of spray patterns. Alternatively, different nozzles 162 may produce different spray patterns.

The spray pattern is a stream of droplets, but can alternatively be a hollow cone, full cone, wide column, fan, flat spray, mist or any other suitable spray pattern for applying treatment fluid to plants 102 in a field. The nozzle 162 can be a single-fluid nozzle, but can alternatively be a multiple-fluid nozzle. The nozzle 162 can be a plain-orifice nozzle, a shaped-orifice nozzle, a surface-impingement single-fluid nozzle, a pressure-swirl single-fluid spray nozzle, a solid-cone single-fluid nozzle, a compound nozzle, an internal mix two-fluid nozzle, external-mix two-fluid nozzle, or any other suitable nozzle. The nozzle 162 can have a fixed exit or an actuatable exit such that the spray pattern is configurable. Nozzle emission (e.g., nozzle spray) is controlled by a valve assembly, but can alternatively be controlled by any other suitable control mechanism. The valve assembly controls the nozzle to open (e.g., spray) in response to receipt of a spray command from the control system 130, but can alternatively be passively or mechanically controlled. Detailed configurations of various example nozzles that may be used with the system 100 will be described in later sections.

The spray mechanism can additionally include a pressurization system 160, including a reservoir 164 and a pump 166. The spray mechanism can additionally include a bypass valve 168 fluidly connecting an intake 178 fluidly connected to the reservoir 164, a first outtake 170 fluidly connected to the reservoir 164, and a second outtake 172 fluidly connected to the nozzle 162. There can be any number of nozzles 162 fluidically coupled to the second outtake 172 via a distribution manifold 174. The bypass valve 168 is operable between a closed mode wherein the bypass valve 168 fluidly disconnects the nozzle 162 from the reservoir 164, and an open mode, wherein the bypass valve 168 fluidly connects the nozzle 162 to the reservoir 164, more fluidly connects the intake with the nozzle 162. The bypass valve 168 can be passive, wherein the cracking pressure is the same as the desired spray pressure, or can be active, wherein bypass valve actuation from the closed to open mode is actively controlled, such as by the control system 130. The bypass valve 168 can fluidly disconnect (e.g., seal) the intake from the first outtake 170, or fluidly connect to a distribution manifold 174. The pump 166 moves fluid from the reservoir 164 to the spray pressure by pumping the working fluid into the intake, through the bypass valve 168, and through the first outtake 170 into the reservoir 164. The pump 166 can move fluid from the reservoir 164 using secondary fluid from the ambient environment (e.g., from a fluid source or air), or move the working fluid in the reservoir 164 in any other suitable manner. The bypass valve 168 opens in response to the intake fluid pressure meeting or exceeding the desired spray pressure, such that the intake is fluidly connected to the nozzle 162. In this variation, the treatment mechanism 120 can additionally include a pressure sensor or flow sensor that measures the fluid pressure or flowrate at the nozzle 162, intake, bypass valve 168, first outtake 170, second outtake 172, or reservoir 164, wherein the treatment parameters (e.g., initial spray time or position) can be subsequently adjusted or determined based on the measured working fluid parameters.

The spray mechanism can additionally or alternatively include a secondary reservoir 176 (e.g., accumulator) fluidly connected to the reservoir 164 and the nozzle 162, wherein the pump 166 pumps working fluid from the reservoir 164 to the accumulator 176. The accumulator 176 functions to retain a volume of working fluid sufficient to dampen pressure changes due to downstream valve actuation. The accumulator 176 can additionally function to pressurize the fluid. The accumulator 176 fluidly connected to the reservoir 164 between the pump 166 and the nozzle 162. The spray mechanism can additionally include a valve that controls fluid flow between the accumulator 176 and the nozzle 162. When a bypass valve 168 is used, as in the variant described above, the accumulator 176 is fluidly connected to the intake between the pump 166 and the valve 168. The accumulator 176 is connected in parallel with the nozzle 162, but can alternatively be connected in series with the nozzle 162. The accumulator 176 can be additionally fluidly connected to a secondary working fluid reservoir, wherein metered amounts of secondary working fluid (e.g., fertilizer, growth hormone, etc.) can be provided to the accumulator 176 to mix with the primary working fluid (e.g., water) within the accumulator 176. However, the spray mechanism can include any other suitable components. The pressurization system 160 or any component or subsystem of the pressurization system may be incorporated by any other component of the system 100 to facilitate the treatment of plants in the field. In one example configuration, the system 100 can additionally include a mounting mechanism 140 that functions to provide a mounting point for the system components. In one example, as shown in FIG. 1A, the mounting mechanism 140 statically retains and mechanically supports the positions of the detection mechanism 110, the treatment mechanism 120, and the verification mechanism 150 relative to a longitudinal axis of the mounting mechanism 140. The mounting mechanism 140 is a chassis or frame, but can alternatively be any other suitable mounting mechanism. In some configurations, there may be no mounting mechanism 140, or the mounting mechanism can be incorporated into any other component of the system 100.

In one example system 100, the system may also include a first set of coaxial wheels, each wheel of the set arranged along an opposing side of the mounting mechanism 140, and can additionally include a second set of coaxial wheels, wherein the rotational axis of the second set of wheels is parallel the rotational axis of the first set of wheels. However, the system can include any suitable number of wheels in any suitable configuration (i.e., can also include wheel track systems). The system 100 may also include a coupling mechanism 142, such as a hitch, that functions to removably or statically couple to a drive mechanism, such as a tractor, more to the rear of the drive mechanism (such that the system 100 is dragged behind the drive mechanism), but alternatively the front of the drive mechanism or to the side of the drive mechanism. Alternatively, the system 100 can include the drive mechanism (e.g., a motor and drive train coupled to the first and/or second set of wheels). In other example systems, the system may have any other means of traversing through the field.

In some example systems, the detection mechanism 110 can be mounted to the mounting mechanism 140, such that the detection mechanism 110 traverses over a geographic location before the treatment mechanism 120 traverses over the geographic location. In one variation of the system 100, the detection mechanism 110 is statically mounted to the mounting mechanism 140 proximal the treatment mechanism 120. In variants including a verification mechanism 150, the verification mechanism 150 is arranged distal to the detection mechanism 110, with the treatment mechanism 120 arranged there between, such that the verification mechanism 150 traverses over the geographic location after treatment mechanism 120 traversal. However, the mounting mechanism 140 can retain the relative positions of the system components in any other suitable configuration. In other systems, the detection mechanism 110 can be incorporated into any other component of the system 100.

In some configurations, the system 100 can additionally include a verification mechanism 150 that functions to record a measurement of the ambient environment of the system 100, which is used to verify or determine the extent of plant treatment. The verification mechanism 150 records a measurement of the geographic area previously measured by the detection mechanism 100. The verification mechanism 150 records a measurement of the geographic region encompassing the plant treated by the treatment mechanism 120. The verification mechanism measurement can additionally be used to empirically determine (e.g., calibrate) treatment mechanism operation parameters to obtain the desired treatment effect. The verification mechanism 150 can be substantially similar (e.g., be the same type of mechanism as) the detection mechanism 110, or be different from the detection mechanism 110. The verification mechanism 150 can be a multispectral camera, a stereo camera, a CCD camera, a single lens camera, hyperspectral imaging system, LIDAR system (light detection and ranging system), IR camera, thermal camera, humidity sensor, light sensor, temperature sensor, or any other suitable sensor. In other configurations of the system 100, the verification mechanism 150 can be included in other components of the system.

In some configurations, the system 100 can additionally include a power source, which functions to power the system components, including the detection mechanism 100, control system 130, and treatment mechanism 120. The power source can be mounted to the mounting mechanism 140, can be removably coupled to the mounting mechanism 140, or can be separate from the system (e.g., located on the drive mechanism). The power source can be a rechargeable power source (e.g., a set of rechargeable batteries), an energy harvesting power source (e.g., a solar system), a fuel consuming power source (e.g., a set of fuel cells or an internal combustion system), or any other suitable power source. In other configurations, the power source can be incorporated into any other component of the system 100.

In some configurations, the system 100 can additionally include a communication apparatus, which functions to communicate (e.g., send and/or receive) data between the control system 130 and a set of remote devices. The communication apparatus can be a Wi-Fi communication system, a cellular communication system, a short-range communication system (e.g., Bluetooth, NFC, etc.), or any other suitable communication system.

In the described system 100, the treatment mechanism 120 includes an array of manifolds, nozzles, and valve assemblies. The manifolds, nozzles, and valve assemblies, can be fluidically coupled in a pressurization system 160. Nozzles and valve assemblies of the treatment mechanism 120 spray a treatment fluid onto plants as the system passes over the plants in a field. Generally, the nozzles and valve assemblies can be grouped into any number of cassettes and groups of cassettes (or single cassettes) to form a nozzle manifold. That is, a cassette can be a set of valves, each with a nozzle, that are grouped together to operate as a result of a command from the control system 130. Multiple nozzle manifolds (or a single nozzle manifold) are configured into a nozzle manifold assembly and the nozzle manifold assembly is configurable such that the nozzle manifold assembly can be moved through a field to apply treatment to plants. While described in particular configurations and groupings, the groupings of nozzles, valve assemblies, cassettes, and nozzle manifolds can take any grouping or configuration such that the treatment mechanism 120 is able to apply treatment to plants in a field. Further, the treatment mechanism can also be configured without any of its constituent components or groupings (e.g. spray nozzles and valve assemblies may not grouped into a cassette, or a treatment mechanism that is a singular nozzle manifold and not a manifold assembly, etc. . . . ) such that the treatment mechanism is able to apply treatment to plants in a field.

For example, in one configuration, the system includes a pressurization system 160 that can include high dynamic range pressure regulators to control the pressure of the treatment fluid as the treatment fluid is applied to plants via the treatment mechanism 120. That is, the pressure regulators monitor and control the pressure of the treatment fluid as it circulates through various distribution manifolds 174, nozzles 162, valve assemblies, manifolds, and manifold assemblies. Most generally, the back and front pressure regulators to maintain a constant pressure across all nozzles, valve assemblies, manifolds and manifold assemblies during valve actuation.

Figure 1D:
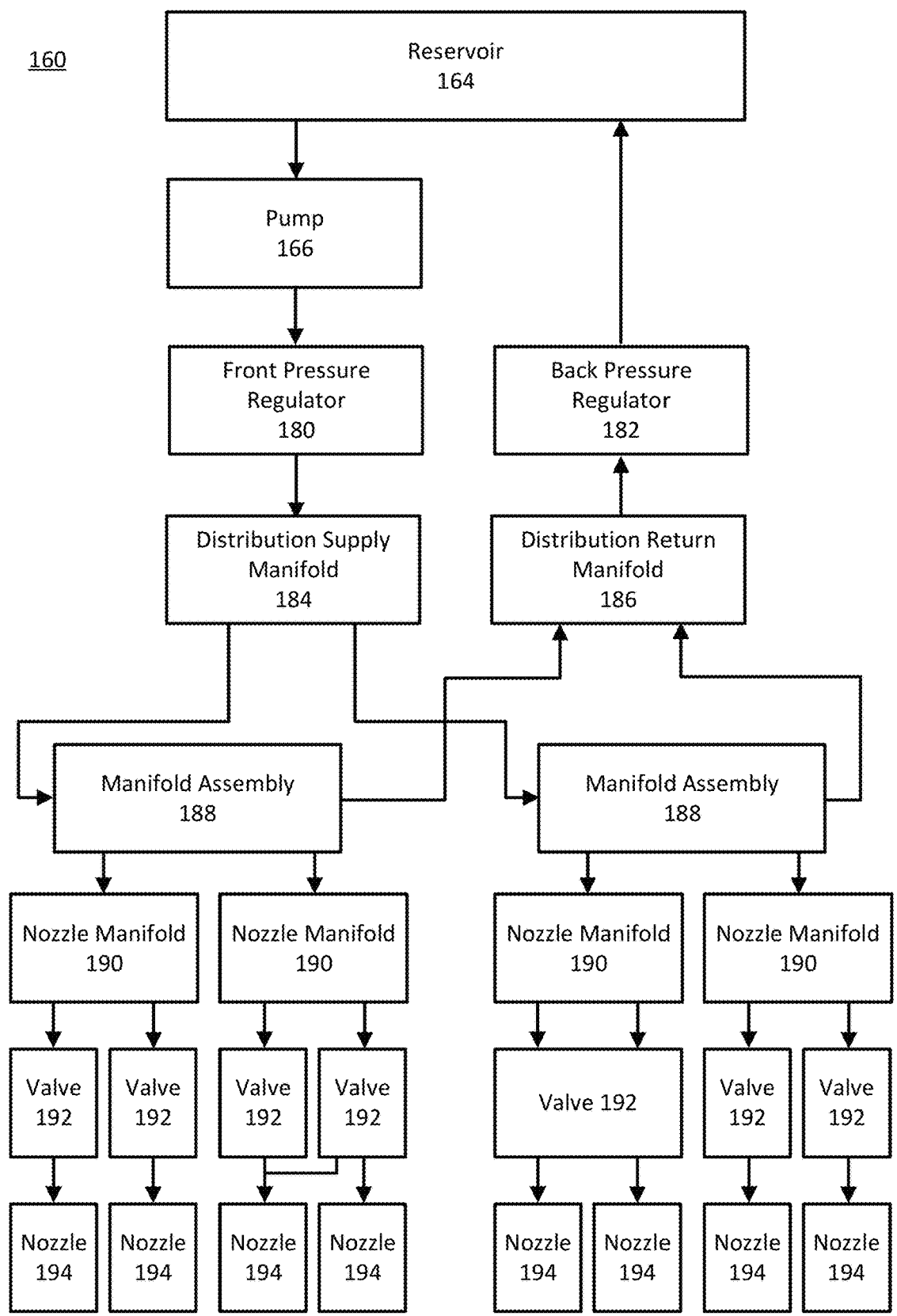

FIG. 1D is a diagram of a pressurization system 160 including a reservoir 164, a pump 166, a front pressure regulator 180, high dynamic range back pressure regulator 182, a distribution supply manifold 184, a distribution return manifold 186, manifold assemblies 188, nozzle manifolds 190, valve assemblies 192, and nozzles 162. As described above, the reservoir 164 contains treatment fluid and is fluidically coupled to the pump 166. The pump 164 is fluidically coupled to a distribution supply manifold 184 and pumps treatment fluid from the reservoir 164 to the distribution supply manifold 184. As the treatment fluid is pumped from the reservoir 164 to the distribution supply manifold 184, the treatment fluid passes through a front pressure regulator 180 fluidically coupled to the pump 166 and distribution supply manifold 184.

A high dynamic range front pressure regulator 180 can monitor and regulate the pressure of all elements of the pressurization system 160 after the front pressure regulator 180 ("downstream" elements). In one example configuration, the front pressure regulator 180 includes a restricting element, an actuating element, and a sensing element. The restricting element is an element (e.g., a valve) that can restrict, or increase, the flow of treatment fluid from the pump 166 to the distribution supply manifold 184; the sensing element is a measurement system configured to determine the pressure of the downstream elements (e.g., a sensor diaphragm); and the actuating element is an element configured to actuate the restricting element to restrict, or increase, the downstream pressure. For example, the sensing element determines the downstream pressure and the actuating element restricts the flow of treatment fluid using the restricting element.

The distribution supply manifold 184 is fluidically coupled to any number of manifold assemblies 188. The distribution supply manifold regulates flow of the treatment fluid to the manifold assemblies 188. The distribution supply manifold 184 can restrict, or increase, the flow of treatment fluid to any number of manifold assemblies 188. Each manifold assembly 188 is fluidically coupled to any number of nozzle manifolds 190, each nozzle manifold 190 is fluidically coupled to any number of valve assemblies 192, and each valve assembly 192 is fluidically coupled to any number of nozzles 194 such that at least some portion of the treatment fluid entering the manifold assembly can flow to (e.g., be sprayed on) plants in the field.

In some cases, not all of the treatment fluid entering a manifold assembly 188 flows to plants on a field. Accordingly, each manifold assembly 188 is fluidically coupled to the distribution return manifold 186 such that the portion of the treatment fluid that did not flow from the manifold assembly 188 to plants on the field ("unused treatment fluid) can flow to the reservoir. The distribution return manifold 186 aggregates unused treatment fluid returning from the manifold assemblies 188 for return to the reservoir 164. In some examples, the distribution return manifold 186 can restrict, or increase, the flow of treatment fluid from a manifold assembly 188 to the distribution return manifold 186.

The distribution return manifold 186 is fluidically coupled to the reservoir 164 such that unused treatment fluid can flow into the reservoir 164 for future use by the system 100. As unused treatment fluid flows from the distribution return manifold 186 to the reservoir, the treatment fluid passes through a high dynamic range back pressure regulator 182 fluidically coupled to the distribution return manifold 186 and the reservoir 164. The back pressure regulator 182 can monitor and regulate the pressure of all elements of the pressurization system before the back pressure regulator ("upstream" elements) similarly to the front pressure regulator 180 and downstream elements. That is, the backpressure regulator 180 determines the upstream pressure using a sensing element, and an actuating element restricts the flow of treatment fluid using a restricting element.

In various configurations, the pressurization system 160 can include more or fewer elements. For example, the pressurization system can include only a back pressure regulator for regulating pressure of treatment fluid in the pressurization system, or can include only a front pressure regulator for regulating pressure of treatment fluid in the pressurization system.

II. Tube Manifold Assembly

The treatment mechanism 120 is a highly configurable component that can be configured to spray treatment fluid on various plants of different sizes and seed line spacing. FIG. 2A illustrates an example of a treatment mechanism 120 including is a tube manifold assembly 200 (i.e., manifold assembly 188). The tube manifold assembly including tube manifolds 220 (i.e., a nozzle manifold 190) coupled to various types of spray nozzles 230 (i.e., nozzle 194). The tube manifolds 220 of the tube manifold assembly 200 can be configured for treatment of different plants 102 and active areas 122.

The tube manifold assembly 200 allows crop treatment fluid to be sprayed on a selected target plant or plant portion. Limiting spraying to a selected target increases the options for crop protectants for use by the system 100. For example, spraying a selected target but not nearby un-selected targets enables the successful weeding of non-GMO crops in a field which may not be herbicide resistant, and which would otherwise might be damaged or affected by less precise treatment mechanisms.

The tube manifold assembly 200 may include a set of tube manifolds 220 allowing each tube manifolds of the set to apply treatments to crops 102 of multiple crop rows simultaneously. FIG. 2A illustrates an example of a tube manifold assembly 200 with two tube manifolds 220, each tube manifold with ten narrow nozzles 230a and two groups of three wide nozzles 230b. Each tube manifold 220 of the tube manifold assembly 200 moves along a manifold path 240. Generally, the tube manifold path 240 is parallel to the direction of travel of the system 100 and the manifold paths 240 of the tube manifolds 220 are approximately parallel.

In the illustrated example embodiment, the ten nozzles 230a are coupled to the tube manifold 220 as a middle cassette 262b and each group of wide nozzles as a left cassette 262a and a right cassette 262c. Each of the cassettes 262 are fluidically coupled to the manifold support structure 270. Generally, the tube manifolds 220 are oriented such that the nozzles 230 of each tube manifold 220 (and each cassette 262 of the tube manifold 220) approximate a tube nozzle axis 250 that is perpendicular to the tube manifold paths 240. Further, in the illustrated example, there is no overlap between nozzles 230 or cassettes 262 of adjacent tube manifolds 220 (e.g., 220a and 220b) in the tube manifold assembly 200 such that there is a manifold spacing 252 between the manifold paths 240. However, in other configurations, the tube manifolds can be positioned such that there is some overlap between the nozzles 230 and/or cassettes 262 of adjacent tube manifolds 220.

In this configuration the system 100 moves forward such that the tube manifold paths 240 are approximately parallel to the seed lines 242 of the crops. While the tube manifold paths can take any alignment, in general, the system 100 moves such that the center of each tube manifold 220 passes over the approximate center of each plant 102 in a seed line 242. The tube nozzle axis 250 is approximately perpendicular to the seed lines 242 of the crops. In the illustrated configuration, the tube manifolds 220 are oriented such that the manifold spacing 252a (e.g. the distance between adjacent tube manifold 220 centers) is approximately the crop row width 254a of the plants 102 (i.e. the spacing between adjacent seed lines 242).

III. Tube Manifold

A tube manifold 220 of the tube manifold assembly 200 is configured to apply treatment fluid to plants in a field as the tube manifold assembly 200 passes over plants in the field. Each tube manifold assembly 200 includes at least one tube manifold 220 for applying treatment fluid to crops as the tube manifold assembly 200 passes above plant material in the field. In the illustrated example of a tube manifold assembly 200 in FIG. 2A, each tube manifold 220 can any of the tube manifolds illustrated in FIGS. 2B-2H.

Figure 2B:
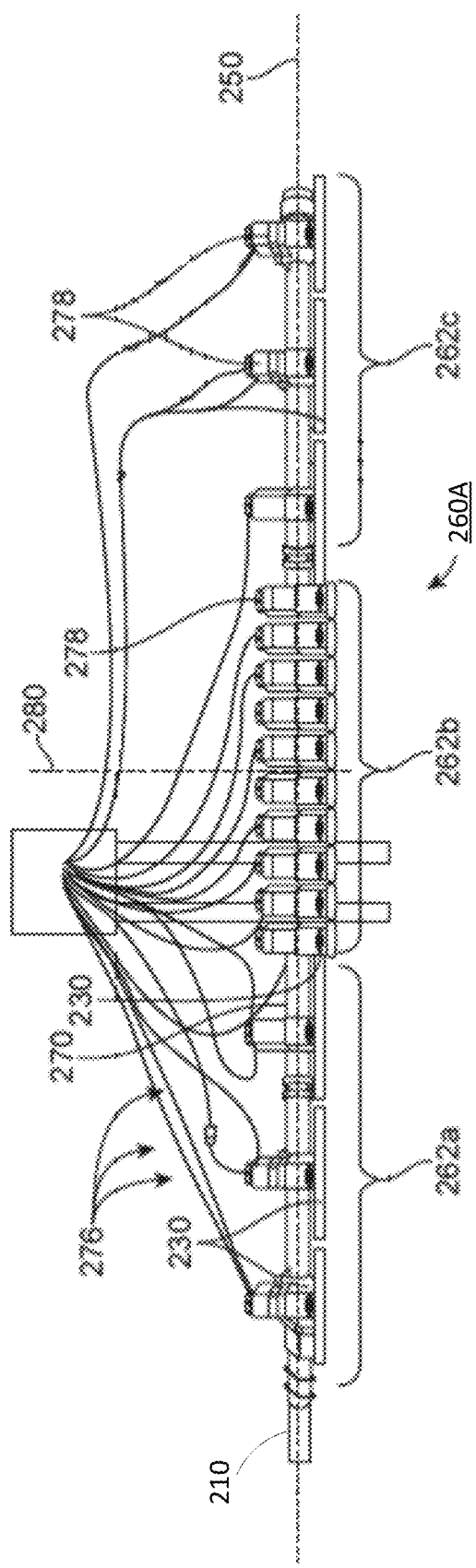
FIG. 2B illustrates a front view of a tube manifold, in one example embodiment.
Figure 2C:
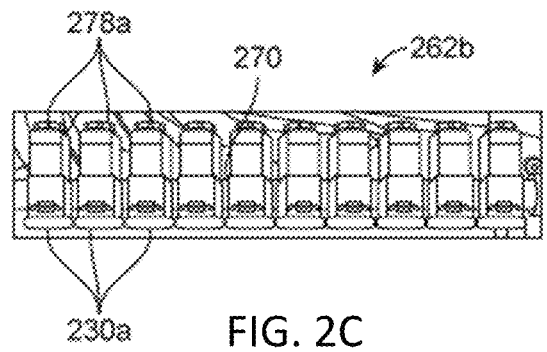
FIG. 2C illustrates a front view of a middle cassette of a tube manifold, in one example embodiment.
Figure 2D:
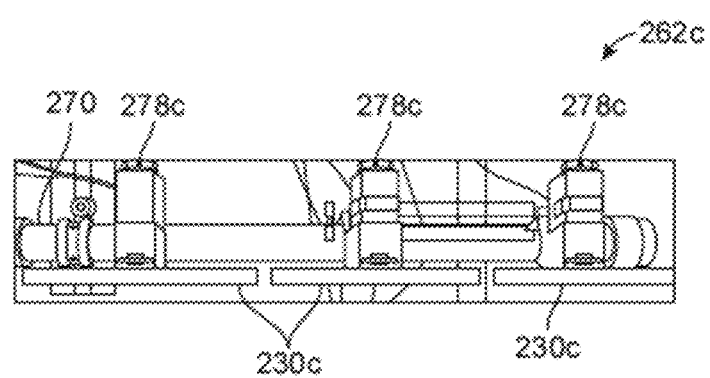
FIG. 2D illustrates a front view of right cassette of a tube manifold, in one example embodiment.

FIG. 2B illustrates a frontal view of a first configuration 260A of a tube manifold 220 with a left cassette 262a, a middle cassette 262b, and a right cassette 262c, according to one example embodiment. FIGS. 2C and 2D illustrate a frontal view of the middle cassette 262b and right cassette 262c of a tube manifold 220, respectively.

The tube manifold 260A can include a support structure 270, a reservoir (not pictured), a left cassette 262a, a middle cassette 262b, a right cassette 262c, treatment feed tubes 210, and nozzle control connectors 276. Each cassette includes an array of nozzles 230 and valve assemblies 278.

Each tube manifold 260A and its components may have a bottom side, a top side, a front side, a back side, a left side, and a right side. In the orientation of the configuration shown in FIG. 2B, the bottom is side facing to the bottom of the page the (e.g. towards the crops), the top side facing to the top of the page (e.g. away from the crops), the front side facing into the plane of the page (e.g. towards the front of the system and in the direction the system 100 travels), the back side facing out of the plane of the page (e.g. to the back of the system 100), and the left side and ride side are referenced from the front facing side (e.g. the left side is facing the left side of the page, and the right side is facing the right side of the page in the orientation of FIG. 2B).

The support structure 270 is a structural support apparatus configured to mechanically support and couple other components of the tube manifold 260. In the illustrated example, the support structure 270 is a substantially cylindrical tube created from a mechanically rigid material such as steel, plastic, or any other material that can be used to fabricate chemically compatible components for applying treatment fluid in a field. The support structure 270 contains a hollow cavity that allows treatment fluid to move along the axis of the support structure 270. The support structure 270 can be fluidically coupled to a reservoir (e.g., reservoir 164) by the treatment feed tubes 210. The axis of the support structure is parallel to the tube nozzle axis 250 and perpendicular to the seed lines 242.

In one example configuration, the back side of each cassette 262 may be coupled to the front side of the support structure 270 such that the front sides of the cassettes 262 are substantially flush. The bottom sides of each cassette 262 are substantially flush and are oriented such that the treatment fluid exiting the nozzles 230 sprays substantially downward towards the plants in the field. The center 280 of the tube manifold 220 approximately bisects the support structure 270, or, alternatively, is the approximate center of the tube manifold 260A. The center 280 of the tube manifold 220 approximately follows the manifold path 240 in the direction of movement of the tube manifold assembly 200 and the system 100. In various embodiments, the constituent components of the tube manifolds 260 can take any orientation or coupling such that the tube manifold is capable of assisting the treatment mechanism 120 in applying a treatment to a plant in the field.

The nozzles 230 and cassettes 262 of the tube manifold assembly 260 can take any grouping such that different groupings of nozzles can spray treatment on the plants of the field at any time. For example, as in FIG. 2B, the back side of the right cassette 262c is coupled to the valve assemblies 278c and nozzles 230c of the right cassette. The nozzles 230c and valve assemblies 278c are grouped into a right sprayer group. The middle cassette 262b and left cassette 262a are similarly coupled and grouped into middle and left sprayer groups, respectively. The nozzles 230 and valve assemblies 278 of each sprayer group are adjacently oriented such that the nozzle exits are approximately linear. The nozzle exits of each sprayer group are collinear and additionally collinear to the tube nozzle row 250. Each sprayer group is configured such that individual nozzles of the sprayer group couple to the cassettes 262 and can be mechanically removed and replaced from the tube manifold 220.

In the illustrated configuration, the left 262a and right 262b cassettes include three wide nozzles 230b and their corresponding valve assemblies 278 with each trio of wide nozzles grouped into a left and right sprayer group, respectively. The middle cassette includes ten narrow nozzles 230a and their corresponding valve assemblies 278 grouped into the middle sprayer group. The wide nozzles 230b apply treatment fluid to a wider active area 122 than the narrow nozzles 230a.

In alternative embodiments, each sprayer group can be divided into nozzle subsets, e.g. in the middle sprayer group there may be a left subset of four nozzles, a middle subset of five nozzles, and a right subset of one nozzle. The nozzle subsets may take any number and any configuration, including nozzles of different sizes, e.g. a subset with one wide nozzle and one narrow nozzle. Further, each cassette is not limited to one sprayer group and may have any number of sprayer groups or nozzle subsets, e.g. the middle cassette may have two sprayer groups configured, each sprayer group divided into nozzle subsets. Additionally, a sprayer group may include nozzles from different cassettes. The spray of treatment fluid by each sprayer group and nozzle subset can be independently controlled by the system controller 130.

Figure 2E:
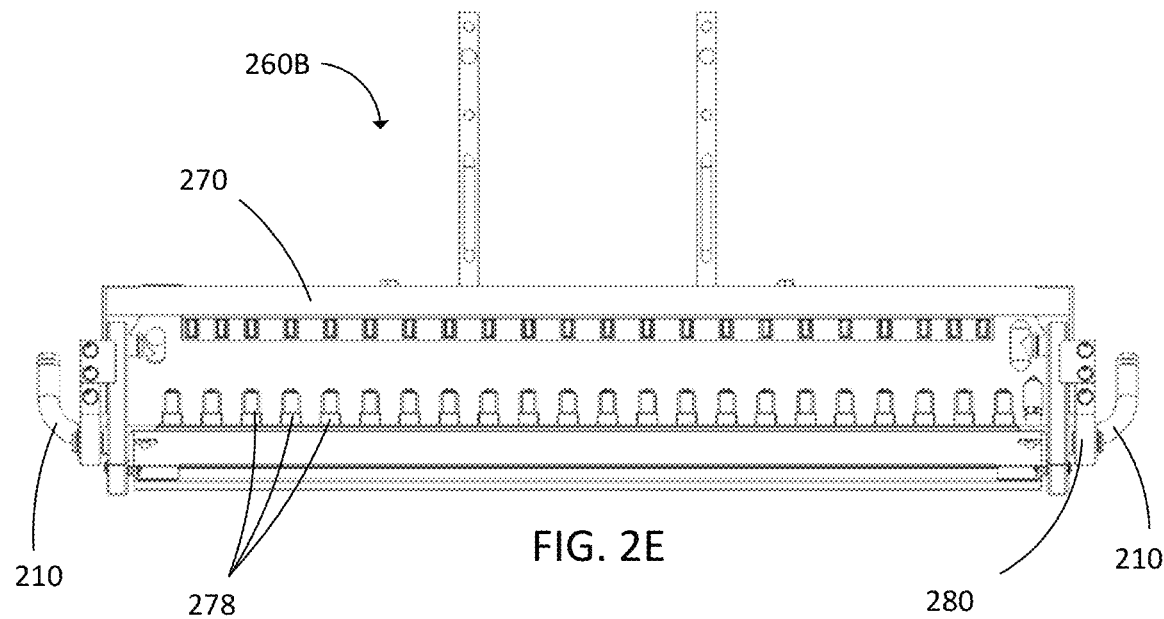
FIG. 2E illustrates a front view of a tube manifold, according to one example embodiment.
Figure 2F:
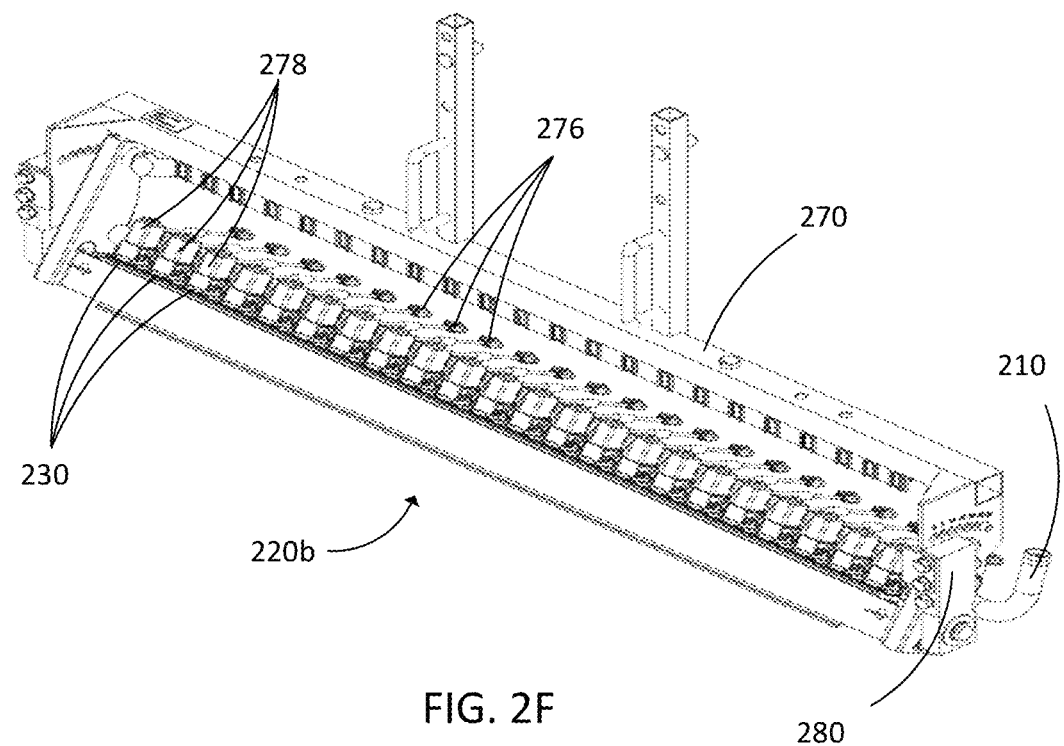
FIG. 2F illustrates an isometric view of a tube manifold, according to one example embodiment.

FIG. 2E and FIG. 2F, respectively, illustrate a front and isometric view of a second configuration tube manifold 260b including multiple nozzles 230 of the same size (e.g., a narrow nozzle). In this configuration, the tube manifold 220b can include any number of cassettes (not illustrated) coupling any number of nozzles to the support structure 270. The tube manifold 260B can have any number of spray groups and nozzle subsets containing any number of nozzles across any number of cassettes, as described previously. For example, in one embodiment, all of the nozzles 230 and valve assemblies 278 may be coupled to the support structure 270 via one cassette and all the nozzle 230 and valve assemblies 278 are grouped into a single sprayer group. In another example, every six adjacent nozzles 230 are coupled to the support structure 270 as a cassette, with each cassette having a two sprayer groups. Each sprayer group of each cassette can be subdivided into two nozzle subsets, with the first nozzle subset having a singular nozzle 230 and the second nozzle subset having a pair of nozzles 230.

In the illustrated embodiment, the tube manifold 260b includes treatment feed tubes 210 mechanically coupled to the left and right side of the support structure 270, but can be coupled in any other position. The treatment feed tubes 210 fluidically couple the support structure 270 and valve assemblies 278 to the reservoir. The treatment feed tubes 210 can be constructed from plastic, aluminum, steel, or any other tubing material that can be used to fluidically couple components of the system 100.

Additionally, the tube manifold 260b includes nozzle control connectors 276 that electrically couple the valve assemblies 270 and nozzles 230 to the system controller 130. The nozzle control connectors 276 are configured to transmit and receive the control signals of each nozzle 230 and valve assembly 270. The control signals dictate the release of treatment fluid as the tube manifold 260b passes above plants 102 as the system 100 moves through a field.

In this configuration, the tube manifold 220b also includes a rotation mechanism 280. The rotation mechanism is coupled to the support structure 270 such that the support structure 270, and thereby the nozzles 230, are capable of rotating relative to an axis parallel to the field and perpendicular to the direction of travel across the field. In one configuration, the rotation of the support structure is based on the height of plants being targeted for spray. For example, for plants detected to have a height above a threshold height, the array of nozzles rotate to such that plants may pass underneath the tube manifold 260b. Similarly, for plants detected to have a height below a threshold height, the array of nozzles rotate to angle downwards such that the nozzle outlets can improve treatment fluid delivery to plants in the field. In one example, this includes bringing the nozzle outlets are orthogonal to the field.

Figure 2H:
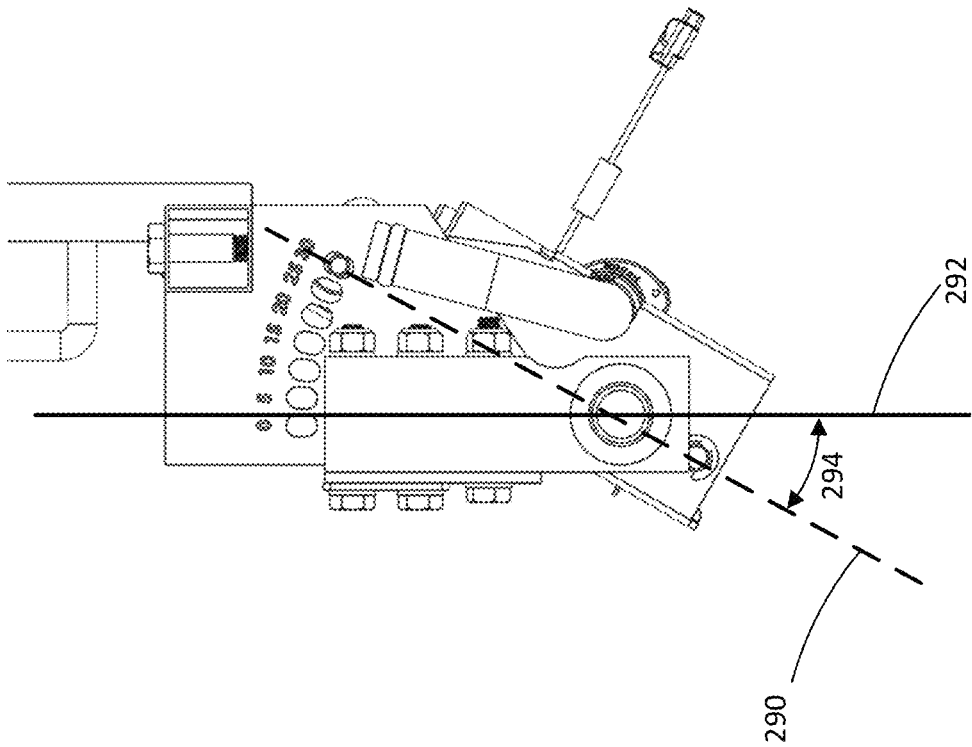
FIG. 2H illustrates a side view of a tube manifold including a rotation mechanism rotated away from the normal position, according to one example embodiment.
Figure 2G:
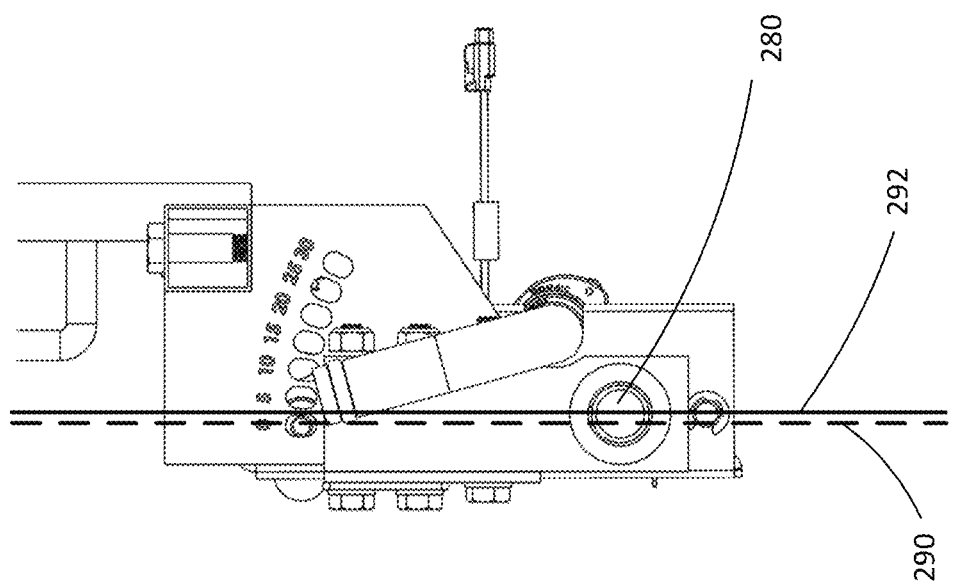
FIG. 2G illustrates a side view of a tube manifold including a rotation mechanism in a normal position, according to one example embodiment.

FIG. 2G and FIG. 2H, respectively, illustrate side views of a tube manifold 260B at a normal orientation and a rotated orientation. In these figures, an axis that the treatment fluid is sprayed from the nozzle ("spray axis" 290, hereafter) and an axis orthogonal to the plane of the field ("normal axis" 292, hereafter) are illustrated. In this example, the normal axis improves treatment fluid delivery to plants but could be any other axis. FIG. 2G illustrates the tube manifold 220b in a normal orientation. In a normal orientation, the rotation mechanism 280 is configured such that the spray axis 290 is parallel to the normal axis 292. FIG. 2H illustrates the tube manifold 220b in a rotated orientation. In a rotated orientation, the spray axis 290 is rotated from the normal axis 292 by a rotation angle 294. In the example of FIG. 2G the rotation angle is 30°, but the rotation angle can be any angle between −90° and 90°. In some configurations, the rotation mechanism 290 can include an actuation mechanism such that the actuation mechanism can change the rotation angle 294. The actuation mechanism can be communicatively coupled to the control system 130 such that the system controller 130 can control the rotation angle of the tube manifold 220b. In other configurations, the actuation mechanism can be a manual actuation mechanism such that an operator of the system 100 can change the rotation angle 294.

IV. Offset Manifold Assembly

Figure 3A:
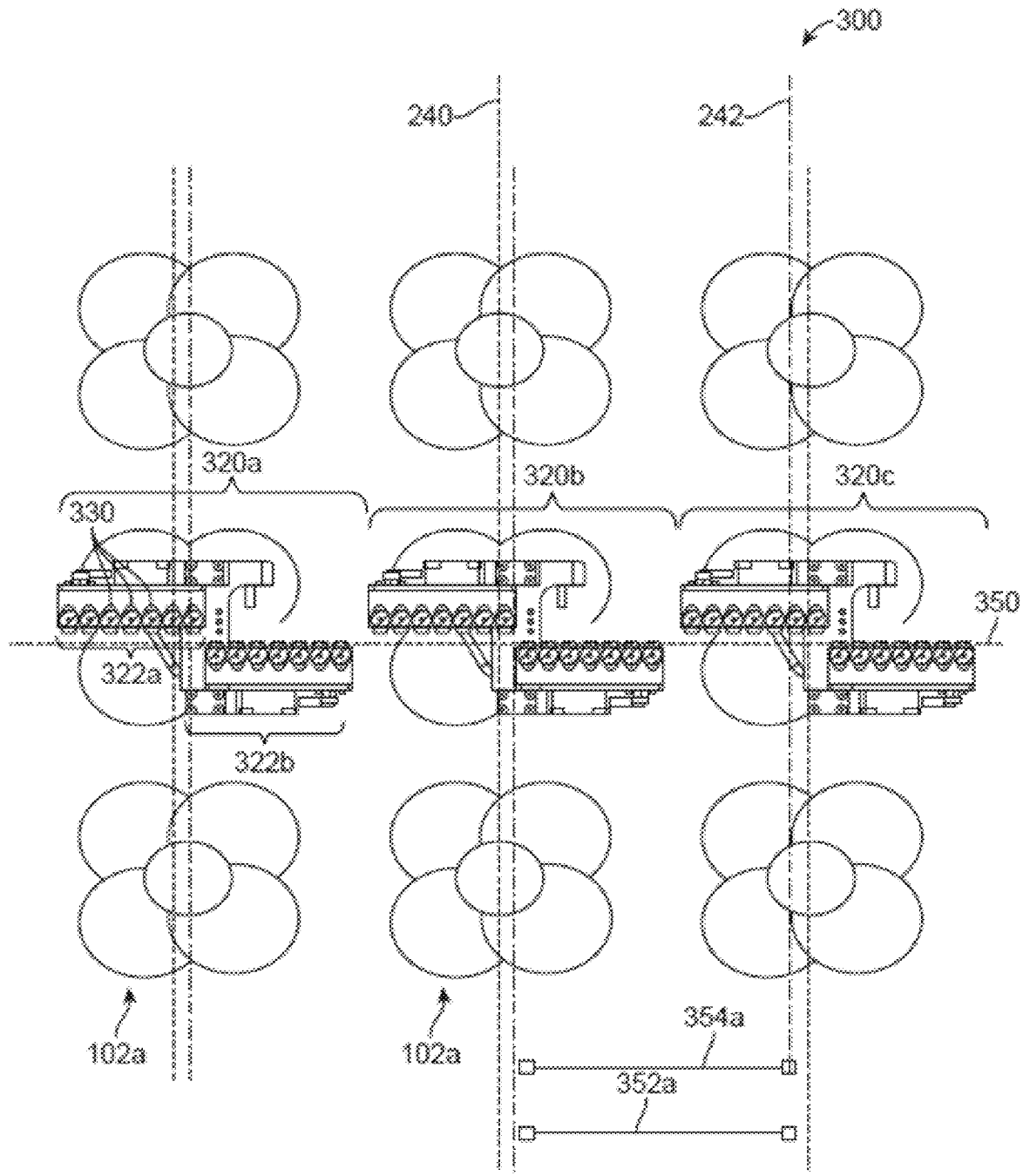
FIG. 3A illustrates an offset manifold assembly, in one example embodiment.
Figure 3B:
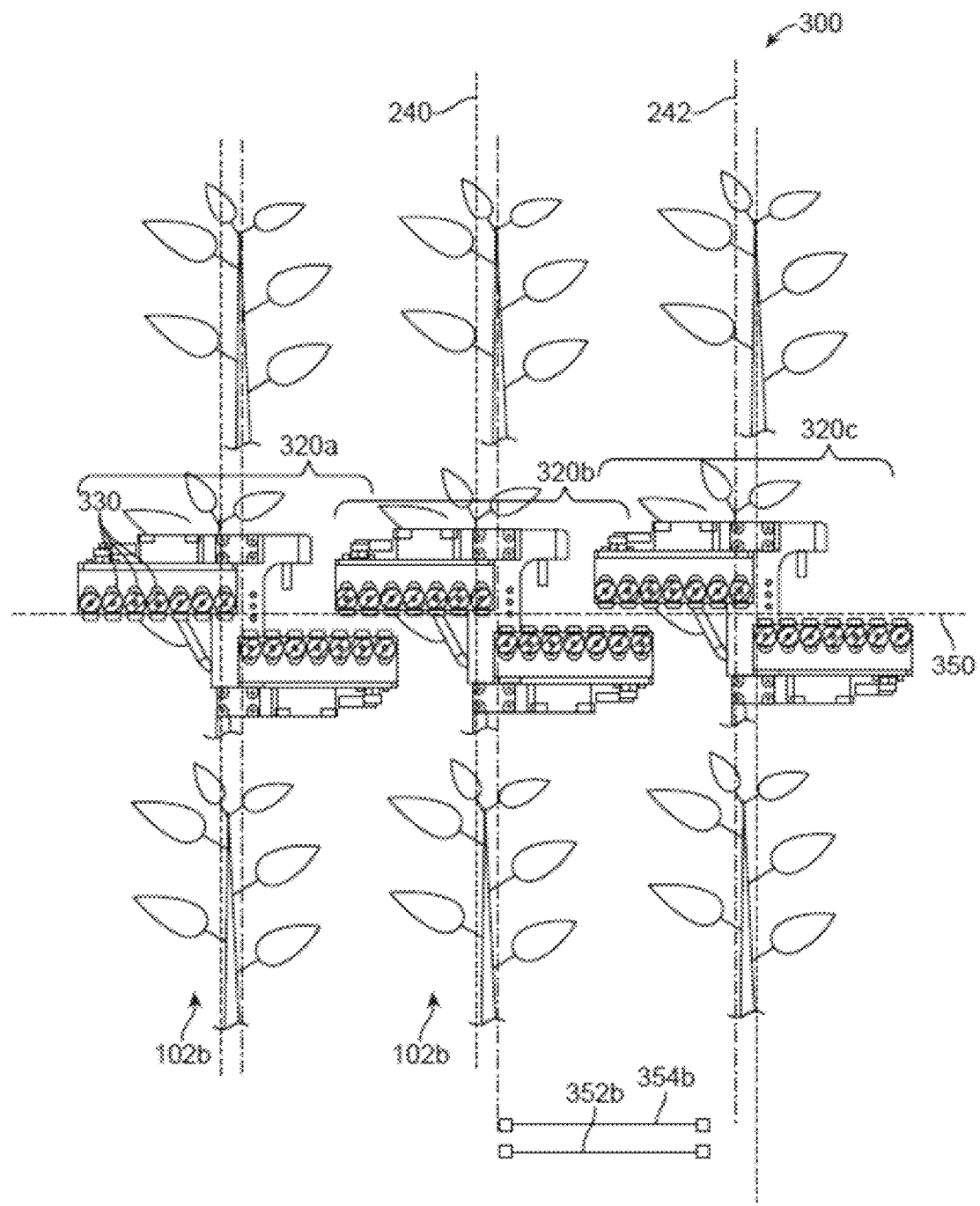
FIG. 3B illustrates an offset manifold assembly in a nested state, in one example embodiment.

FIGS. 3A-3B illustrate another example treatment mechanism 120 for use in the system 100. The illustrated treatment mechanism is a configurable assembly consisting of an offset manifold assembly 300 (i.e., a manifold assembly 188) including offset manifolds 320 (i.e., nozzle manifold) coupled to spray nozzles 330 (i.e., nozzles 194). The offset manifolds 320 of the offset manifold assembly 300 can be configured for treatment of different plants 102 and active areas 122. Further, the offset manifold assembly 300 may configure the offset manifolds 310 to apply treatments to crops that have differences in seed line spacing.

FIG. 3A illustrates an example of three offset manifolds 320 in an offset manifold assembly 300 configured in an open state. In this example, each offset manifold includes fourteen nozzles 330. The offset manifold assembly 300 also allows crop treatment fluid to be sprayed on a selected target plant or plant portion.

The offset manifold assembly 300 of FIGS. 3A-3B function similarly to the tube manifold assembly 200 in FIG. 2A: each offset manifold 320 of the offset manifold assembly 300 moves along a manifold path 240, the manifold path 240 is parallel to the direction of travel of the system 100, the manifold path 240 is parallel to the seed lines 242 of the plants 102 in the field, the center of each offset manifold 320 passes over the approximate center of each plant 102, the offset nozzle row 350 is perpendicular to the manifold path 240 and seed lines 242, and the manifold spacing 352a is approximately equal to the crop row width 353A. Further, in the example of FIG. 3A there is no overlap between nozzles 330 of adjacent offset manifolds 320 (e.g. 320a and 320b) in the offset manifold assembly 300 such that there is a manifold spacing 352a between the manifold paths 240, while in the example of FIG. 3B there is overlap between nozzles of adjacent offset manifolds 320 such that manifold spacing 352b is the narrower than the manifold spacing 352a of FIG. 3A.

The system 100 can be configured to change manifold spacing (e.g. 352a to 352b), i.e. the offset manifolds 300 are shaped such that adjacent offset manifolds can have variable spacing and overlap of nozzles 330 and cassettes 332 depending on the configuration of the system 100 (e.g. nest). In further similarity, the offset manifolds 320 and offset manifold assembly 300 can have any number of components or may be coupled to other components of the system 100 that allow for configuring the manifold spacing 352.

Dissimilar to the configuration of the tube manifold assembly 200 of FIG. 2A, each offset manifold 320 has a left cassette 322a coupled to a left sprayer group and a right cassette 322b coupled to a right sprayer group. The left cassette 322a and the right cassette 322b group are approximately parallel to, and equidistant from, an offset nozzle row 350 which lies between the two cassettes. The configurations of the offset manifolds 320 are described in more detail below.

While FIGS. 3A-3B demonstrate three offset manifolds 320 in an offset manifold assembly 300, there may be any number of offset manifolds creating an offset manifold assembly. In the illustrated manifold assembly of FIG. 3A-3B each of the offset manifolds are collinear but the offset manifolds may be offset from one another such that the offset nozzle row 350 of each offset manifolds 320 are not collinear.

V. Offset Manifold

The offset manifold 320 is a manifold of the offset manifold assembly 300 that is configured to apply treatment fluid to plants in a field as the offset manifold assembly passes over the plants in a field. Each offset manifold assembly includes at least one offset manifold for applying treatment fluid to crops as the manifold assembly passes above plant material in the field. In the illustrated examples of FIGS. 3A-3B, the offset manifold 320 can be the offset manifold 320 illustrated in FIGS. 3C-3D.

Figure 3C:
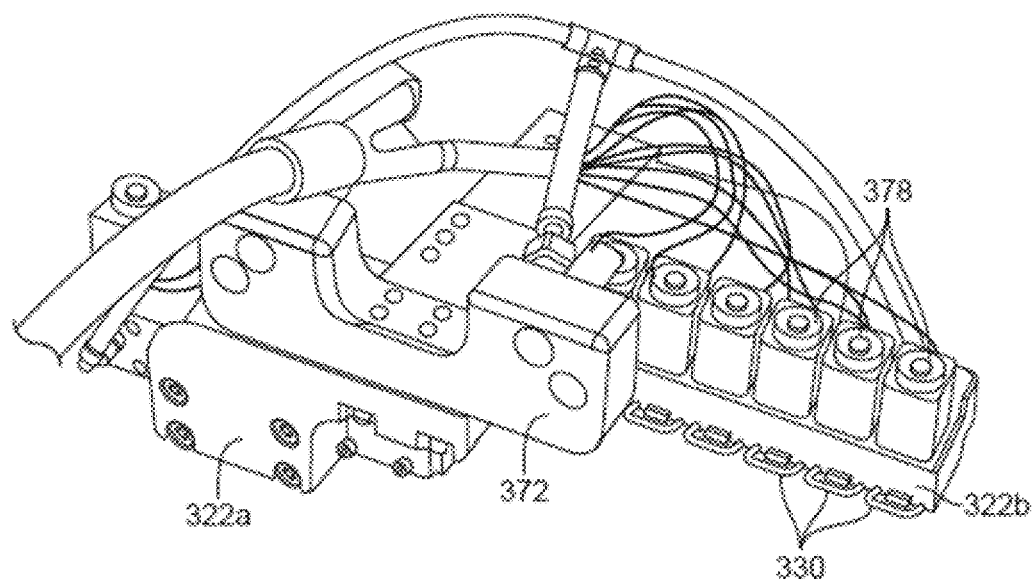
FIG. 3C illustrates an isometric view of the offset manifold, in one example embodiment.
Figure 3D:
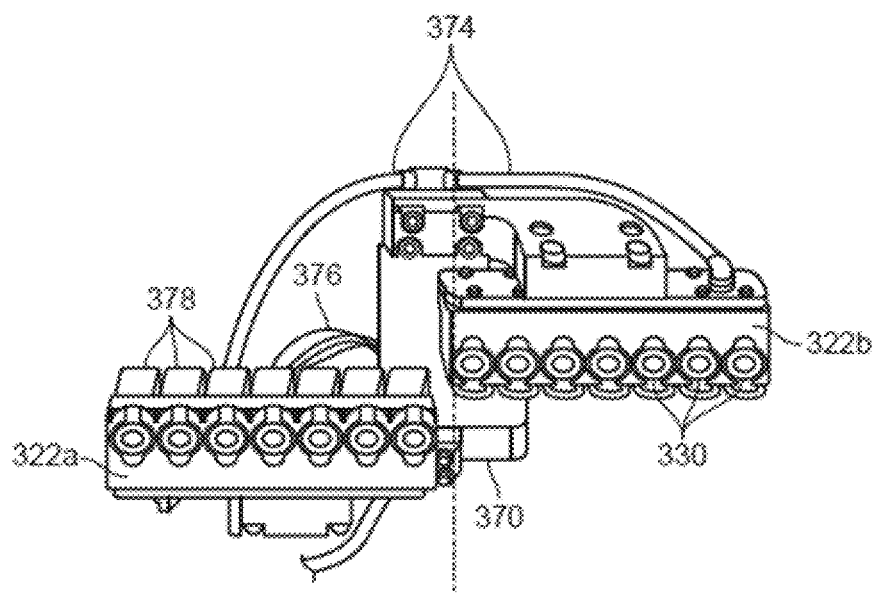
FIG. 3D illustrates a plan view of the bottom of the offset manifold, in one example embodiment.

FIG. 3C-3D illustrate an individual offset manifold 320, according to one example embodiment. FIG. 3C gives an isometric view of the offset manifold, while FIG. 3D gives a plan view of the bottom of the offset manifold. The offset manifold includes a support structure 370, a reservoir 372, a left cassette 322a, a right cassette 322b, treatment feed tubes 374, and nozzle control connectors 376. Each cassette includes an array of nozzles 330 and valve assemblies 378.

Each offset manifold 320 and its components can have a bottom side, a top side, a front side, a back side, a left side, and a right side. In the orientation of the configuration shown in FIG. 3C, the bottom is side facing to the bottom of the page the (e.g. towards the crops), the top side facing to the top of the page (e.g. away from the crops), the front side facing into the plane of the page (e.g. towards the front of the system and in the direction the system travels), the back side facing out of the plane of the page (e.g. to the back of the system), and the left side and ride side are referenced from the front facing side (e.g. the left side is facing the left side of the page, and the right side is facing the right side of the page in the orientation of FIG. 3C).

In the illustrated example configuration, the support structure 370 is a structural support apparatus configured to mechanically support and couple all other components of the offset manifold 320. In one embodiment, the support structure 370 is a substantially rectangular block created from a mechanically rigid material such as aluminum, steel, plastic, or any other material that can be used to fabricate plant treatment systems.

In the illustrated example configuration, the bottom side of the reservoir 372 is coupled to the top side of the support structure 370. The reservoir 370 is positioned towards the back side of the offset manifold 320 such that back side of the reservoir 372 and the support structure are substantially flush. In other configurations the reservoir 370 may be coupled to any other portion of the offset manifold 320, the offset manifold assembly 300, or the system 100.

In the illustrated example configuration, the top side of the right cassette 322*b* is coupled to the bottom side of the support structure 370*a* such that the front side of the right cassette 322*b* and the support structure 370 are substantially flush. The top side of the left cassette 322*a* is coupled to the bottom side of the support structure 370 such that the back side of the left cassette 322*a* and the support structure 370 are substantially flush. The center 380 of the offset manifold runs from the back side to the front side of the offset support structure between the left cassette and the right cassette and. The center 380 of the offset manifold 320 approximately follows the manifold path 240 in the direction of movement of the offset manifold assembly 300 and the system 100.

In the illustrated example configuration, the back side of the right cassette 322*b* is coupled to the valve assemblies 378 and nozzles 330 of the right cassette in a right sprayer group and the front side of the left cassette is coupled to the valve assemblies and nozzles of the left cassette in a left sprayer group. The nozzles and valve assemblies of each sprayer group are adjacently oriented such that the nozzles are approximately linear. The line of the left sprayer group is parallel to the line of the right sprayer group such that the lines are slightly separated and the offset nozzle row is approximately between the two. The left side of the right sprayer group is approximately flush with the midline and the right side of the left sprayer group is approximately flush with the midline. The sprayer groups are configured such that individual nozzles of the sprayer groups couple to the cassettes and can be mechanically removed and replaced. Further, the sprayer groups can be subdivided into any number of nozzle subsets. The nozzles, valve assemblies, sprayer groups, cassettes, and nozzles subsets can take any configuration to facilitate control of spraying treatment on the plants of the field, similar as previously described.

The treatment feed tubes 374 fluidically couple the valve assemblies 378 coupled to the left cassette 322*a* and the valve assemblies 378 coupled to the right cassette 322*b* to the reservoir 164. The treatment feed tubes 374 are constructed from plastic, aluminum, steel, or any other tubing material that can be used to fluidically couple components of the system.

The nozzle control connectors 376 electrically couple the valve assemblies 378 and nozzles 330 to the system controller. The nozzle control connectors 376 are configured to transmit and receive the control signals of each nozzle 330 and valve assembly 378. The control signals dictate release of treatments as the offset manifold 320 passes above crops as the system 100 moves through a field.

VI. Valve Assemblies

Figure 4A:
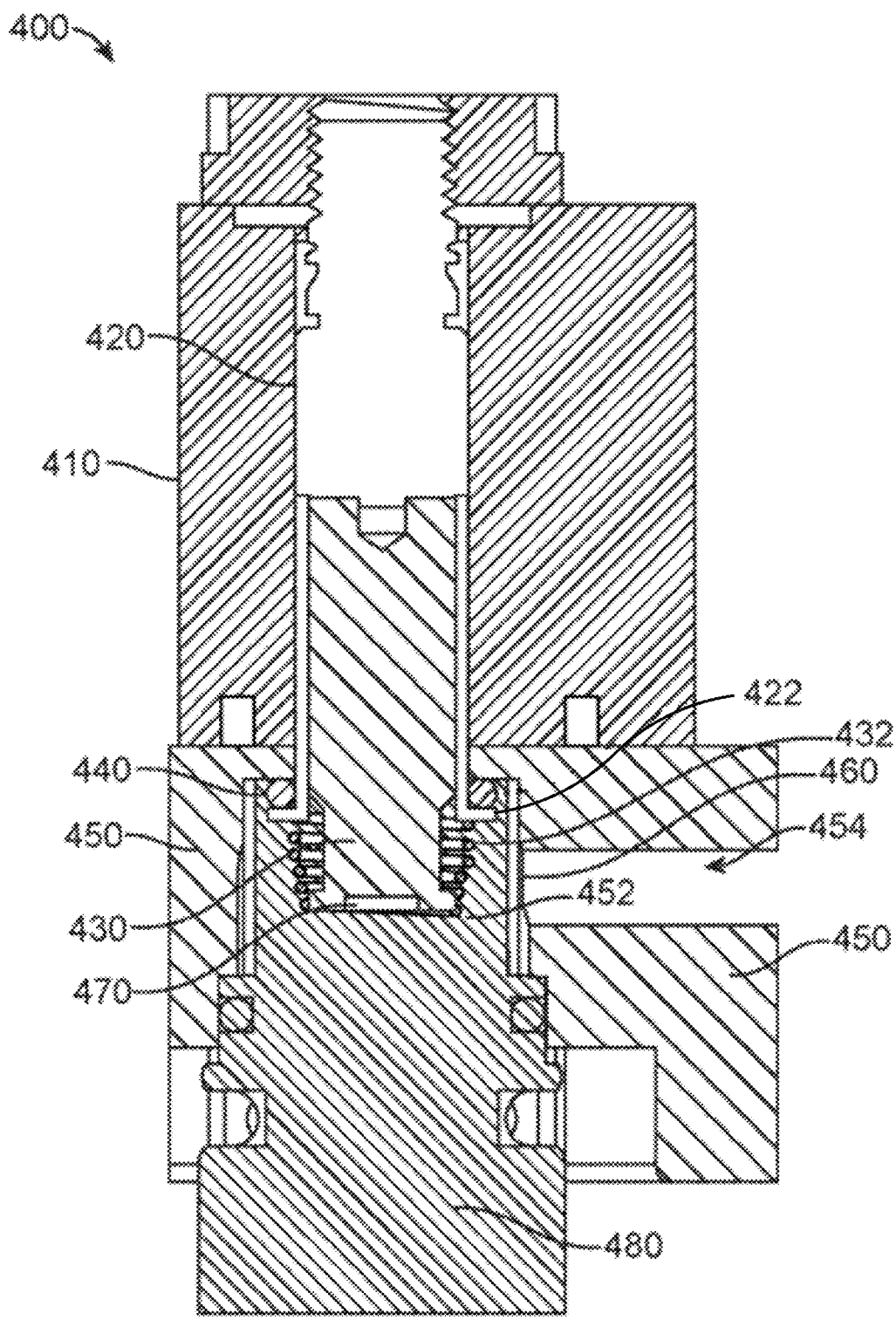
FIG. 4A illustrates a cross-sectional view of a valve assembly, in one example embodiment.

Generally, each manifold includes at least one nozzle coupled to at least one valve assembly. FIG. 4A illustrates a cross-sectional view of a valve assembly used 400 in a plant treatment system, according to one example embodiment. The valve assembly 400 is designed such that a volume of fluid between the bottom of the spring plunger and the top of the nozzle is as small as possible. The reduced volume of liquid allows a full spray to develop and shut off nearly instantaneously. The nozzle sprays fluid downwards towards the crops along a spray axis (generally parallel or collinear to the nozzle midline) when the valve assembly forces fluid into the nozzle via the solenoid. Shutting of the flow of fluid through the nozzle is accomplished by having the nozzle itself positioned where the spring plunger seals off the flow. The valve assembly can be coupled to the system controller by nozzle control connectors to control the spraying of treatment fluid onto the crops.

Each of the valve assemblies 400 comprise a solenoid 410, an armature tube 420, a spring plunger 430, a valve O-ring 440, a valve body 450, a screen filter 460, and a rubber seal 470 and is mechanically coupled to a nozzle 480. The valve assembly and constituent components have a top side (e.g. to the top of the page in the orientation of FIG. 4A), a bottom side (e.g. to the bottom of the page in the orientation of FIG. 4A), a proximal side (facing towards the spray axis), a distal side (facing away from the spray axis), and are substantially oriented about the spray axis 480. The nozzle 480 may be any nozzle configuration described below.

The solenoid 410 is a solenoid coil configured to electromagnetically control the fluid exiting the nozzle assembly by manipulating the spring plunger 430 by converting control signals from the system controller 130 into mechanical motion of the solenoid 410. The solenoid 410 is configured such that the proximal facing solenoid 410 sidewalls are coupled to the distal facing armature tube 420 sidewalls. The bottom side of the solenoid 410 is coupled to the top side of the valve body 450 and near the top side of the armature tube 420 such that some portion of the armature tube 420 sidewalls extend past the bottom side of the solenoid 410 and into the valve body 450.

The armature tube 420 is a cylindrical tube coaxial to the spray axis of the nozzle 480 with the bottom side of the armature tube 420 including armature tube seal ring 422 (appear as winglets in the 2d figure). The armature tube seal ring 422 extend radially outward from the spray axis on the bottom side of the armature tube. The proximal facing sidewalls of the armature tube 420 are coupled to the distal facing sidewalls of the spring plunger 430. A top portion of the distal facing sidewalls of the armature tube 420 are coupled to the solenoid 410 and a bottom portion of the distal facing sidewalls are coupled to the upper O-ring 440. The armature tube couples the solenoid 410 to the spring plunger 430 such that the solenoid is able to electromagnetically control the spray of the nozzle via the spring plunger 430.

The valve O-ring 440 is a mechanical gasket in the shape of a torus configured to be seated between the top side of the armature tube seal ring-422 and the top side of the valve body 450. The valve O-ring 440 is compressed during assembly of the valve assembly 400 between the armature tube seal ring-422 and the valve body 450 such that a fluid tight seal is created.

The spring plunger 430 is a substantially cylindrical in shape and is centered about the spray axis 480. An upper portion of the distal facing sidewalls of the spring plunger 480 are coupled to the proximal facing sidewalls armature tube 420. A lower portion of the distal facing sidewalls of the spring plunger are coupled to the spring coils 432. The bottom side of the spring plunger 430 is coupled to a rubber seal 470. The spring plunger 430 is configured to be controlled by the solenoid as the spring plunger moves up and down the spray axis 480. When the spring plunger 430 is moved upwards along the spray axis 480 by the solenoid 410 the spring plunger 430 removes the rubber seal 470 from the nozzle and allows fluid to begin to fill the nozzle. When the spring plunger is moved downwards along the spray axis by the solenoid the spring plunger a volume of fluid is pushed into the nozzle 490 for the nozzle to spray on the plants of the field. The spring plunger 430 is left in a downward position with the rubber seal 470 contacting the nozzle to prevent fluid from entering the nozzle for spraying.

The valve body 450 is configured to couple the components of the valve assembly to the manifold support structure and fluidically couple the reservoir 164 to the valve assembly 400. The valve body 450 includes a valve body cavity 452 and a fluid inlet cavity 454. The proximal facing sidewalls of the valve body cavity 452 are configured to act as a seat for the nozzle 480 when the nozzle is coupled to the valve assembly 400. The fluid inlet cavity 454 is a cavity within the valve body configured to fluidically couple the reservoir 164 to the valve body cavity 452. The valve body cavity 452 may fill with fluid when fluidically coupled to the reservoir 164 via the fluid inlet cavity 454 such that the treatment fluid can be injected into the nozzle 480.

The screen filter 460 is a filter coupled to the valve body 450 and valve body cavity 452, configured to filter particulates from the treatment fluid before the treatment fluid can enter the nozzle. The screen filter 460 is oriented such that it separates the fluid inlet cavity 454 from the valve body cavity 452 and filters out particulates from the treatment fluid as the treatment fluid moves from the fluid inlet cavity 454 to the valve body cavity 452. Filtering particulates from the treatment fluid can prevent the nozzle 480 from clogging during operation of the system 100.

FIG. 4B illustrates a tube valve assembly configured to couple to the support structure of the tube manifold of FIGS. 2B-2D. The tube valve assembly 402 is configured to mechanically and fluidically couple to a cylindrical support structure. The tube valve assembly can include any components that can mechanically couple the valve assembly to the support structure of a manifold including a latch 482, pins/screws 484, clamps, locks 486, etc. The tube valve assembly can also include any components that can fluidically couple the valve assembly to the reservoir 164 such as tubing, piping, O-rings 488, gaskets, etc. The tube manifold fluidically couples the reservoir 164 to the fluid cavity inlet. In other configurations, the tube valve assembly can include additional support structures to couple adjacent tube valve assemblies into a cassette of the tube manifold. In some embodiments, a singular tube valve assembly may be a cassette of the tube manifold.

Figure 4B:
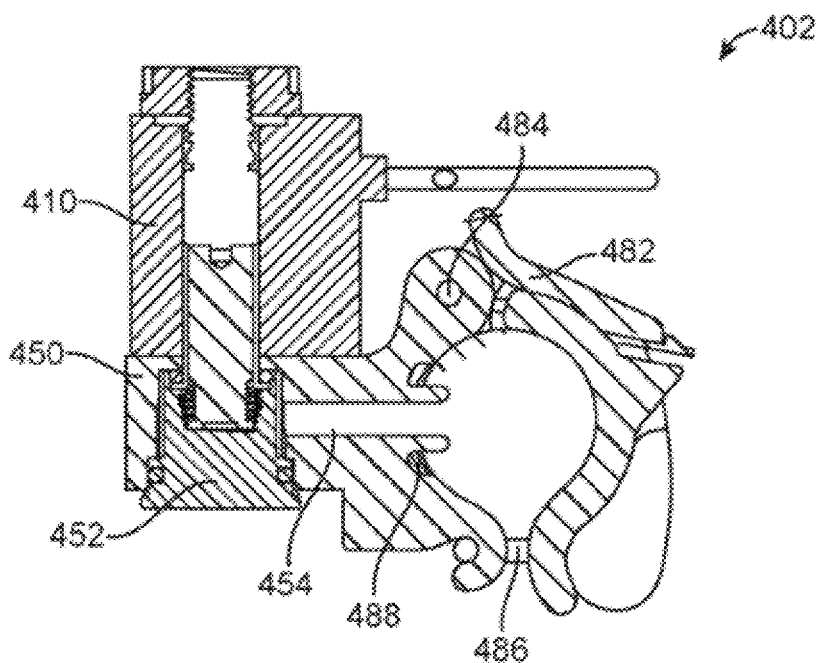
FIG. 4B illustrates a cross-sectional view of a valve assembly configured to couple to a tube manifold, in one example embodiment.
Figure 4C:
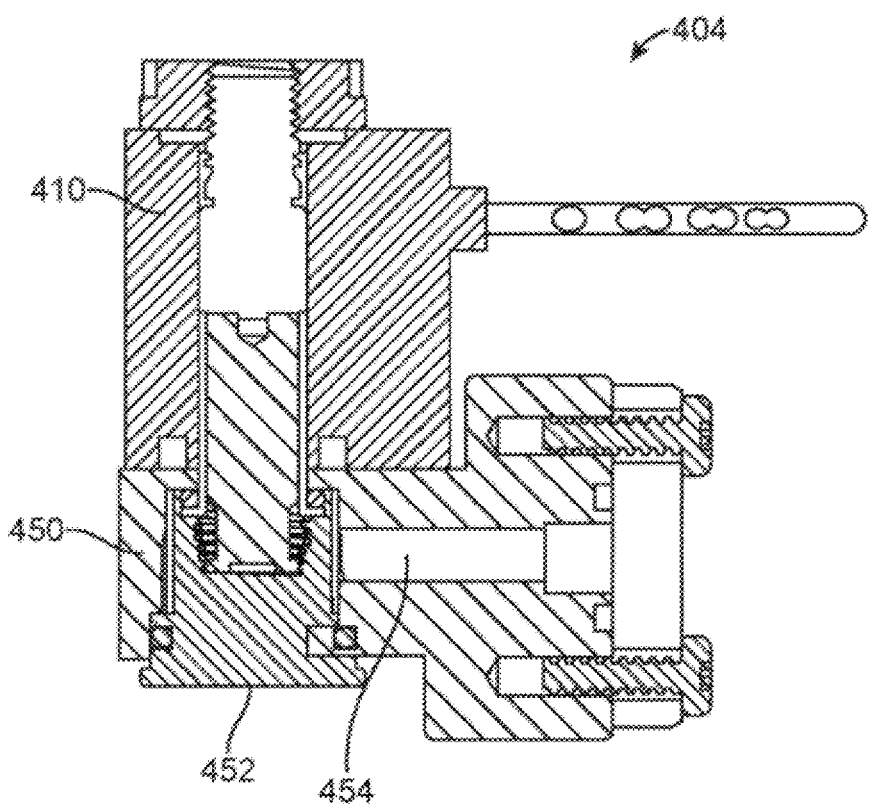
FIG. 4C illustrates a cross-sectional view of a valve assembly configured to couple to an offset manifold, in one example embodiment.

FIG. 4C illustrates an offset valve assembly configured to couple to the support structure of the offset manifold of FIGS. 3C-3D. The offset valve assembly 404 functions similarly to the tube valve assembly, but is configured to mechanically and fluidically couple to a substantially rectangular support structure. The offset valve assembly can include similar components to the tube valve assembly for coupling adjacent offset valve assemblies and fluidically coupling the valve assemblies to the reservoir.

IX. Nozzles

A nozzle is a nozzle configured to mechanically and fluidically couple to any of the described valve assemblies and treatment mechanisms. The nozzle is designed such that the spray pattern of treatment fluid exiting the nozzle approximates a rectangular area when sprayed by the system 100 on crops in a field. Shutting of the flow of fluid through the nozzle is accomplished by having the nozzle itself positioned where the spring plunger seals off the flow. The reduced volume of liquid between the spring plunger and the nozzle allows a full spray to develop and shut off nearly instantaneously.

Figure 5A:
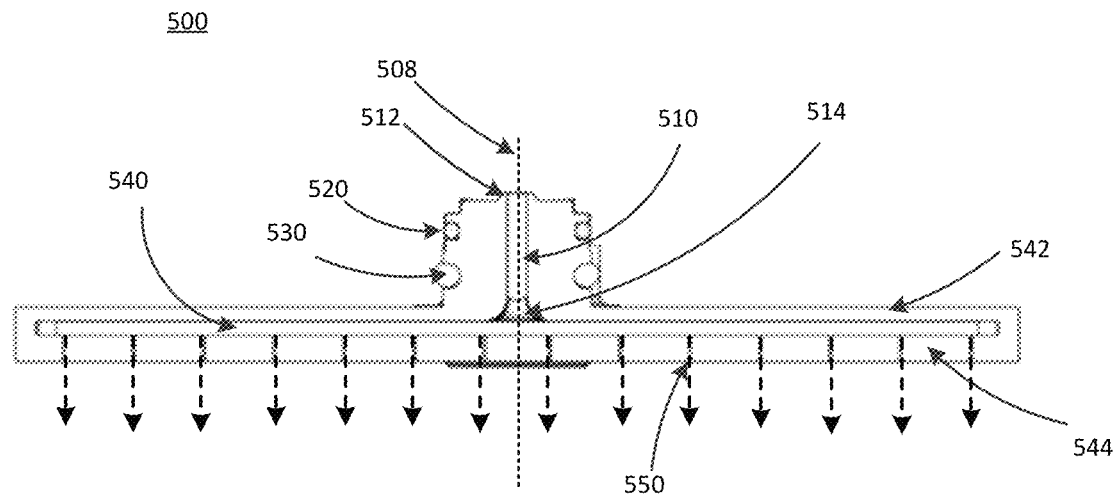
FIG. 5A illustrates a cross-sectional view of a nozzle from the front side, in one example embodiment.
Figure 5B:
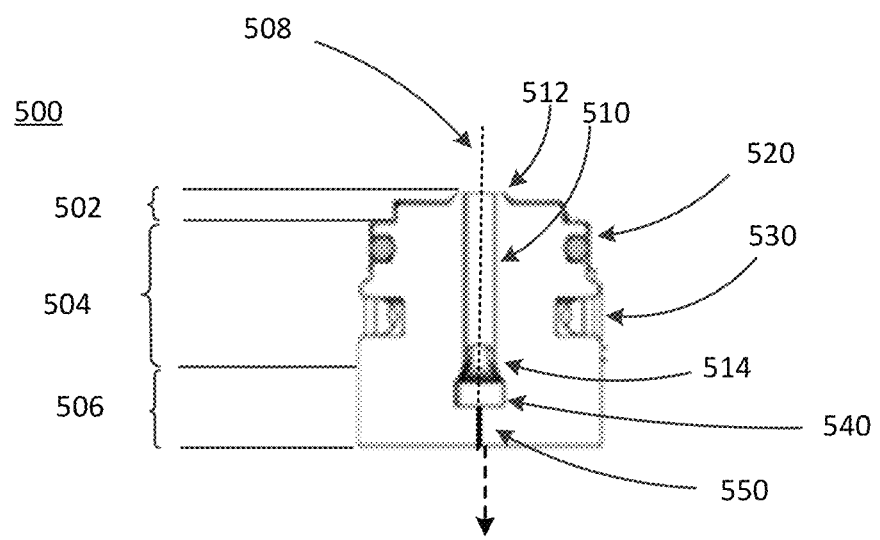
FIG. 5B illustrates a cross-sectional view of a nozzle from the left side, in one example embodiment.

FIGS. 5A and 5B show cross-sectional views of a nozzle used by the system from the front and from the left side, respectively, according to one embodiment. The nozzle 500 can be described in three sections: the nozzle head 502, the nozzle body 504, and the nozzle tail 506. Additionally, the nozzle and its constituent sections and components have a top side (e.g. to the top of the page in the orientation of FIG. 5A), a bottom side (e.g. to the bottom of the page in the orientation of FIG. 5A), a front side (e.g. out of the page in the orientation of FIG. 5A), a back side (e.g. in to the page in the orientation of FIG. 5A), a distal side (e.g. away from the nozzle midline 508), and a proximal side (e.g. towards the nozzle midline 508).

The nozzle head 502 is shaped as a cylindrical annulus with a cavity centered about the nozzle midline 508. The cylindrical annulus is coupled to the bottom side of a cylindrical pyramid having a top flat surface and a central circular cavity centered about the nozzle midline 508. The proximal facing sidewalls of the cavities in the cylindrical pyramid and cylindrical annulus are coaxially centered about the nozzle midline 508 and form at least some portion of the inlet cavity 510. The top side of the nozzle head can mechanically couple with the bottom of the spring plunger and rubber seal of the valve assembly (not shown). The top side nozzle head includes a nozzle inlet 512 which can fluidically couple the inlet cavity with the valve assembly when the solenoid of the valve assembly mechanically decouples the spring plunger and rubber seal from the top side of the nozzle head 502.

The nozzle body 504 is coupled to the bottom side of the nozzle head 502. The nozzle body 504 is substantially shaped as a cylindrical annulus with the proximal facing sidewalls of the cylindrical annulus centered about the nozzle midline 508 and forming at least some portion of the inlet cavity 510. The distal facing sidewalls of the nozzle body 504 can be configured with any number of ridges or grooves to assist in mechanically coupling other components of the nozzle 500 to the nozzle body 504.

In the illustrated embodiment, near the top side of the nozzle body 504 is a groove configured for mechanically coupling the nozzle O-ring 520 to the nozzle body 504. The nozzle O-ring 520 is a mechanical gasket in the shape of a torus configured to be seated between the distal facing sidewalls of the nozzle body 504 and the proximal facing sidewalls of the fill cavity of the valve assembly. The nozzle O-ring 520 is compressed during the mechanical coupling of the nozzle 500 and the valve assembly 400 such that a fluid tight seal is created.

In the illustrated embodiment, near the bottom side of the nozzle body 504 is a groove on the distal facing sidewalls of the nozzle body 504 configured for mechanically coupling the nozzle 500 to a pull-tab 530. The pull tab 530 is configured to allow an operator of the system 100 to remove the nozzle 500 from the valve assembly 400. The pull tab 530 can be any mechanical component such as a pull-ring, a latch, a handle, a knob, a ridge, or any other mechanical component that allows the removal of the nozzle 500 from the valve assembly 400.

The bottom side of the nozzle body 504 is coupled to the top side of nozzle tail 506. The nozzle tail 506 is a substantially rectangular shape including an upper fill cavity wall 542 and a lower fill cavity wall 544 with its short axis parallel to the manifold path and its long axis parallel to the nozzle axis. The upper fill wall 542 and lower fill wall 544 are configured such that when the two are coupled the nozzle 500 includes a fill cavity 540 bounded by two walls. The upper fill cavity wall 542 fluidically couples the fill cavity 540 to the inlet cavity 510 through a divergence area 514, the divergence area 514 a contoured cavity in the nozzle tail 506 configured to spread fluid from the inlet cavity 510 to the fill cavity 540. The lower fill cavity wall 544 includes an array of nozzle exits 550 orthogonal to the plane of the crop field configured to allow fluid from the fill cavity 540 to exit the nozzle 500 towards the external environment. The treatment fluid sprays out from each of the nozzle exits 550 in a column, the group of columns approximating a rectangle.

X. Nozzle Design

In some configurations, a nozzle can include removable and interchangeable nozzle inserts. The structure of each nozzle insert affects how treatment fluid exits the nozzle and, accordingly, the spray pattern of a nozzle is configurable because the nozzle inserts are removable and interchangeable. For example, a first nozzle insert can have a rectangular spray pattern such that the nozzle sprays treatment fluid in a rectangular pattern on a plant. An operator of the system 100 removes the first nozzle insert from the nozzle and inserts a second nozzle insert that has a fan spray pattern into the nozzle. Now, because of the second nozzle insert sprays treatment fluid in a fan pattern, the nozzle sprays treatment fluid in a fan pattern on a plant.

Figure 6A:
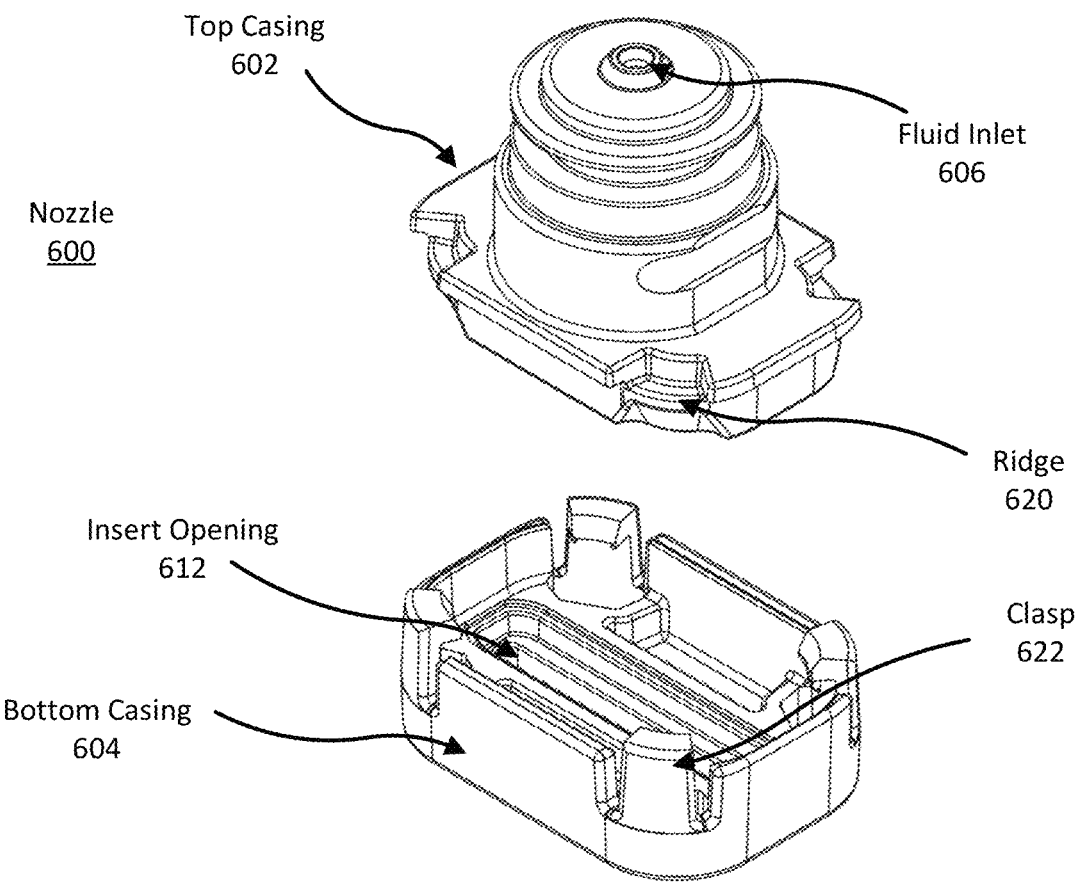
FIG. 6A illustrates an isometric view of components for a nozzle, in one example embodiment.
Figure 6B:
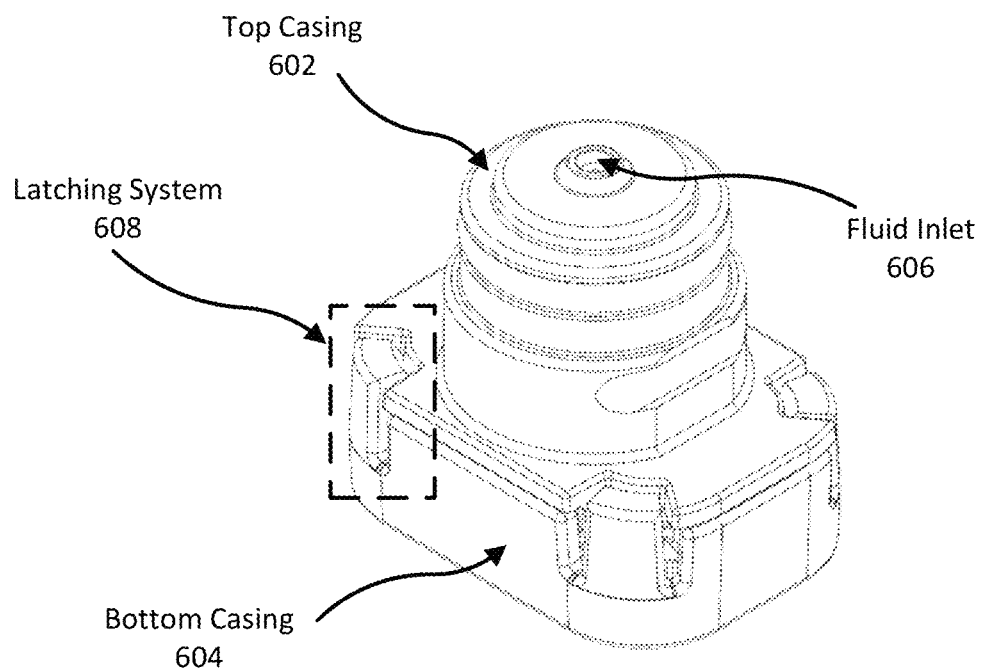
FIG. 6B illustrates an isometric view of components for a nozzle with couple components, in one example embodiment.

Generally, including a nozzle insert in a nozzle requires that a nozzle have components that can be removably coupled such that a nozzle insert can be inserted, removed, or exchanged. For example, FIGS. 6A and 6B illustrates an isometric view of a nozzle 600 with components that can be removably coupled. In this example, the components include a top casing 602 and a bottom casing 604 that can be removably coupled by a latching system 608. In the configuration of FIG. 6A, the top casing 602 and the bottom casing 604 are decoupled, while in the configuration of FIG. 6B the top casing and the bottom casing are coupled. When coupled, the top casing and the bottom casing form a nozzle housing. In various other configurations, the nozzle can include any number of casings (e.g., 1, 2, 3, . . . , n casings) that can be coupled in any number of relative orientations (e.g., top/bottom casings, front/back casings, left/center/right casings, etc.).

In the illustrated configuration, the top casing 602 can be configured with a fluid inlet 606 to allow treatment fluid to enter the nozzle 600 and the bottom casing 604 can be configured with any number of insert openings 612 (e.g., a fluid outlet) to allow treatment fluid to exit the nozzle 600. Further, the top casing 602 and the bottom casing 604 may include any number of additional components to create a fluid tight seal at the interface between the two casings, including, but not limited to, a gasket, an O-ring, a waterproof sealant, a waterproof tape, etc. In alternate configurations, the top casing 602 and the bottom casing 604 can be configured such that they form a fluid tight seal when mechanically coupled. Structurally, the top casing and the bottom casing include any one of the following materials: corrosion resistance steels, plastics, ceramics, etc.

In various configurations, the latching system 608 includes, but is not limited to, a latch system, a lock mechanism, a physical alignment of the top casing with the bottom casing, a semi-removable compliant seal material, a bolt system, one or more screws, pins, clamps, or fasteners. The illustrated configuration includes a latch system 608 in which the top casing 602 includes one or more ridges 620 along an edge of the top casing 602 and one or more clasps 622 along an edge of the bottom casing 604. The ridges 620 and clasps 622 are configured to mechanically couple, or decouple, the top casing 602 and the bottom casing 604. In this example, the latching system 608 creates a fluid tight seal 614 between the top casing 602 and the bottom casing 604 when the two are mechanically coupled. In some embodiments, the ridges 620 and clasps 622 are in a one to one ratio, but can be in any other ratio such as, for example, one clasp for every two ridges. Configurations including an alternative latching mechanism may function similarly, but differ structurally.

Figure 6C:
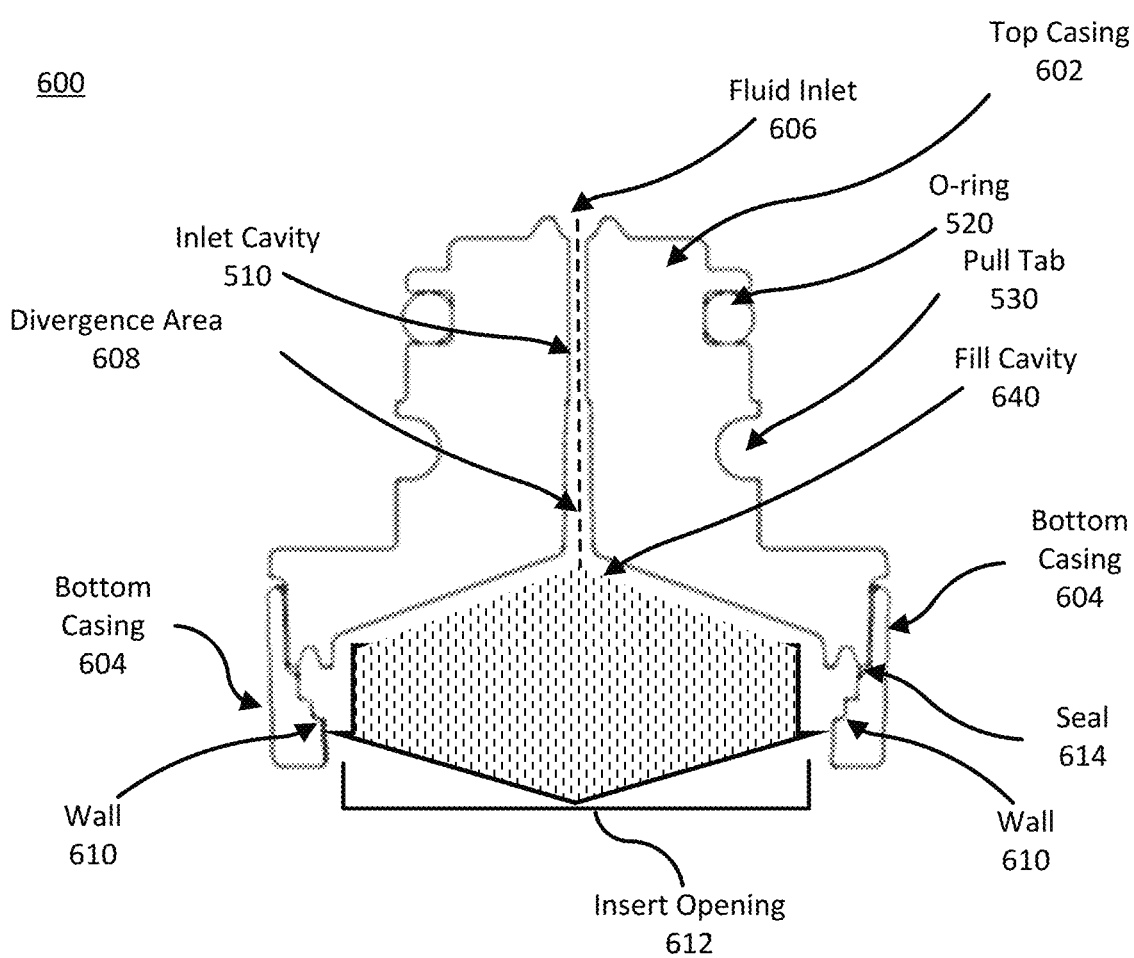
FIG. 6C illustrates a cross-sectional view of a nozzle, in one example embodiment.

FIG. 6C illustrates a cross-sectional view of the nozzle 600 used by the system, according to one embodiment. The nozzle housing consists of the top casing 602 coupled to the bottom casing 604. As described in reference to FIG. 5D-5E, the components of the nozzle have a bottom side (e.g. the bottom of the page in the orientation of FIG. 6B) and a top side (e.g. the top of the page in the orientation of FIG. 6B).

The top casing 602 includes components similar to the nozzle head 502 and the nozzle body 504 described in FIG. 5A and FIG. 5B. For example, similar to the nozzle inlet 512, the fluid inlet 606 fluidically couples the nozzle 600 to a valve assembly of a nozzle manifold such that treatment fluid flowing from a fluid reservoir fluidically coupled to the nozzle manifold enters the nozzle 600 through the fluid inlet 606. The section of the top casing 602 surrounding the fluid inlet 606 is structured such that the fluid inlet 606 may be coupled to the valve assembly. The fluid inlet is coupled to the valve assembly when a pressure is applied to the bottom side of the top casing 602 or nozzle housing. The coupling forms a fluid tight seal between the valve assembly and the nozzle 600.

The top casing 602 and fluid inlet 606 are similar to the nozzle head and nozzle inlet 512. That is, the structure of the top casing 602 and fluid inlet 606 form an inlet cavity 610 centered on a nozzle midline. However, in various configurations, the fluid inlet of FIG. 6A may be configured differently compared to the fluid inlet off FIG. 5B. Within the top casing 602, the inlet cavity 510 extends from the fluid inlet 606 on the top side of the top casing 602 to a divergence area 608 on the bottom side of the top casing 602. The inlet cavity 510 fluidically couples the fluid inlet 606 to the divergence area 508. The inlet cavity 510 extends between the fluid inlet 606 and the fill cavity 540 by centering the aforementioned components about the nozzle midline. The fill cavity 540 in FIG. 6 functions similarly to that of FIG. 5, although the dimensions may be dissimilar.

The bottom casing 604 includes components similar to the nozzle body 504 and nozzle tail 506 as described in FIGS. 5A and 5B. When the top casing 602 couples to the bottom casing 604, a fill cavity 540 is formed inside of the nozzle housing. The top side of the bottom casing 604 couples to the bottom side of the top casing 602 to form the nozzle hosing via the latching mechanism 608. The bottom casing 604 is similarly shaped to a rectangular prism having a bottom face and without a top face. The four walls 610 of the prism couple to the bottom side of the top casing by the latching mechanism 608 to form the fill cavity 540. The bottom face of the prism includes one or more insert openings 612 through which treatment fluid exits the nozzle from the fill cavity 540.

In the illustrated example, treatment fluid entering from the fluid inlet 606 collects within the fill cavity 540 before existing the nozzle housing through one or more insert openings 612. The insert opening 612 can be one or more through holes through the bottom face of the bottom casing 604. Generally, the insert openings 612 are oriented orthogonal to the plane of the crop field such that treatment fluid moves from the nozzle outlets to the crops in the field. Generally, the insert openings 612 approximate the length of the bottom casing 604. Therefore, in general, increasing the length of the nozzle 600 increases the number (or size) of insert openings 612 and allows each nozzle 600 to spray treatment fluid on a larger area. In implementations in which the bottom casing 604 includes multiple insert openings, the multiple insert openings may share a consistent shape and size or, alternatively, may vary in shape and size.

Generally, a nozzle housing includes two axes: a long axis running parallel to the line of insert openings 612 and a short axis running perpendicular to the line of insert openings 612. As referenced herein, for all components, measurements along the long axis of refer to a length and measurements along the short axis refer to a width.

The cross-section of FIG. 6C also illustrates the flow of treatment fluid through the nozzle 600. In the illustrated example, the treatment fluid (dashed arrows and dash filled arrows) enters the nozzle 600 through the fluid inlet 606 from a valve assembly. The treatment fluid enters the inlet cavity 510 via the fluid inlet 606 and flows from the inlet cavity 510 to the divergence area 608. The treatment fluid continues to flow through the nozzle 600 and into the fill cavity 540. The treatment fluid then exits the nozzle 600 through the insert openings 612. In the illustrated configuration, the treatment fluid expands from a small stream within the inlet cavity 510 to a wide spray as it travels out of the nozzle 600 through the divergence area 608, the fill cavity 540, and insert opening 612.

Because of the structure of the nozzle and, more specifically, the integration of the insert openings 612 into the bottom face of the bottom casing 604, a single nozzle 600 is only capable of dispensing treatment fluid in a single spray pattern. Additionally, the flow treatment fluid exiting from the insert openings cannot be manipulated, shaped, configured, channeled, etc. ("manipulated" hereafter, in aggregate) through the fluid cavity as it exits the nozzles. Thus, a nozzle that includes a component that allows the treatment fluid to be manipulated can be beneficial.

Figure 6D:
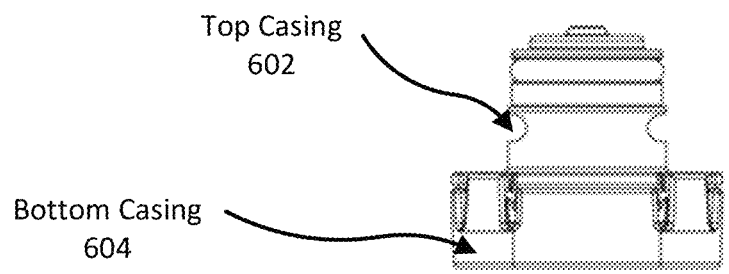
FIG. 6D illustrates a front view of a nozzle with a coupled top casing and bottom casing, in one example embodiment.
Figure 6E:
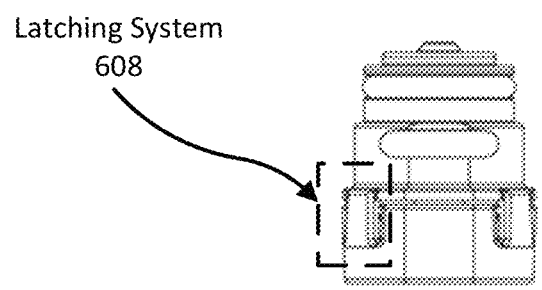
FIG. 6E illustrates a side view of a nozzle with a coupled top casing and bottom casing, in one example embodiment.
Figure 6F:
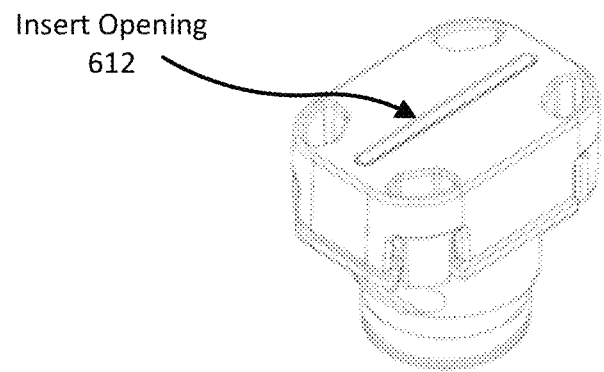
FIG. 6F illustrates an inverted, isometric view of a nozzle, in one example embodiment.
Figure 7A:
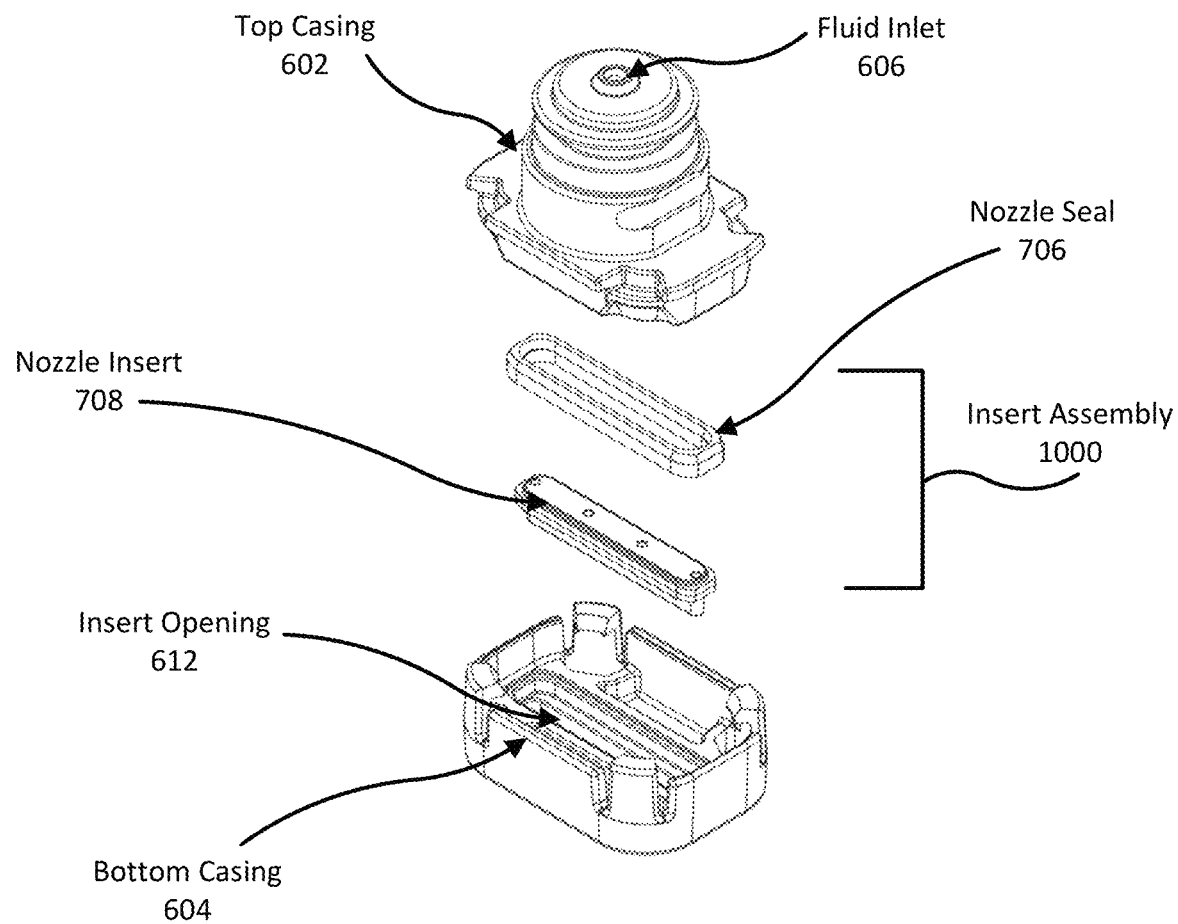
FIG. 7A illustrates an isometric view of the components of a narrow nozzle, in one example embodiment.
Figure 7B:
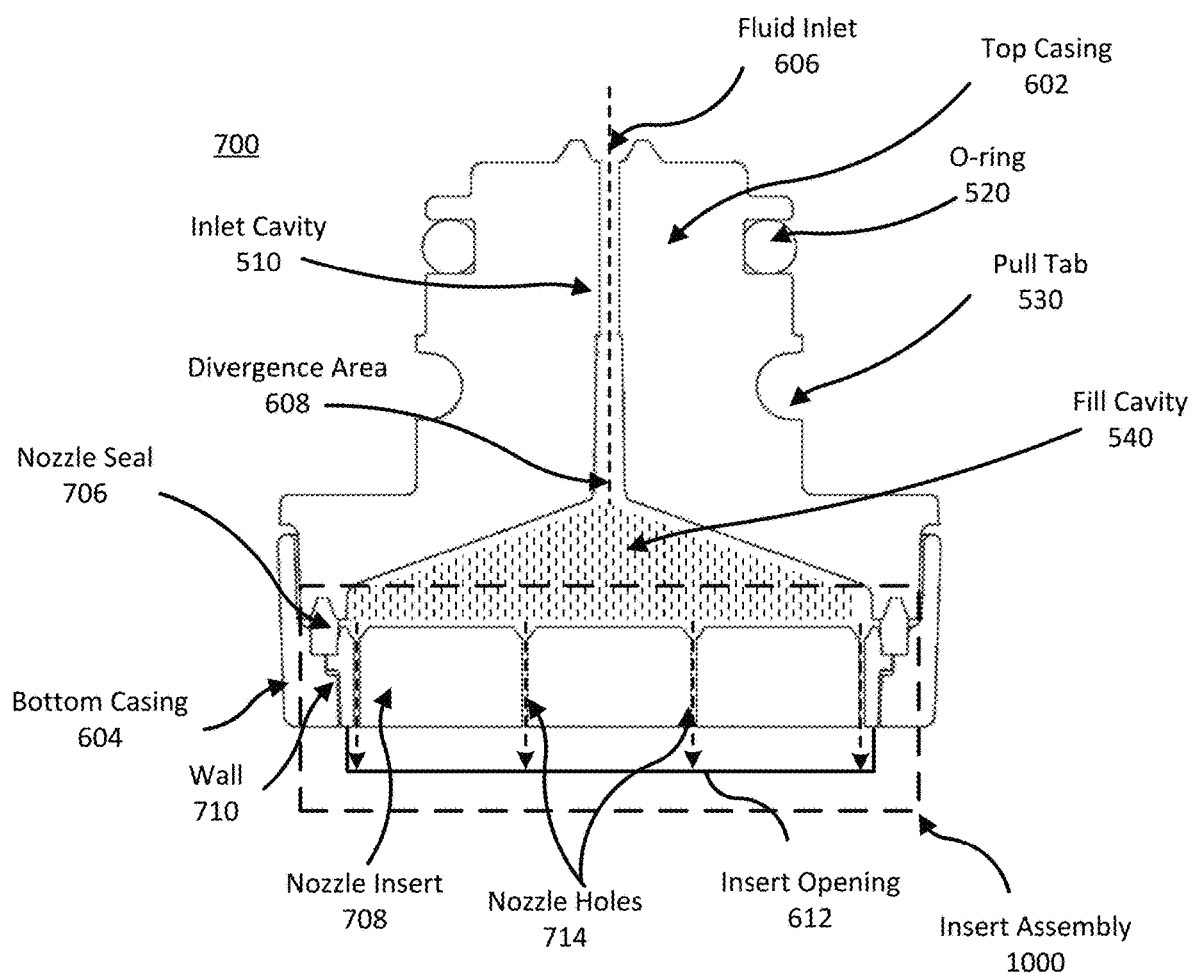
FIG. 7B illustrates a cross-sectional view of a narrow nozzle including an insert assembly, in one example embodiment.

FIG. 6D and FIG. 6E, respectively, show a front view and a side view of the nozzle 600 with a coupled top casing 602 and the bottom casing 604. In the illustrated configuration, the latching system 608 demonstrates the latches of the bottom casing 604 clamped to the ridges of the top casing 602. FIG. 6F illustrates an inverted, isometric view of the nozzle 600 to visualize the bottom face of the bottom casing 604 and the insert opening 612. While, here, the insert opening 612 is shown as a single through-hole, the insert opening 612 can include any number of through-holes of various size and positon.

In some implementations, the nozzle 600 can be disassembled and reassembled with a different bottom casing capable of a different spray pattern. However, in some configurations, a bottom casing can be a relatively expensive part to manufacture and, therefore, a different method of obtaining different spray patterns is beneficial. Additionally, designing bottom casings that are easy to manufacture while reliably spraying different patterns of treatment fluid on plants is a challenging problem. To improve control over the spray pattern and flow of treatment fluid through the nozzle, an alternate configuration for a nozzle can include an insert assembly positioned within the nozzle housing. Further, configurable nozzle inserts allow for rapid prototyping of nozzle inserts with different fluid pathways through the nozzle insert ("nozzle orifices"). In general, being able to incrementally and rapidly change a nozzle orifice allows for a more efficient evolution of farming machine spray patterns. For example, FIG. 7A illustrates an isometric view of the components for the narrow nozzle 700 with replaceable nozzle inserts, according to an example configuration. In various examples, a nozzle insert may have a width between 0.5 inches and 2.5 inches, where the width is measured along the long axis of the nozzle insert. The configuration includes a top casing 602, a bottom casing 604, a nozzle seal 706 and a nozzle insert 708. The nozzle seal 706 and nozzle insert 708 are collectively referred to as the insert assembly 1000. The components of the insert assembly are described in further detail in reference to FIGS. 8-10.

The top casing 602 and bottom casing 604 are largely similar to those described in reference to FIG. 6A. The top casing 602 includes a fluid inlet 606 through which treatment fluid enters the narrow nozzle 700. The bottom casing 604 includes an insert opening 612 through which treatment fluid exits the narrow nozzle 700. The fluid inlet is surrounded by a ridge that is used as a valve poppet seal face when coupling a nozzle to a valve assembly. The top casing also includes an O-ring to form a fluid tight seal to the valve assembly. Further, the O-ring rests inside a travel stop ridge that further acts to couple the top casing to the valve assembly.

When coupled, the top casing 602 and the bottom casing 604 create a fluid tight seal at the interface between the two casings as described above. When the top casing 602 couples to the bottom casing 604, a fill cavity 540 is formed inside of the nozzle housing. In the context of FIG. 7A, the fill cavity is configured to contain the insert assembly 1000.

The bottom face of the bottom casing 604 includes an insert opening 612 through which the treatment fluid exits the nozzle. Consistent with the orientation and description above, the insert opening 612 is one or more through holes in the bottom face of the bottom casing that fluidically couples the fill cavity 540 to the external environment and allows treatment fluid to exit the narrow nozzle 700. Each insert opening 612 can be structured such that at a least some portion of the insert assembly 1000 may couple to the bottom casing 604. In the illustrated example of FIG. 7A, the insert opening 612 includes an interior rim near the bottom side of the bottom casing 604 that extends towards the middle of the insert opening 612. The rim is structured such that elements of the insert assembly 1000 can mechanically couple to the bottom casing 604 and prevent those elements from slipping in the fill cavity 540, or falling out of the nozzle housing via the insert opening 612. In some embodiments, the nozzle seal may be permanently coupled to the top housing.

FIG. 7B illustrates a cross-sectional view of the narrow nozzle 700 including an insert assembly 1000, according to one embodiment. Similar to the nozzle 600 described in FIG. 6C, the nozzle housing consists of the top casing 602 and the bottom casing 604. The fluid inlet 606 fluidically couples the narrow nozzle 700 to the valve assembly such that treatment fluid flowing from the fluid reservoir enters to the narrow nozzle 700 through the fluid inlet 606. The section of the top casing 602 surrounding the fluid inlet 606 is designed such that the fluid inlet 606 may be coupled to the valve assembly by applying pressure on the bottom face of the top casing 602, or nozzle housing, to form a fluid tight seal. The bottom casing 604 includes components similar to the nozzle body 504, the nozzle tail 506 described above. When the top casing 602 couples to the bottom casing 604, a fill cavity 540 is formed inside of the nozzle housing. Treatment fluid entering from the fluid inlet 606 travels down the inlet cavity 510, exits through the divergence area 608, and collects in the fill cavity 540 to be dispensed. From the fill cavity 540, the treatment fluid is directed through the nozzle insert 708 to the insert openings 612 where it exits the nozzle insert 708.

Generally, the treatment fluid is channeled through the nozzle orifices 714 of the nozzle insert 708 at a specific volume and flow rate controlled by the valve assembly. The structure of the nozzle orifices 714, the structure of the insert opening 612, the volume of treatment fluid entering the narrow nozzle 700, and the flow rate of treatment fluid entering the nozzle affect the spray pattern of the narrow nozzle 700. Increasing the length of the narrow nozzle 700 may increase the number of insert openings 714 and/or the number of nozzle inserts 708, allowing the narrow nozzle 700 to spray treatment fluid over a larger area with more control and accuracy. In implementations in which the bottom casing 604 includes multiple insert openings, the multiple insert openings may share a consistent shape and size or, alternatively, may vary in shape and size. Additionally, the nozzle inserts 708 in each insert opening can be similarly or, alternatively, dissimilarly shaped. Similarly, the nozzle orifices of each nozzle insert can be similar or different. Accordingly, the spray pattern for each insert opening 612 can be different.

FIG. 7B also illustrates the flow of treatment fluid through the narrow nozzle 700. In the illustrated example, the treatment fluid (dashed arrows and dash filled arrows) enters the narrow nozzle 700 through the fluid inlet 606 from a valve assembly and system pressure. The treatment fluid enters the inlet cavity 510 via the fluid inlet 606 and flows from the inlet cavity 510 to the divergence area 608. The treatment fluid continues to flow through the narrow nozzle 700 and into the fill cavity 540. For example, the treatment fluid expands from a small stream within the inlet cavity 510 to a volume within the fill cavity 540. Here, rather than directly exiting the nozzle through the insert opening 612 as in FIG. 6C, the treatment fluid flows through the nozzle orifices 714. The structure of the nozzle orifices 714 can manipulate the spray pattern of the narrow nozzle 700. For example, rather than exiting as a single stream through the insert opening as in FIG. 6C, the treatment fluid exits the nozzle in a spray pattern including numerous small streams.

FIGS. 8A-10C illustrate components of the insert assembly 1000, how those components couple to one another, and how the insert assembly couples to the nozzle housing. In various configurations all of the components of the insert assembly are decouplable and interchangeable. In other cases, some, or all, of the components may be permanently coupled. In various configurations, any number of the components of the insert assembly 1000 may be removably couple to the nozzle housing. Similarly, any number of the components of the insert assembly may be permanently coupled to the nozzle housing.

Figure 8A:
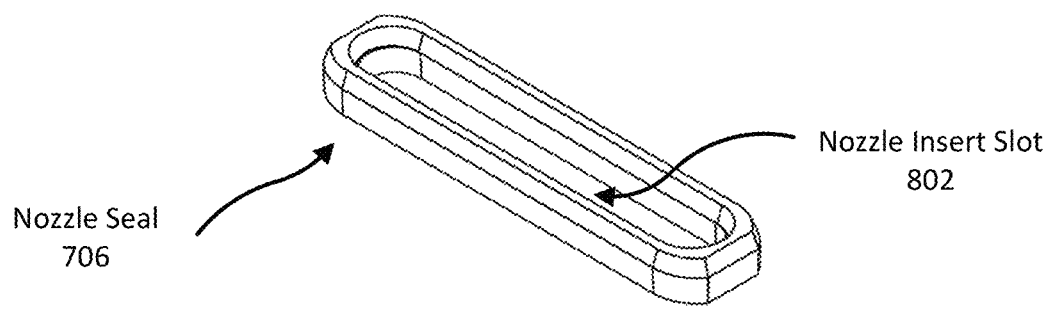
FIG. 8A illustrates an isometric view of a nozzle seal for a narrow nozzle, in one example embodiment.
Figure 8B:
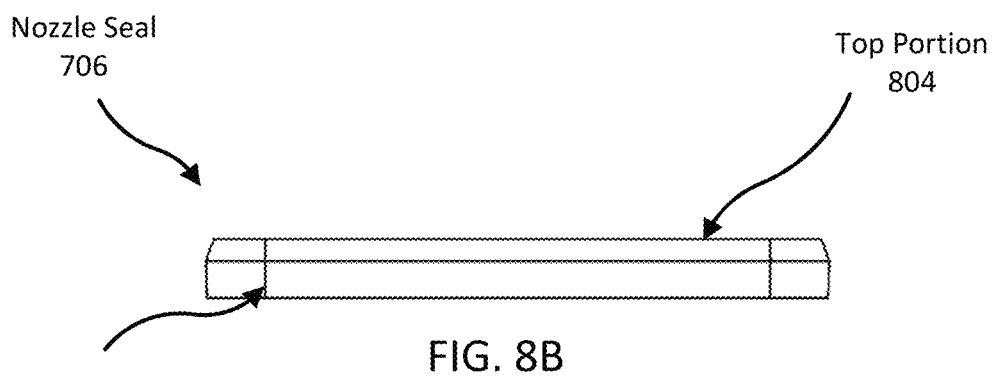
FIG. 8B illustrates a side view of a nozzle seal for a narrow nozzle, in one example embodiment.

FIGS. 8A and 8B, respectively, show an isometric view and a side view of the nozzle seal 706. The nozzle seal 706 is a three-dimensional structure with a length equivalent or less than that of the bottom casing 604. The nozzle seal provides a seal between the top casing 602, the nozzle insert 708, and the bottom casing 604. The nozzle seal 706 includes a hollowed interior referred to as a nozzle insert slot 802. The nozzle seal 706 includes chamfered edges with the nozzle insert slot 802 having similarly chamfered edges reflective of the shared boundary between the nozzle seal 706 and the nozzle insert slot 802. The nozzle seal 706 can be divided into two halves: a top portion 804 and bottom portion 806. The top portion forms a fluid tight seal when in contact with the top casing. The length and width of the top portion 804 are smaller than those of the bottom portion 806 such that the edges connecting the two portions stand at an acute angle to the long axis of the bottom portion 804.

Figure 8C:
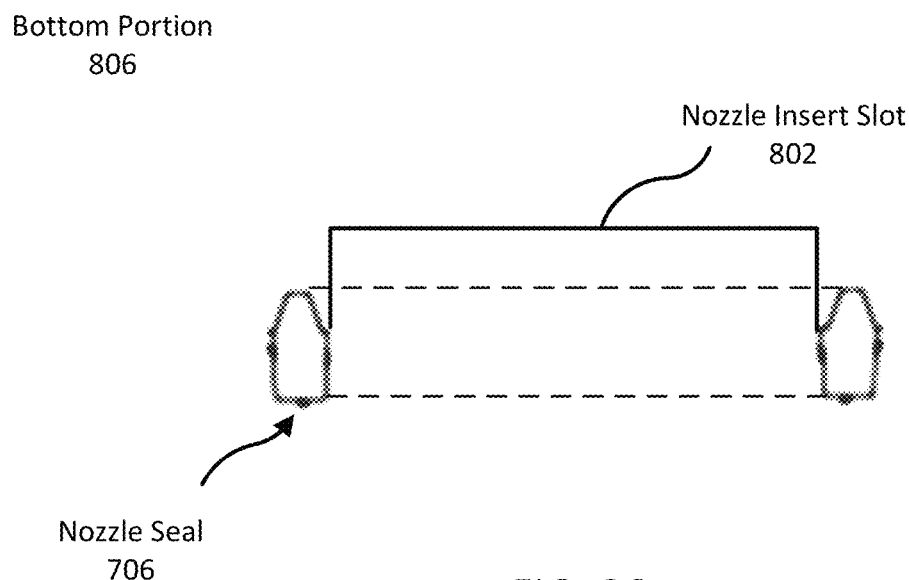
FIG. 8C illustrates a cross-sectional view of a nozzle body to nozzle insert seal for a narrow nozzle, in one example embodiment.

FIG. 8C illustrates a cross-sectional view of the nozzle seal 706 including the nozzle insert slot 802. The dashed lines in FIG. 8C represent the edges of the nozzle insert slot 802 which accommodate the nozzle insert 708 when coupled. As suggested by the illustrations of the nozzle seal 706, each nozzle insert slot 802 is a through hole extending from the top portion 804 of the nozzle seal to the bottom portion 806 of the nozzle seal. Generally, the length of the nozzle insert slot 802 is greater than the width of the nozzle insert slot. Both the length and width of the nozzle insert 708 is similar, if not identical, to the length and width of the insert openings over the same axes.

Figure 9A:
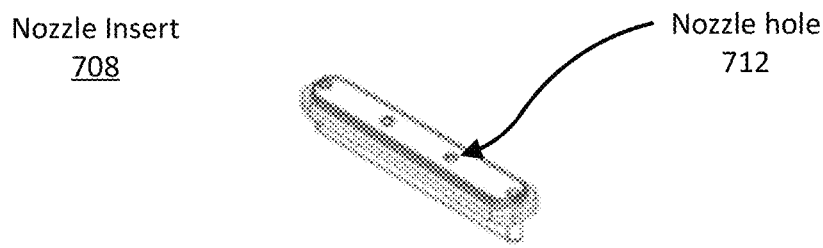
FIG. 9A illustrates an isometric view of a nozzle insert for a nozzle, in one example embodiment.
Figure 9B:
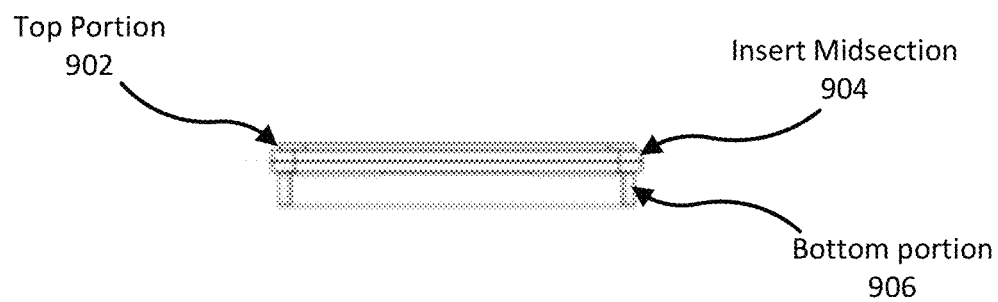
FIG. 9B illustrates a side view of a nozzle insert for a nozzle, in one example embodiment.

At each of the nozzle insert slots 802, a nozzle insert 708 couples to the nozzle seal 706 to form the insert assembly 1000. FIGS. 9A and 9B, respectively, show an isometric and side view of the nozzle insert. The nozzle insert 708 is a three dimensional structure comprised of the three regions: a top portion 902, a bottom portion 906, and a midsection 904 separating the two portions. The midsection may, or may not have, a width and a length greater than that of either the top portion 902 or the bottom portion 906. The top portion 902 may, or may not have, a width and length greater than that of the bottom portion. The top portion is substantially similar in shape to the corresponding nozzle insert slot 802 of the nozzle seal 706. Specifically, the top portion 902 is substantially rectangular with curved edges proportional to the shape of the nozzle insert slot 802. Therefore, the top portion of the nozzle insert 708 forms a liquid tight seal when in coupled to the bottom portion of the nozzle seal 706. The bottom portion 906 is substantially similar in shape to the corresponding insert opening 612.

Figure 9C:
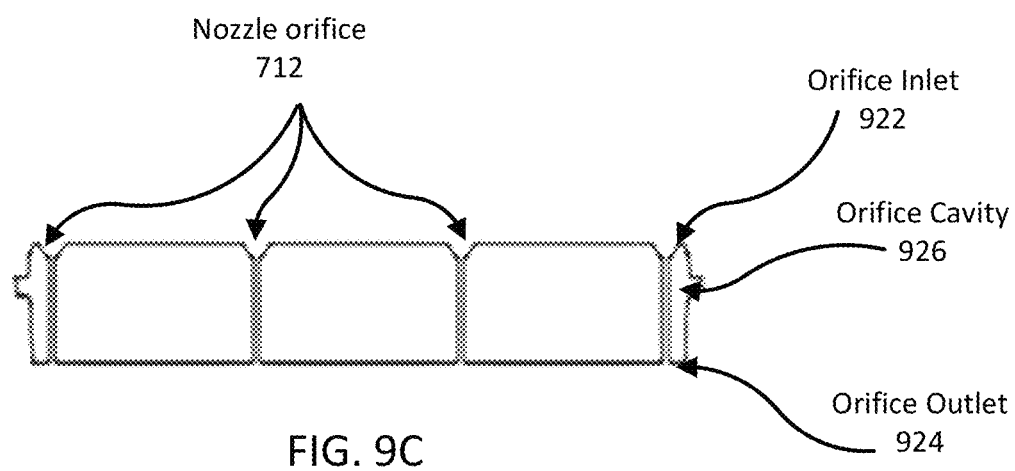
FIG. 9C illustrates a cross-sectional view of a nozzle insert for a nozzle, in one example embodiment.

FIG. 9C illustrates a cross-sectional view of the nozzle insert. As described above, each nozzle insert 708 includes several nozzle orifices 714 extending from the top portion 902, through the midsection 904, and to the bottom portion 906. When the nozzle seal 706 is coupled to the nozzle insert 708, the only way for fluid to move from the fluid inlet 606 to the insert opening 612 is through the nozzle orifices.

For each nozzle orifice 712, the top side includes a circular opening at the end of a cylindrical feature, referred to as a hole inlet 922. Similarly, a hole outlet 924 refers to a circular, or elliptical, opening at the bottom end of the cylindrical feature. The proximal sidewalls of the cylindrical annulus form a nozzle cavity through which treatment fluid flows towards the insert openings 712. The nozzle cavity 926 extends between the hole inlet 922 and the hole outlet 924. The nozzle orifices 712 fluidically couple the top casing and the bottom casing by channeling treatment fluid from the fill cavity 540 towards the insert opening 612. The nozzle orifices 714 may be positioned equidistant across the nozzle insert 708 to produce a uniform flow of treatment fluid to the insert opening 612. To that end, the number of nozzle orifices 714 may be proportional to the number of insert openings 712.

The number, shape, and positioning of the nozzle orifices 714 included in a nozzle insert 708 can manipulate one or more characteristics of the treatment fluid exiting the nozzle through the insert openings. Examples of such characteristics include, but are not limited to, the spray pattern of treatment fluid exiting the nozzle, the droplet size of the treatment fluid exiting the nozzle, the flow rate of the treatment fluid exiting the nozzle, and the orientation of the treatment fluid exiting the nozzle.

Figure 10A:
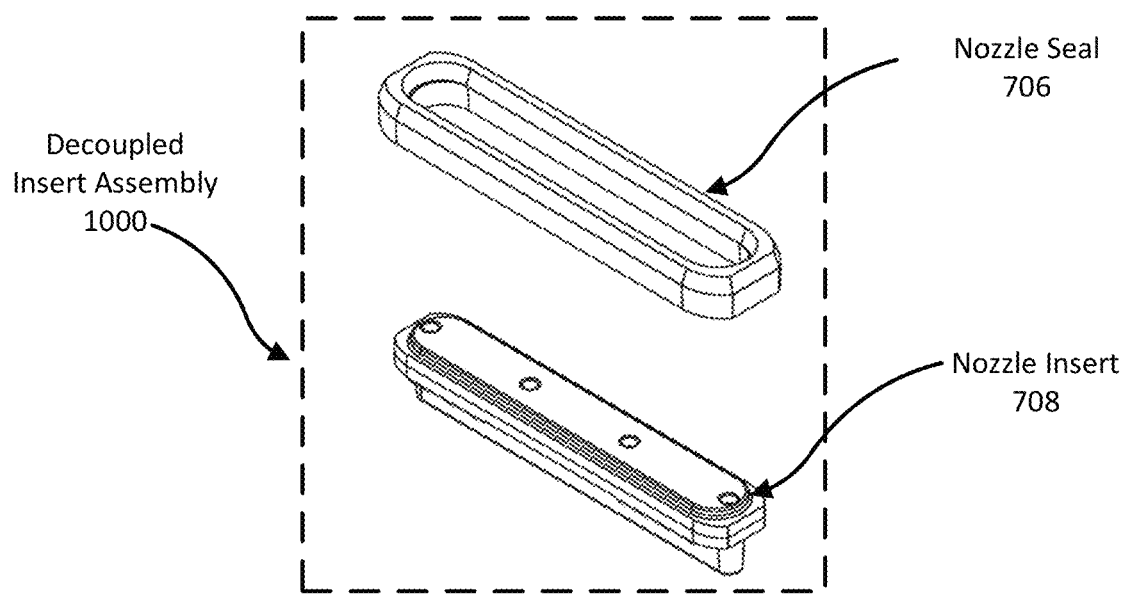
FIG. 10A illustrates an isometric view of decoupled components of an insert assembly for a narrow nozzle, in one example embodiment.
Figure 10B:
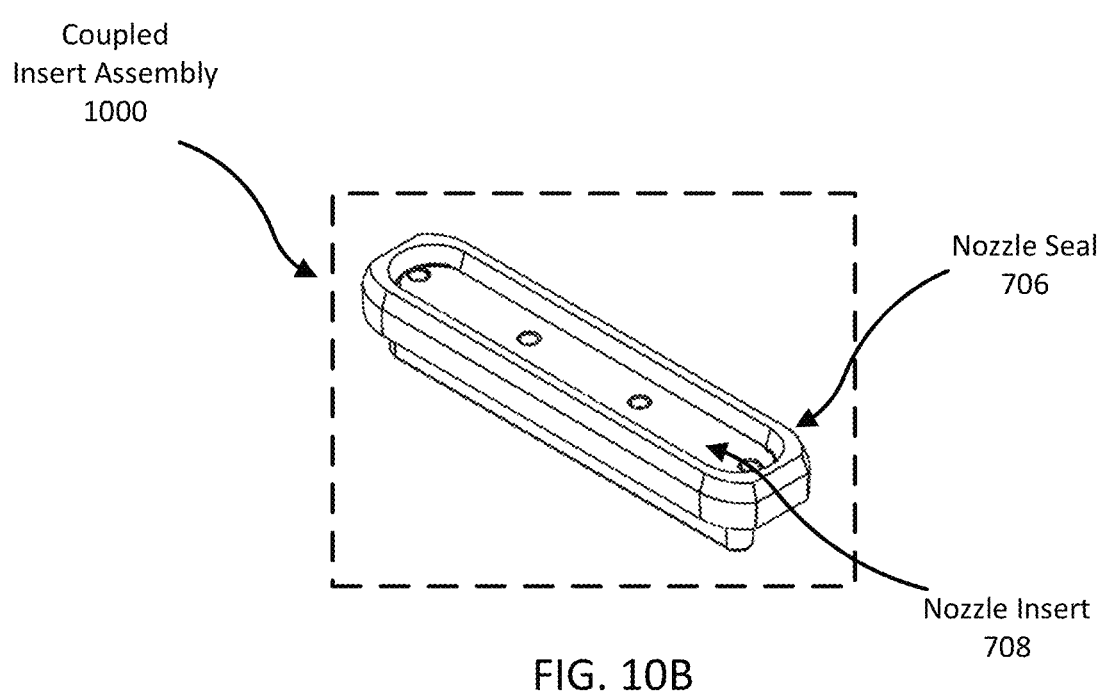
FIG. 10B illustrates an isometric view of insert assembly for a narrow nozzle, in one example embodiment.

FIG. 10A illustrates an isometric view of the insert assembly 1000 with the nozzle seal 706 and the nozzle insert 708 decoupled and FIG. 10B illustrates an isometric view of the insert assembly 1000 with the nozzle seal 706 and the nozzle insert 708 coupled. While not illustrated, in some cases the nozzle seal can be permanently coupled to the bottom side of the top casing 602. As described above, the top portion of the nozzle insert 708 (i.e., the half nearer the top of the page in the orientation FIG. 10A) couples with the bottom portion of the nozzle seal 706 (i.e., the half nearer the bottom of the page in the orientation of FIG. 10A) by fitting within the nozzle insert slot 802. By applying pressure to the bottom portion of the nozzle insert 708 and/or the top portion of the nozzle seal, a liquid tight seal forms at the interface between the exterior edges of the nozzle insert 708 and the interior edges of the nozzle seal 706. In one example, the pressure(s) can be applied when enclosing the insert assembly 1000 in the nozzle housing. When coupled, the nozzle orifices 714 of the nozzle insert 708 remain unobstructed such that treatment fluid can pass through the nozzle orifices. The length and width of the nozzle insert 708 are greater than those of the nozzle insert slot 802 such that, when coupled, the nozzle insert 708 does not pass through the nozzle insert slot 802.

Figure 10C:
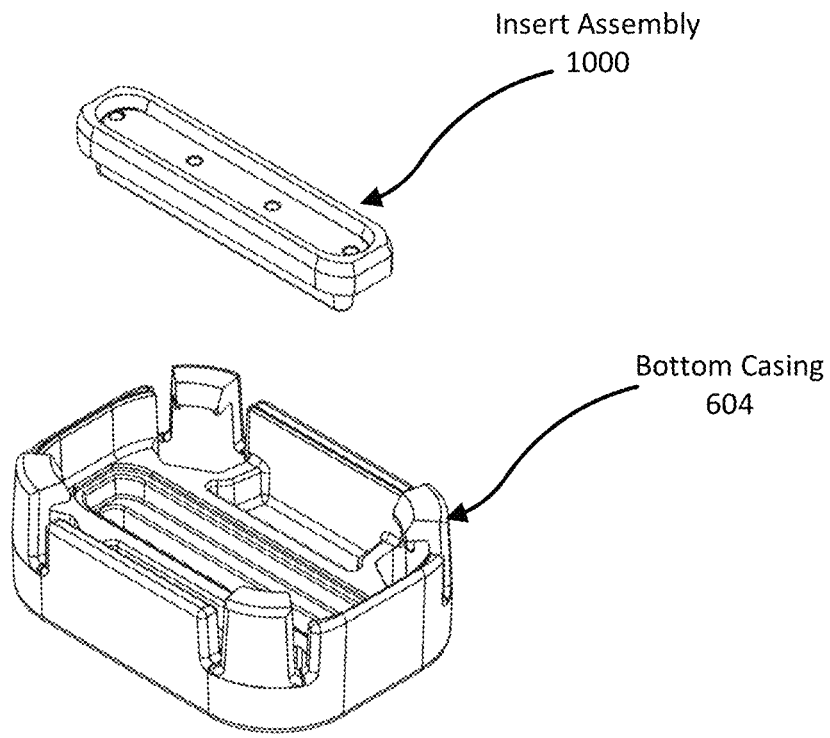
FIG. 10C illustrates an isometric view of a decoupled insert assembly and bottom casing for a narrow nozzle, in one example embodiment.
Figure 10D:
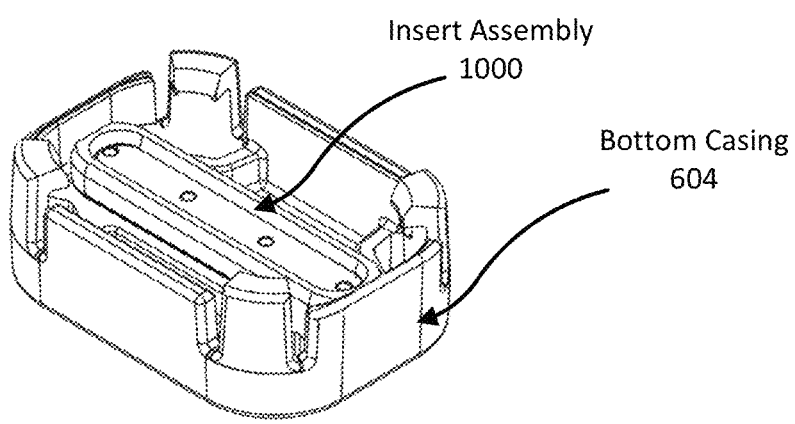
FIG. 10D illustrates an isometric view of a coupled insert assembly and bottom casing for a narrow nozzle, in one example embodiment.

FIG. 10C illustrates an isometric view of the insert assembly 1000 and bottom casing 604 decoupled and FIG. 10D illustrates an isometric view of the insert assembly 710 and the bottom casing 710 coupled. Again, while not illustrated, the nozzle seal of the insert assembly may be permanently coupled to the top casing 602. A fluidic coupling from the fill cavity (not shown) through the insert openings 712 is created when the bottom casing 604 and insert assembly 1000 are coupled. The fluidic coupling allows treatment fluid to flow through the insert assembly 1000 and bottom casing 604 towards plants in the field. As described above, the insert opening 612 includes a rim for coupling the nozzle insert 708, and thereby the insert assembly 1000, to the bottom casing 604. The depth of the rim may be equivalent or greater than the height of the nozzle insert 708. By applying pressure at the top portion of the insert assembly 1000 and/or the bottom face of the bottom casing 704, a liquid tight seal forms at the interface between the exterior edges of the nozzle insert 708 and the interior edges of the rim within the bottom casing 604. When coupled, the nozzle orifices 714 of the nozzle insert remain unobstructed to pass treatment fluid. The length and width of the nozzle insert 708 are greater than those of the rim of the bottom casing 604 such that, when coupled, the insert assembly 1000 does not exit the nozzle housing through the insert opening 612.

Figure 11A:
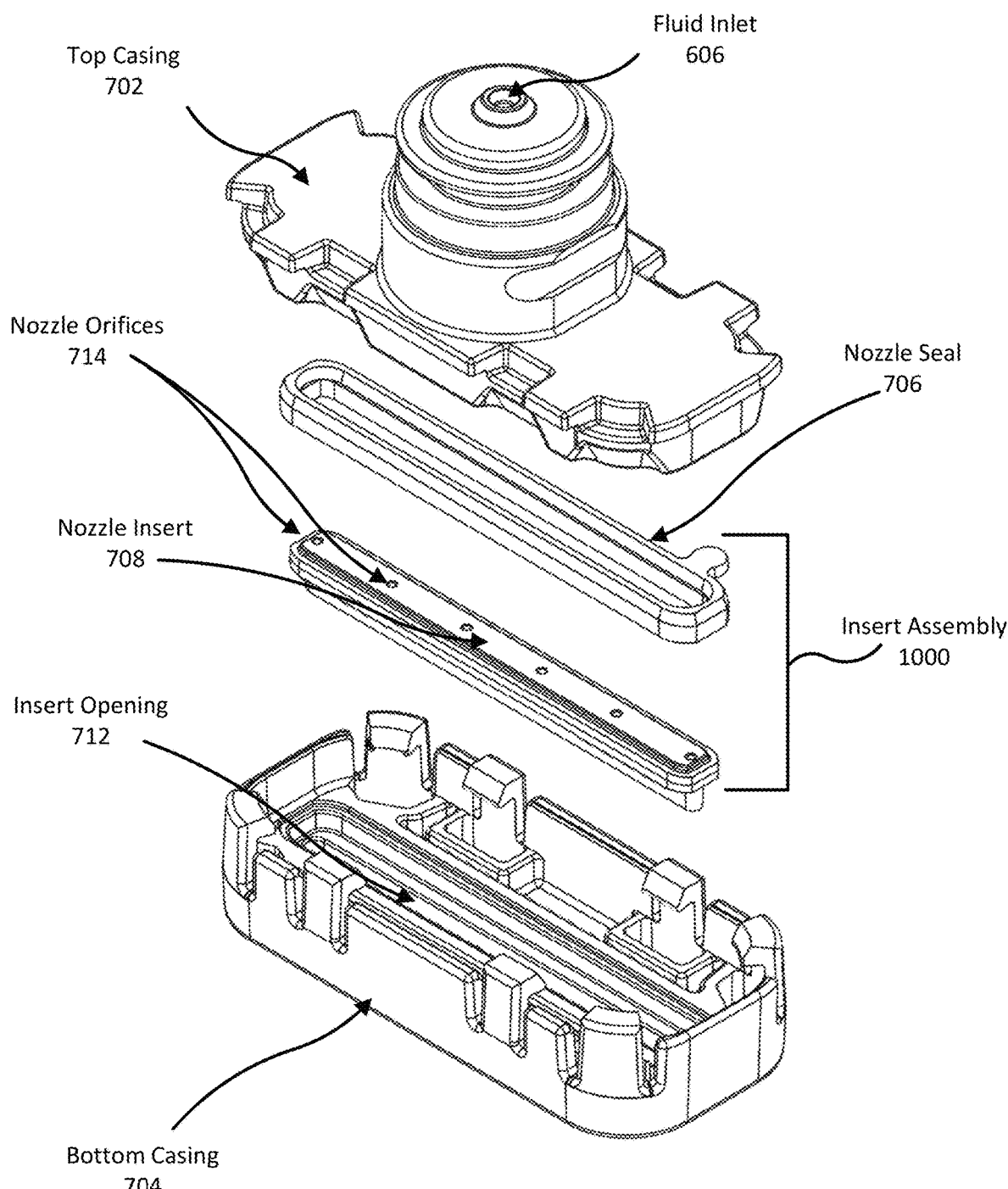
FIG. 11A illustrates an isometric view of the components of a medium nozzle, in one example embodiment.
Figure 11B:
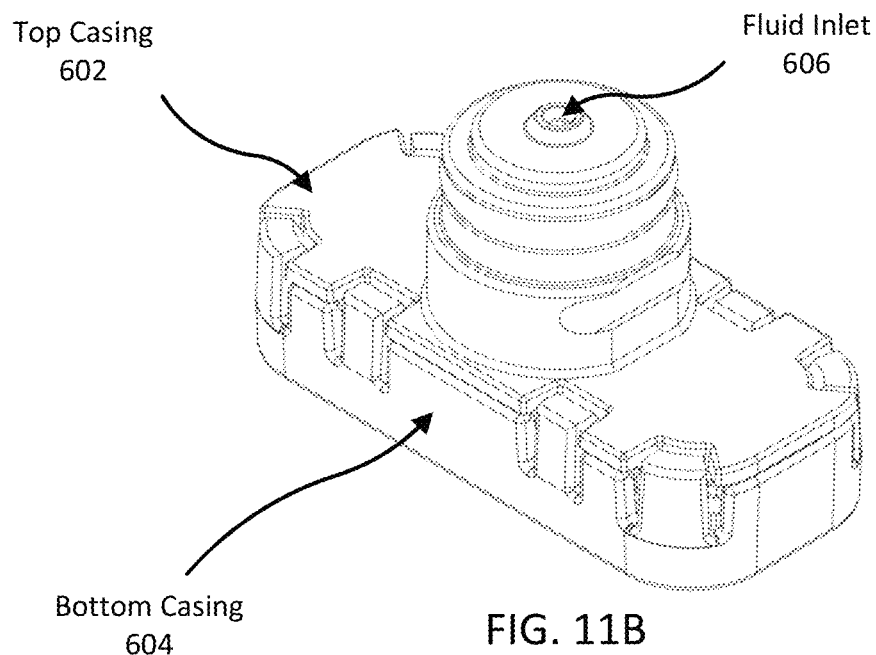
FIG. 11B illustrates an isometric view of a medium nozzle, in one example embodiment.
Figure 11C:
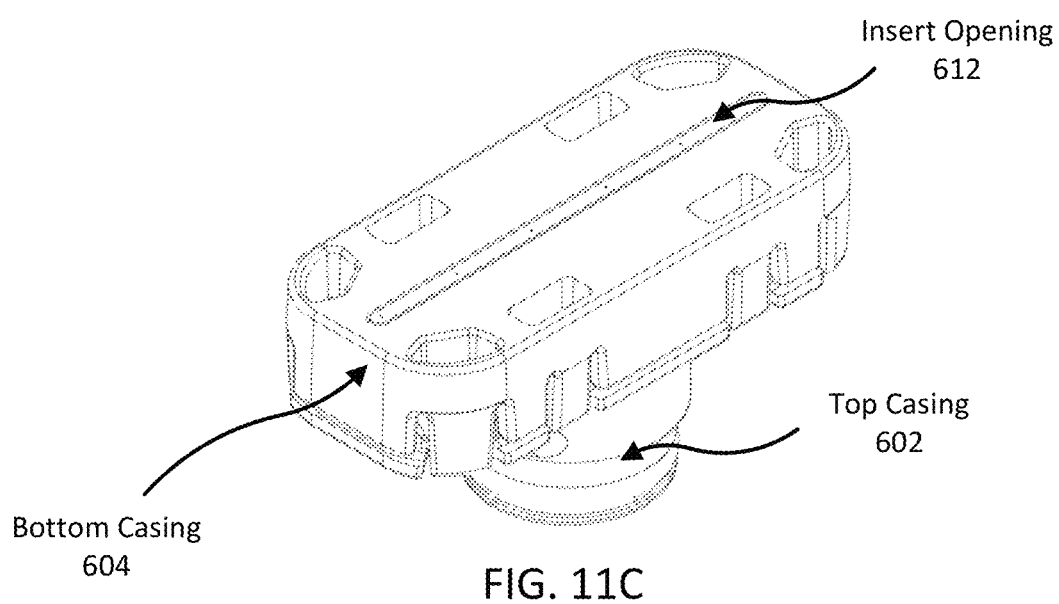
FIG. 11C illustrates an inverted, isometric view of a medium nozzle, in one example embodiment.

Configurations of the narrow nozzle 700 can be found in a variety of sizes, such as, for example, medium or wide nozzles. Between sizes, nozzles may differ in the lengths across the bottom casings. For example, a "narrow" nozzle can be approximately 1.25 inches in length, a "medium" nozzle can be approximately 2 inches in length, and a "wide" nozzle can be approximately 5 inches in length, or be any other appropriate length. In example, herein, FIGS. 7A-10D illustrate examples of a narrow nozzle 700, FIGS. 11A-11C illustrate examples of a medium nozzle 1100, and FIG. 12A-15F are examples of a wide nozzle 1200. In order to target a greater number of plants or a larger area of field with more control over the flow of treatment fluid, the large and medium nozzles include additional nozzle orifices compared to smaller nozzles. For example, as illustrated, the narrow nozzle 700 includes four nozzles holes 714 whereas the medium nozzle 1100 includes 6 nozzle orifices 714, and the wide nozzle 1200 includes 16 nozzle orifices 714.

FIG. 11A is an isometric view of a medium nozzle 1100. The medium nozzle 1100 is similar to the narrow nozzle 700. That is, the medium nozzle includes a top casing 702, a bottom casing 704, a nozzle seal 706, a nozzle insert 708, an insert opening 712, and a fluid inlet 606. Treatment fluid enters the fluid inlet 606 and exits the insert opening 712 similarly to the narrow nozzle 700. However, the insert opening 712 of the medium nozzle 1100 has greater length than the insert opening 612 of the narrow nozzle 700, and therefore a longer nozzle insert 708, insert assembly 1000, and a greater number of nozzles holes 714. FIG. 11B illustrates an isometric view of the medium nozzle 1100 and FIG. 11C illustrates an inverted isometric view of the medium nozzle 1100. Compared with similar views of the narrow nozzle 700 (FIG. 6D-6F), the top casing 602 and bottom casings 604 approximately are 0.75 inches greater in length than that of the narrow nozzle 700. While not illustrated, in some embodiments, the nozzle seal may be permanently coupled to the top casing.

Figure 12A:
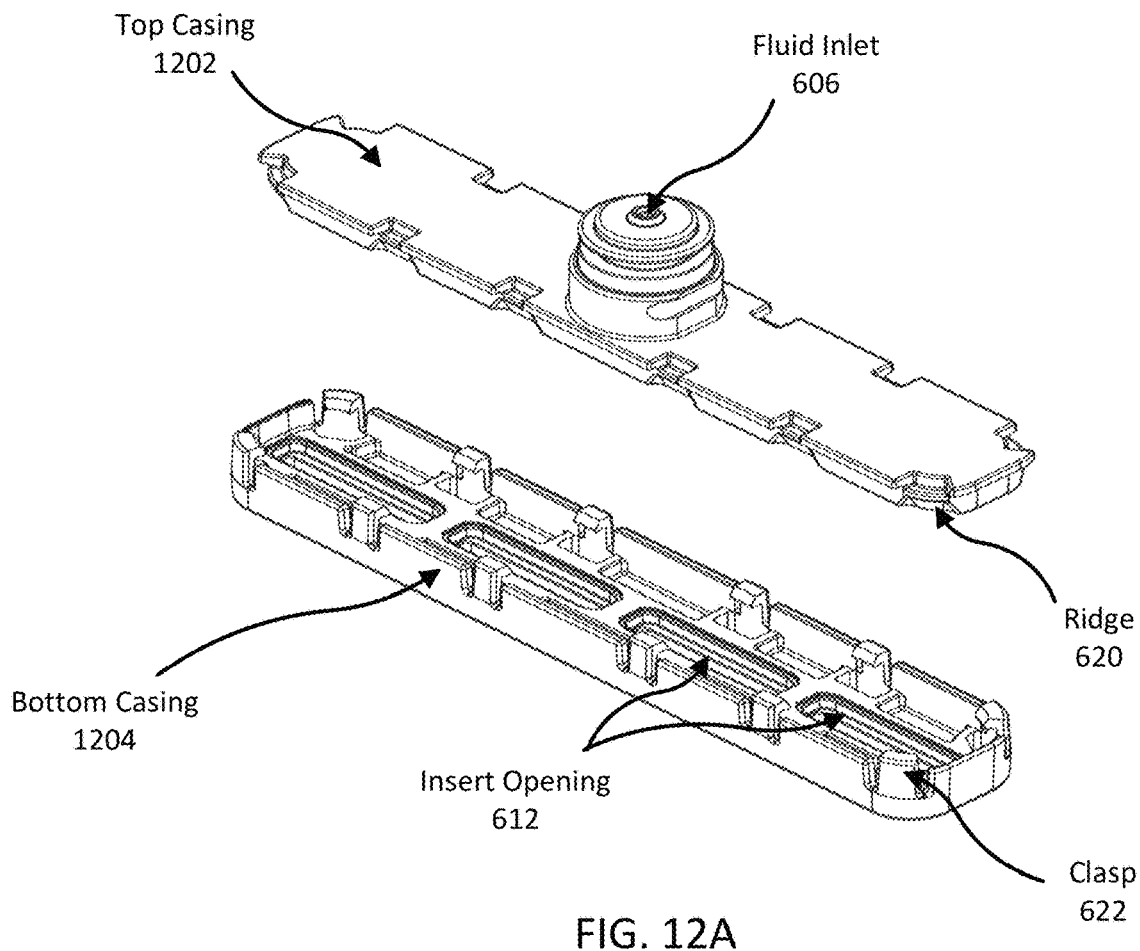
FIG. 12A illustrates an isometric view of a separated top casing and bottom casing of a wide nozzle, in one example embodiment.
Figure 12B:
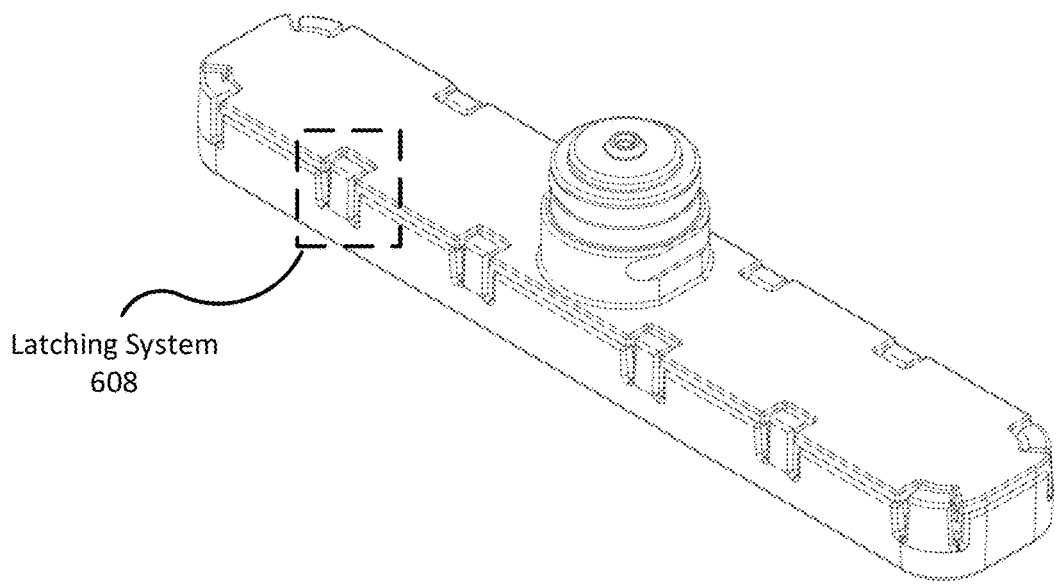
FIG. 12B illustrates an isometric view of a coupled top casing and bottom casing of a wide nozzle, in one example embodiment.
Figure 12C:
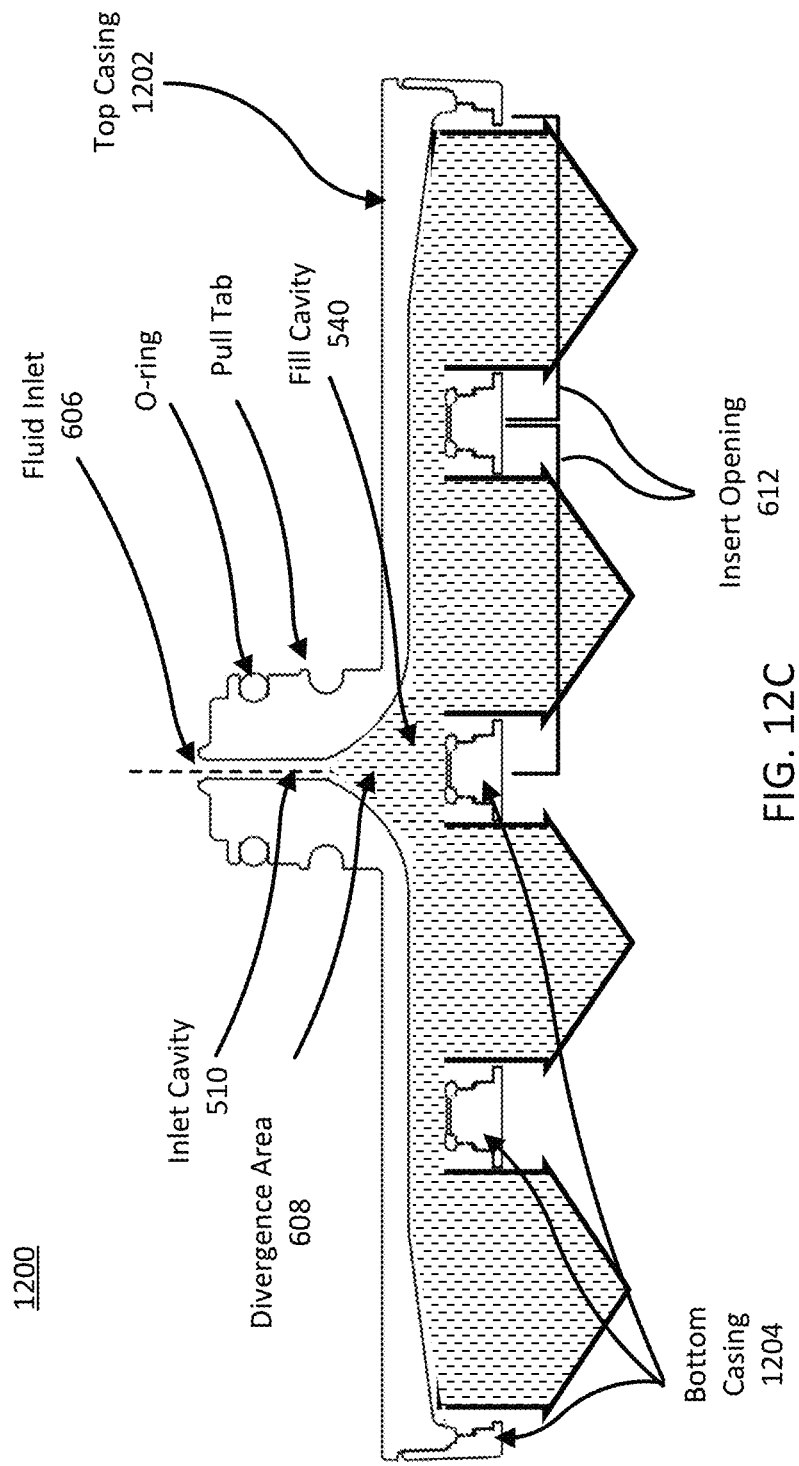
FIG. 12C illustrates a cross-sectional view of a wide nozzle without an insert assembly, in one example embodiment.

Notably, both the narrow nozzle 700 and the medium nozzle 1100 include only a single nozzle insert with a different number of nozzle orifices and, correspondingly, a single insert opening 612. However, beyond a certain length, larger nozzles can include multiple nozzle inserts 708 and insert openings 612 to channel the flow of a larger amount of treatment fluid. For example, FIG. 12A-12C illustrate a wide nozzle with multiple nozzle inserts. FIG. 12A illustrates an isometric view of a top casing 1202 and a bottom casing 1204 of a wide nozzle decoupled from one another and FIG. 12B illustrates an isometric view of the same wide nozzle with the top casing 1202 coupled to the bottom casing 1204. FIG. 12C illustrates a cross-sectional view of the bar wide nozzle 1200 without an insert assembly.

The exterior of the top casing 1202 of the wide nozzle 1200 is similar to the top casing 602 of the narrow nozzle 700. As described in reference to the top casing 602 of the narrow nozzle 700, the top casing 1202 includes a similarly structured fluid inlet 60446 through which treatment fluid enters the nozzle. When coupled, the top casing 1202 and the bottom casing 1204 create a fluid tight seal at the interface between the two casings and the inserts via the seal when mechanically coupled. As with the narrow nozzle 700 and the medium nozzle 1100, the wide nozzle 1200 includes any one of the following materials: plastics, ceramics, or any other overmoldable seal materials.

The exterior of the wide nozzle 1200 includes a latching system 608 for coupling the top casing 1202 to the bottom casing 1204. The latching system 608 is similar to the latching system 608 as described in regards to the narrow nozzle 700. That is, the illustrated configuration includes a latch system 608 in which the top casing 602 includes one or more ridges along an edge of the top casing 602 and one or more clasps along an edge of the bottom casing 604. The ridges and clasps are configured to couple the top casing to the bottom casing when mechanically coupled (e.g., pressed/snapped together).

The bottom casing 1204 includes components similar to the bottom casing 604 of the narrow nozzle 700 as described above. That is, the top casing 1202 couples to the bottom casing 1204 to form a fill cavity 540 inside of the nozzle housing within which an insert assembly can be contained. The four walls surrounding the absent top face of the bottom casing 1204 couples to the edges of the bottom face of the top casing 1202. The bottom face of the bottom casing 1204 includes the insert openings 712. Compared to the bottom casing 604 of the narrow nozzle 700 and medium nozzle 1100, the wide nozzle 1200 includes multiple insert openings 612. For example, FIGS. 12A-12C include four insert openings but can include any number of insert openings 612. Each of the insert openings 612 is largely similar to the insert openings 612 as described above. However, in the wide nozzle, each of the insert openings is associated with a separate nozzle insert 708. FIG. 12C additionally illustrates the flow of treatment fluid through a wide nozzle 1200 without an insert assembly similarly to treatment fluid through the nozzle in FIG. 6C.

The top casing 1202 and the bottom casing 1204 of the wide nozzle 1200 are fluidically similar to the narrow and medium nozzles in many ways. For example, the wide nozzle includes a fluid inlet 606, an inlet cavity 510, a divergence area 608, and a fill cavity 540 similar to the small and medium nozzles. The fluid inlet 606 is physically coupled to a valve assembly by applying pressure between the nozzle and the manifold to form a fluid tight seal. The fluid inlet 606, the fill cavity 540, and the insert openings 612 are fluidically coupled such that treatment fluid can move within the nozzle housing.

Figure 12D:
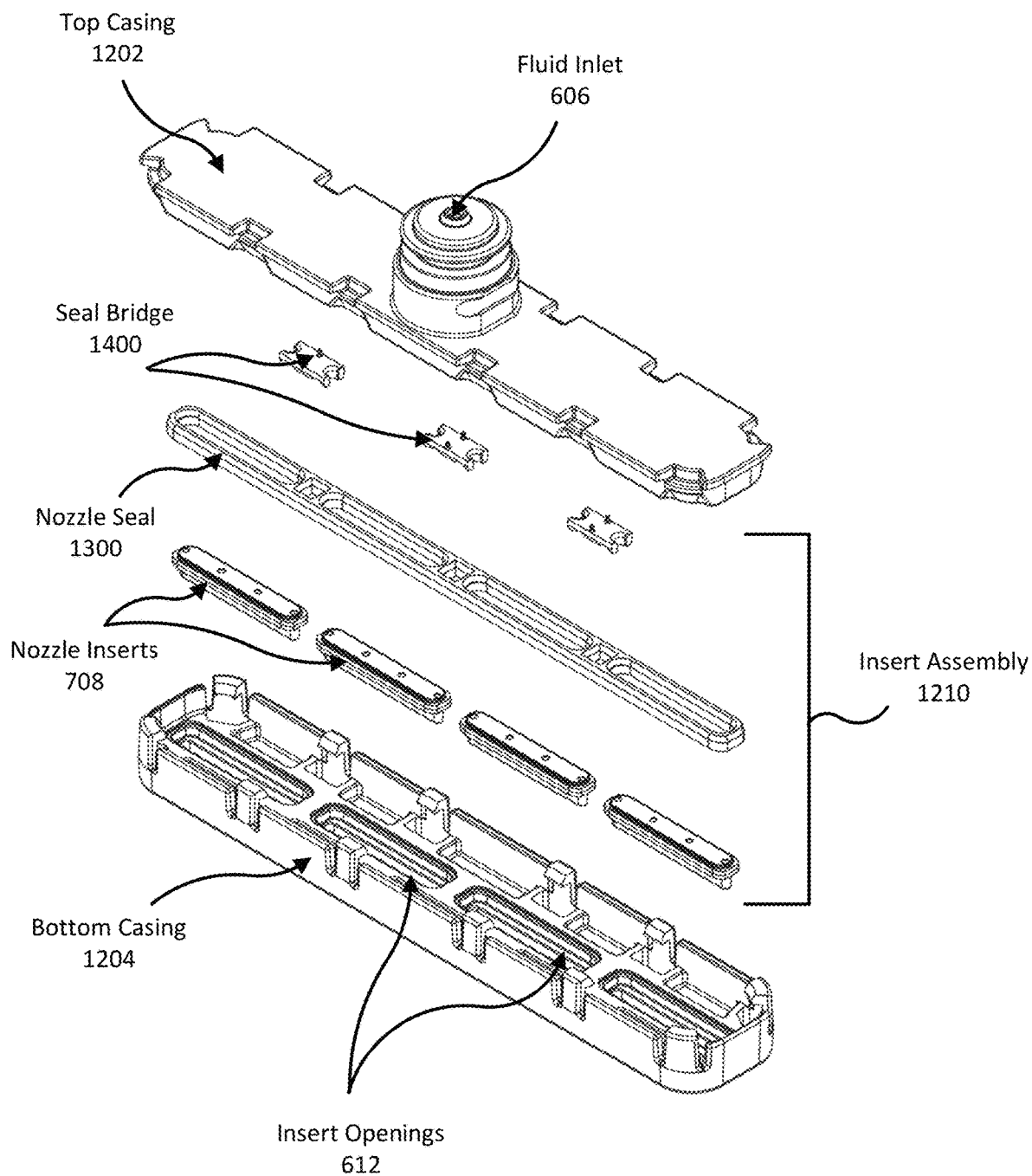
FIG. 12D illustrates an isometric view of a separated top casing and bottom casing and an insert assembly of a wide nozzle, in one example embodiment.
Figure 12E:
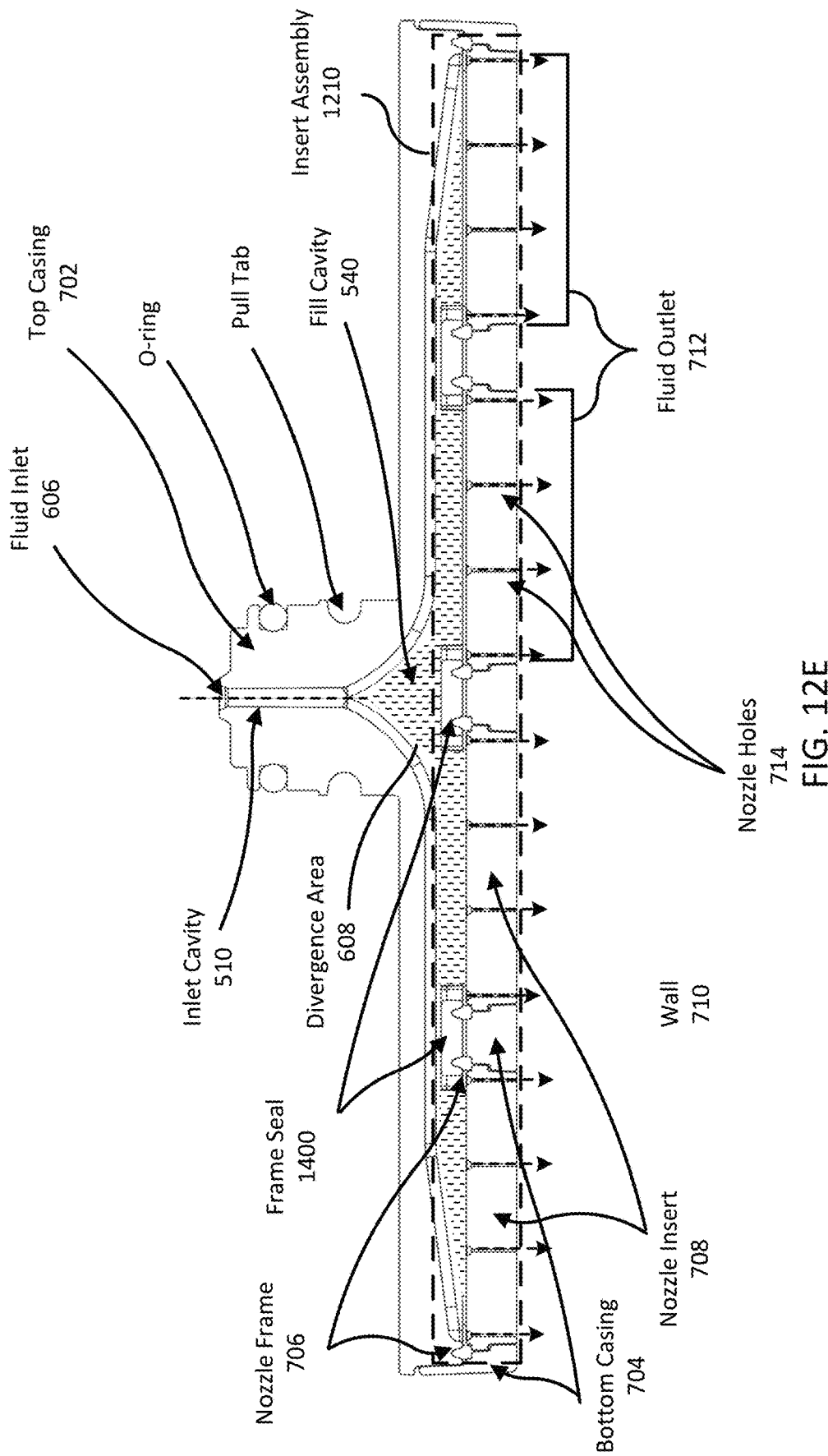
FIG. 12E illustrates a cross-sectional view of a wide nozzle with an insert assembly, in one example embodiment.

The wide nozzle 1200 includes multiple nozzle inserts 708 and, therefore, the insert assembly 1210 for coupling the nozzle inserts 708 to the bottom casing is dissimilar the insert assembly of the medium nozzle 1100 and narrow nozzle 700. FIG. 12D illustrates an isometric view of a wide nozzle 1200 including an insert assembly 1210 with multiple nozzle inserts 708 and FIG. 12E illustrates a cross-sectional view with the insert assembly 1210 included. FIG. 12E also illustrates the flow of treatment fluid through the wide nozzle similarly to treatment fluid through the nozzle 700 in FIG. 7B.

The insert assembly 1210 includes seal bridges 1400 to aid in coupling the nozzle seal 1300 to the top casing 1202 such that a fluid tight seal between the nozzle seal 1300, nozzle inserts 708, and insert openings 612 can be created. The seal bridges 1400 are further described in reference to FIG. 14. In the illustrated embodiment, there are three seal bridges 1400 located between each of the four nozzle insert and each of the nozzle inserts include four nozzle orifices. However, in various other embodiments the insert assembly 1210 can include any number of seal bridges 1400 and nozzle inserts 708 and can be in any ratio.

In this example of a wide nozzle 1200, treatment fluid passes into the fluid inlet 606 through the inlet cavity 510 and into the divergence area 608. The fluid spreads in the fill cavity 540 and passes through the nozzle seal 1300 and nozzle orifices 704 of the nozzle inserts 708 and out of nozzle housing via the insert opening 612. The seal bridges 1400 of the insert assembly 1210 of the wide nozzle help facilitate nozzle orifices 714 and nozzle inserts 708 at the ends of the nozzle functioning similarly to nozzle inserts 708 and nozzle orifices 714 at the center of the nozzle.

FIGS. 13A-15F illustrate how the insert assembly 1210 couples to the top and bottom casings 1202 and 1204 and how the constituent components of the insert assembly 1210 couple to one another.

Figure 13A:
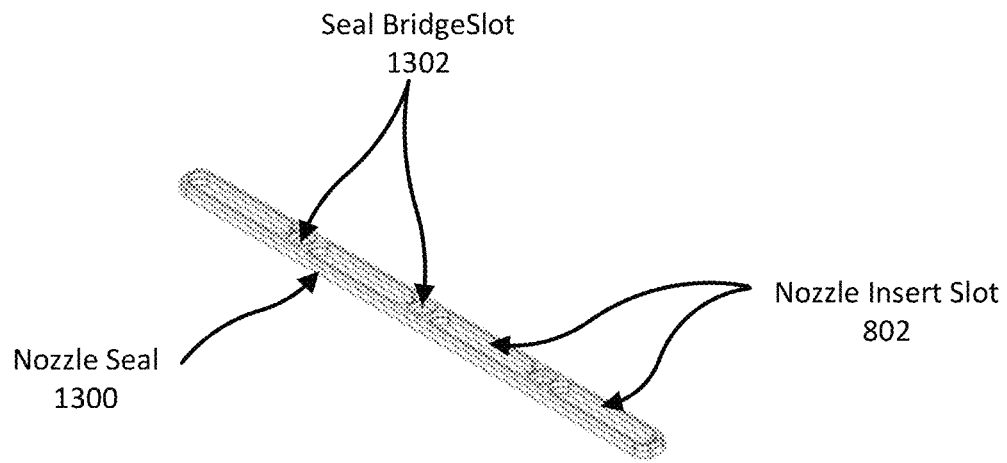
FIG. 13A illustrates an isometric view of a nozzle seal for a wide nozzle, in one example embodiment.
Figure 13B:
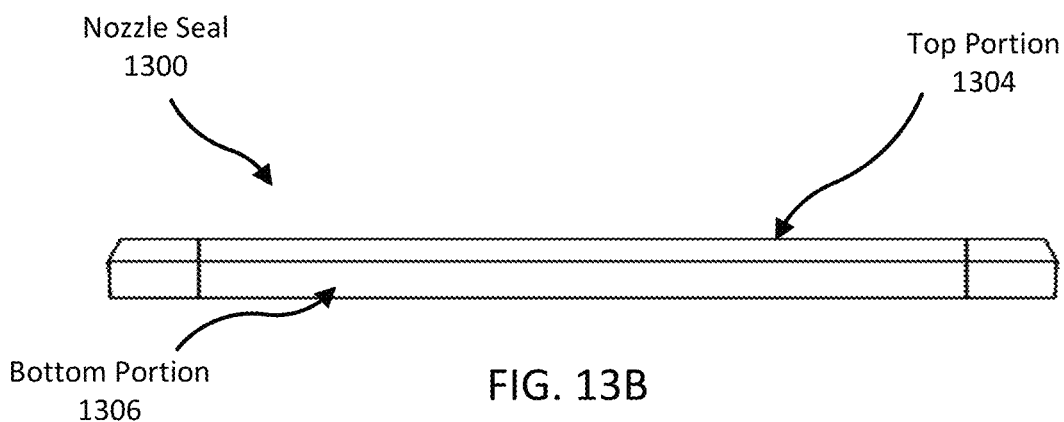
FIG. 13B illustrates a side view of a nozzle seal for a wide nozzle, in one example embodiment.

FIGS. 13A and 13B, respectively, show an isometric and a side view of the nozzle seal 1300. The nozzle seal 1300 is largely similar to the description of the nozzle seal of the narrow nozzle 700. However, the nozzle seal 1300 includes multiple nozzle insert slots 802 and seal bridge slots 1302. The nozzle insert slots 802 hold each of the multiple nozzle inserts (not shown) in position with the multiple insert openings 712. In this example, the number of nozzle insert slots 802 is equivalent to both the number of insert openings 712 and the number of nozzle inserts 708. Each of the nozzle insert slots 802 is similar to the nozzle insert slots described in reference to FIG. 8A-8C. The seal bridge slot helps maintain a constant cross-sectional area of the nozzle. When fabricating the nozzle, the seal bridge slot helps the plastic overmold injection process to yield acceptable parts. Plastic may not flow correctly during manufacture without them.

Seal bridge slots 1302 are structured such that the nozzle seal (described below) can be coupled to a seal bridge 1400 and, subsequently, to the top casing 602. Additionally, the seal bridge slots 1302 are positioned between every two nozzle insert slots 802. A seal bridge slot 1302 is structured as a square through hole extending from the top portion 1304 to the bottom portion 1306 of the nozzle seal 1300. At the bottom and top openings, the axes of the seal bridge slots 1302 are equal in length contributing to the seal bridge slots resembling a square.

Figure 13C:
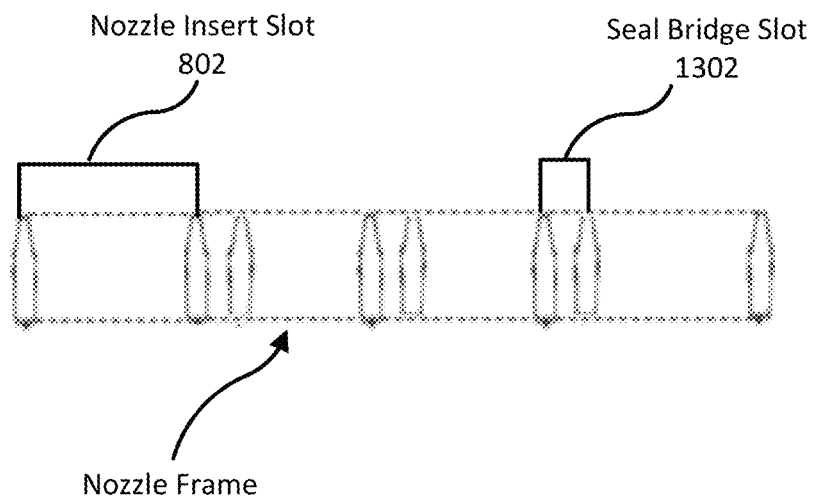
FIG. 13C illustrates a cross-sectional view of a nozzle seal for a wide nozzle, in one example embodiment.

FIG. 13C illustrates a cross-sectional view of the nozzle seal 1300 that is largely similar to the cross-sectional view of the nozzle seal 706 of the narrow nozzle 700 in FIG. 8C. As described above, the top face of a seal bridge slots 1302 is structured approximately as a square. The bottom face of the seal bridge slot is structured approximately as a square that is smaller than the square on the top face. Accordingly, at least some portion of the through hole connecting the squares on opposing faces of the nozzle seal is slightly tapered.

Figure 14A:
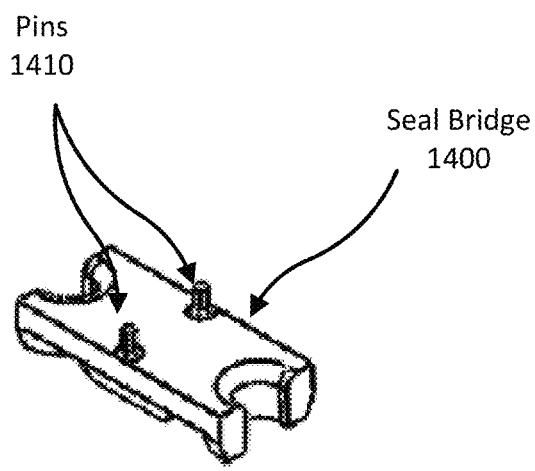
FIG. 14A illustrates an isometric view of a nozzle seal for a wide nozzle, in one example embodiment.
Figure 14B:
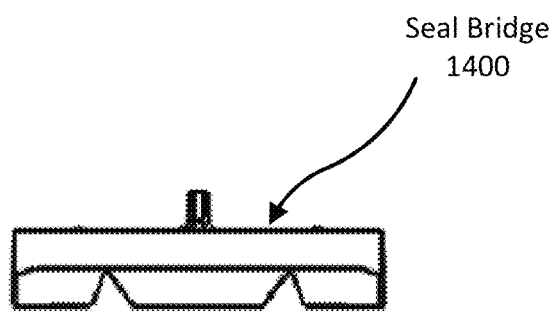
FIG. 14B illustrates a side view of a nozzle seal for a wide nozzle, in one example embodiment.

FIGS. 14A and 14B, respectively, show an isometric and a side view of a seal bridge 1400. A nozzle seal couples the nozzle seal 1300 to the top casing 1300. Structurally, two edges of the seal bridge 1400 are parallel to the short axis and two edges are parallel to the long axis. The edges parallel to the short axis include indents shaped as a semi-circle and positioned such that the seal bridges 1400 do not obstruct any portion of the nozzle insert slots 802 when the seal bridge 1400 is coupled to the nozzle seal 1300. The top face of the seal bridge 1400 includes two extruding pins 1410. In this example, the two pins are positioned opposite one another on the edges parallel to the long axis of the seal bridge 1400. The pins 1410 are for alignment coupling the seal bridge 1400 to the top casing 1202.

The bottom face of the seal bridge 1400, not shown, includes an extrusion substantially similar in shape, length, width, and depth to the seal bridge slots 1302 of the nozzle seal 1300. The extension is for coupling the seal bridge 1400 to the seal bridge slot 1302 of the nozzle seal 1300. Functionally, the seal bridges 1400 support the nozzle seal 1300 about the fill cavity 540. Absent the nozzle seals holding it in position, the nozzle seal 1300 may deform and move within the fill cavity affecting the flow of treatment fluid from the fluid inlet to the insert opening 612.

Figure 15A:
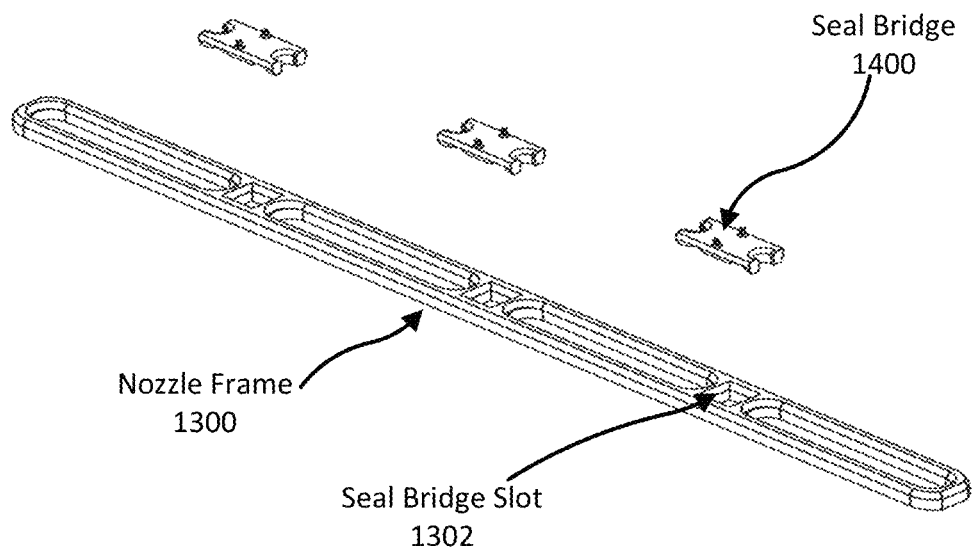
FIG. 15A illustrates an isometric view of a decoupled nozzle seal and nozzle seal for a wide nozzle, in one example embodiment.
Figure 15B:
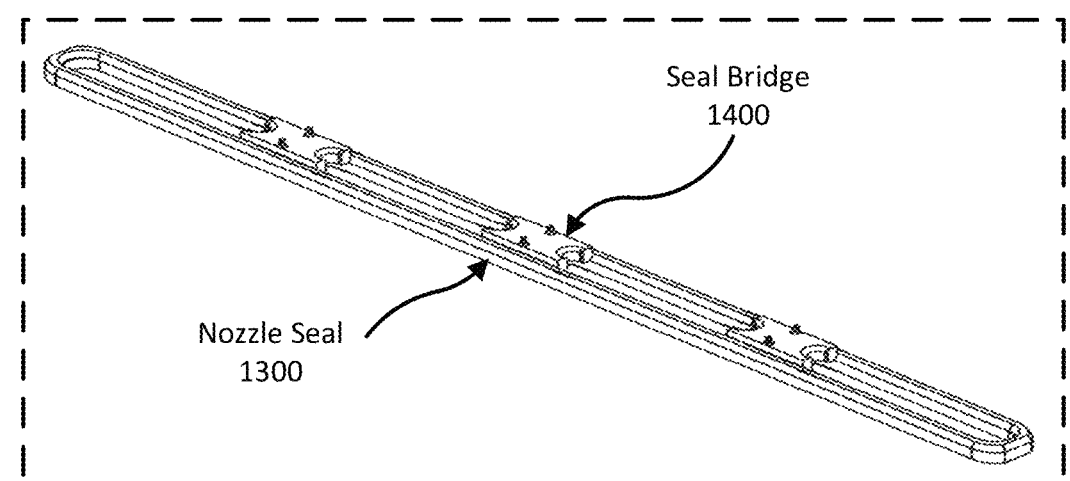
FIG. 15B illustrates an isometric view of a coupled nozzle seal and nozzle seal for a wide nozzle, in one example embodiment.

FIG. 15A illustrates an isometric view of the uncoupled seal bridges 1400 and the nozzle seal 1300 of a wide nozzle 1200. FIG. 15B illustrates an isometric view of the seal bridges 1400 coupled to the nozzle seal 1300. Each seal bridge 1400 is coupled to the nozzle seal 1300 at a seal bridge slot 1302. In one example, the seal bridges 1400 are coupled to the nozzle seal by applying a pressure at the top side of the seal bridge 1400 and the bottom side of the nozzle seal 1300. The coupling creates a liquid tight seal at the interface between the seal bridge 1400 and the nozzle seal 1300. Specifically, the edges of the extruded square on the bottom side of the seal bridge 1400 come into contact with the interior edges of the seal bridge slots 1302. When coupled, the nozzle seal 1300 and the seal bridge 1400 form a partial insert assembly 1510.

Figure 15C:
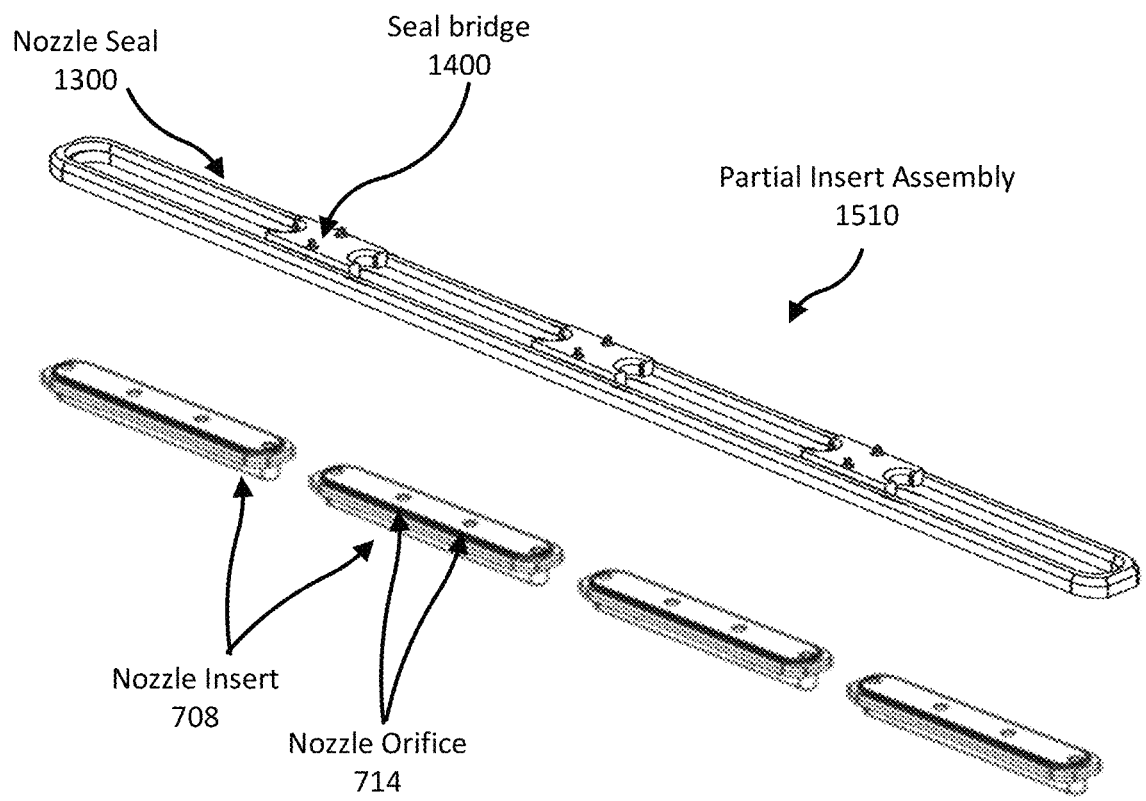
FIG. 15C illustrates an isometric view of a separated partial insert assembly and multiple nozzle inserts for a wide nozzle, in one example embodiment.
Figure 15D:
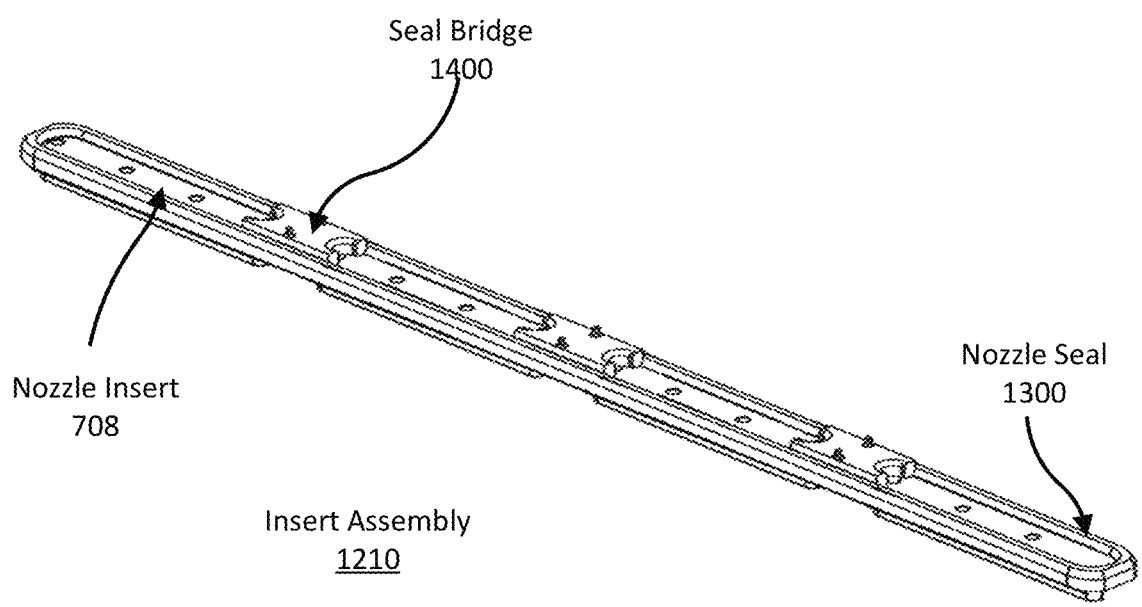
FIG. 15D illustrates an isometric view of a coupled partial insert assembly and multiple nozzle inserts for a wide nozzle, in one example embodiment.

FIG. 15C illustrates an isometric view of the uncoupled partial insert assembly 1510 and nozzle inserts 708. FIG. 15D illustrates an isometric view of the partial insert assembly 1510 coupled to the nozzle inserts 708 to form the insert assembly 1210. In this example, the number of nozzle inserts 708 is equivalent to the number of nozzle insert slots 802 within the nozzle seal 1300. As described in reference to FIG. 9A-10C, each nozzle insert 708 couples to a nozzle seal 1300 at each of the nozzle insert slots 802. A liquid tight seal forms at the interface between the nozzle inserts 708 and the nozzle insert slots 802. When coupled, the nozzle orifices 714 of the nozzle insert 708 are unobstructed by the partial insert assembly 1210. The nozzle inserts 708 used in the wide nozzle 1300 are similar to those in narrow nozzle 700 and medium nozzle 1100. When coupled, the nozzle insert 708 and the partial insert assembly 1510 form the complete insert assembly 1210.

In one embodiment, the seal bridge 1400 and the nozzle seal 1300 of the insert assembly 1210 are permanently coupled to the top casing 1202. In this case, only the nozzle insert 708 interchangeable in the nozzle 1200. In other examples, any of the other components of the wide nozzle 1200 may be permanently coupled and not interchangeable.

Figure 15E:
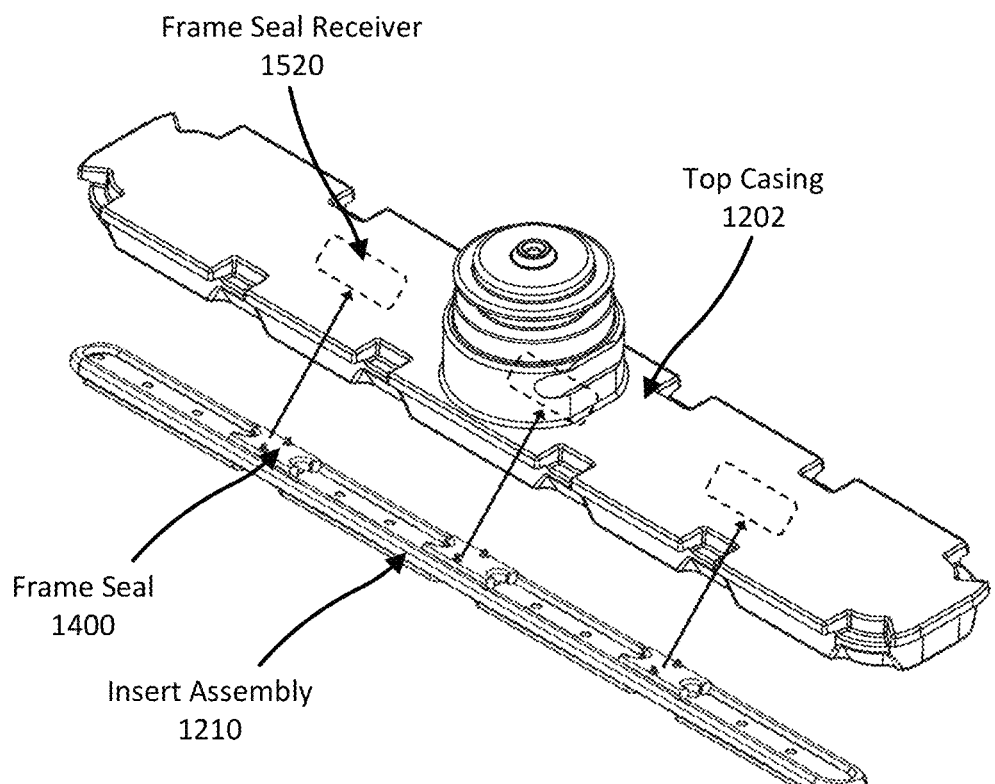
FIG. 15E illustrates an isometric view of a decoupled top casing and insert assembly for a wide nozzle, in one example embodiment.

To direct the treatment fluid to from the fluid inlet towards the nozzle orifices, the insert assembly 1500 couples to the top casing 1202. FIG. 15E illustrates an isometric view of the uncoupled insert assembly 1210 and top casing 1202. The bottom side of the top casing 1202 includes nozzle seal receivers 1520 (illustrated as a dashed line). The nozzle seal receivers 1520 are structured such that the top face of the seal bridge 1400 fit within the nozzle seal receivers 1520.

The seal bridge 1400 couples to the top casing 1202 by when a pressure is applied to the bottom portion of the insert assembly and/or the top side of the top casing 1202 such that the seal bridges 1400 insert into the nozzle seal receivers 1520. The receivers, shaped identically to the outline of a seal bridge 1400, also include holes in which the pins 1410 of the seal bridge 1400 insert into the bottom face of the top casing 1202. The number of nozzle seal receivers within the top casing 1202 is equivalent to the number of seal bridges 1400 coupled to the insert assembly 1500.

Figure 15F:
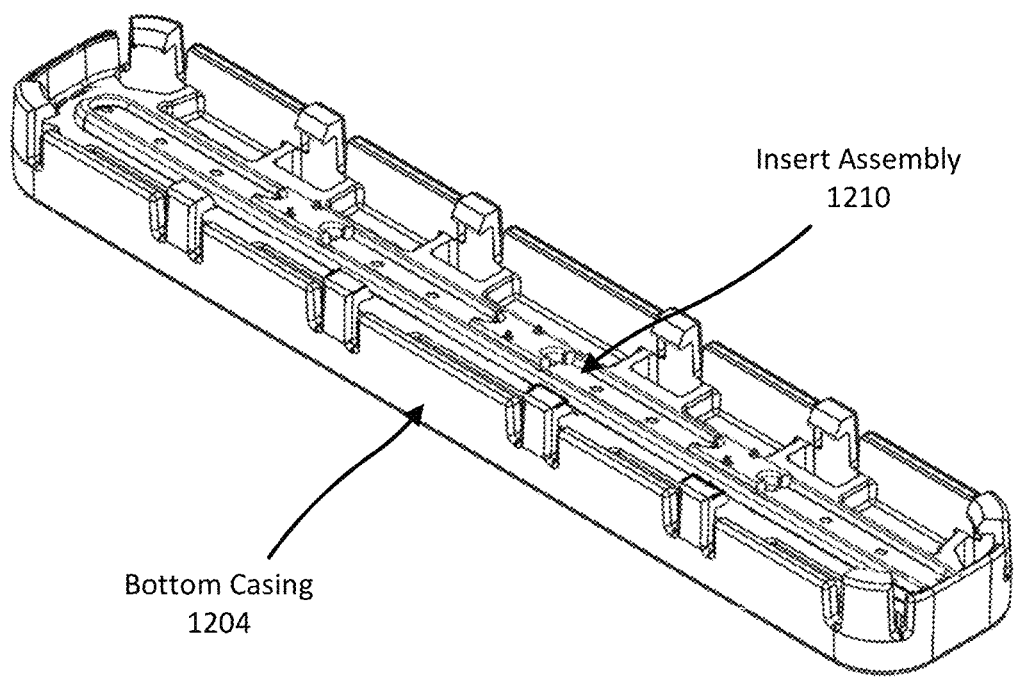
FIG. 15F illustrates an isometric view of a coupled bottom casing and insert assembly for a wide nozzle, in one example embodiment.

FIG. 15F illustrates the coupling between the insert assembly 1210 and the bottom casing 1204. The insert assembly 1500 couples to the bottom casing 1204 similarly to the insert assembly 1000 and nozzle inserts 708 described in reference to FIG. 10C-10D.

Figure 16A:
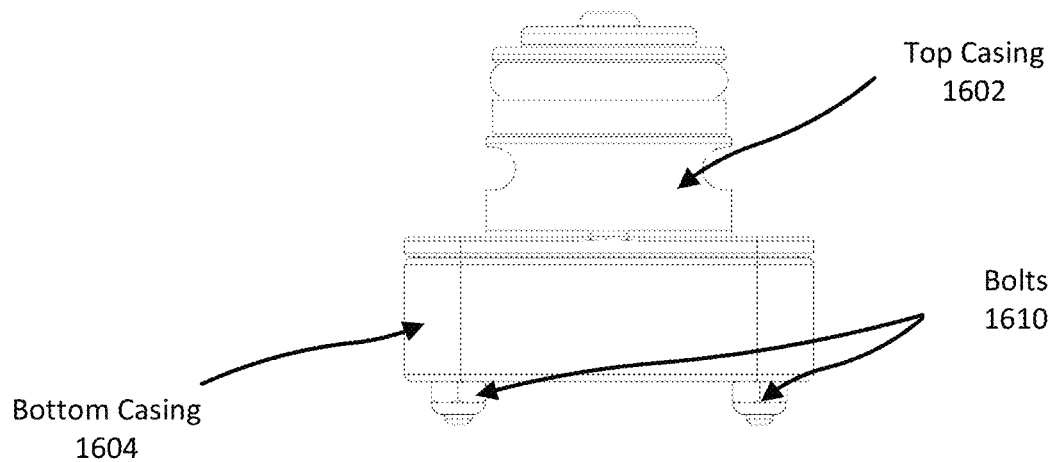
FIG. 16A illustrates a side view of a bolted nozzle, in one example embodiment.
Figure 16B:
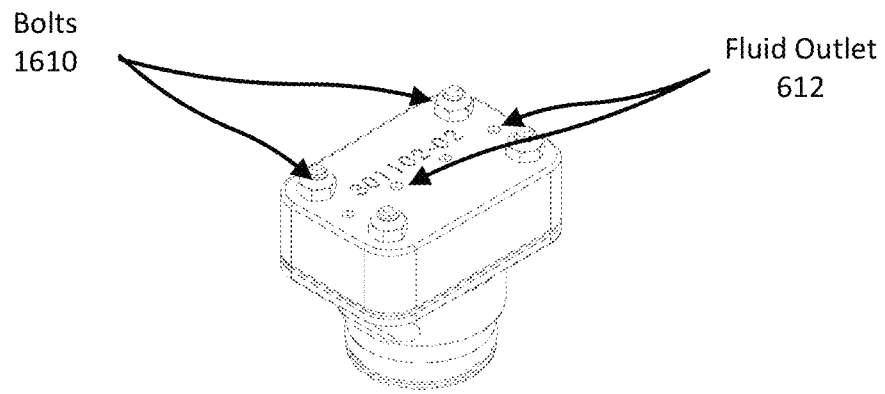
FIG. 16B illustrates an isometric view of a bolted nozzle, in one example embodiment.
Figure 16C:
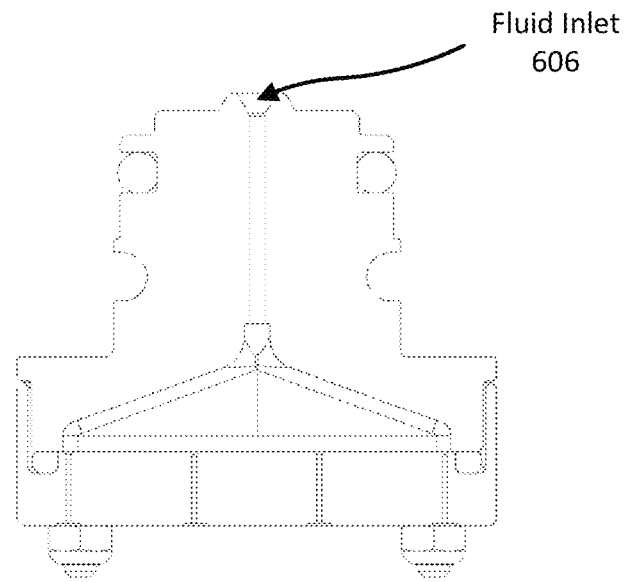
FIG. 16C illustrates a cross-sectional view of a bolted nozzle, in one example embodiment.

FIGS. 16A and 16B, respectively, show side and isometric views of a bolted nozzle 1600. FIG. 16C illustrates a cross-sectional view of the bolted nozzle 1600. In this example, the bolts 1610 function similarly to the latching system 608. That is, the bolts 1610 are used to couple the top casing 1602 to the bottom casing 1604 such that an insert assembly can be housed within the nozzle. Any size nozzle can include bolts as a latching system.

Structurally, the top casing and the bottom casing resemble those of the nozzles described above with the exception of the bolted system implemented in place of the latching system. The bolts penetrate through the bottom face of the bottom casing to couple to the adjoining edges of the top casing. Depending on the length of the nozzle, a greater or fewer number of bolts may be used to couple the two casings. Orifices, to control spray pattern, are drilled directly into the bottom casing 1604. There may be several different configurations of the bottom casing as a function of desired spray pattern.

XI. System Control Architecture

Figure 17:
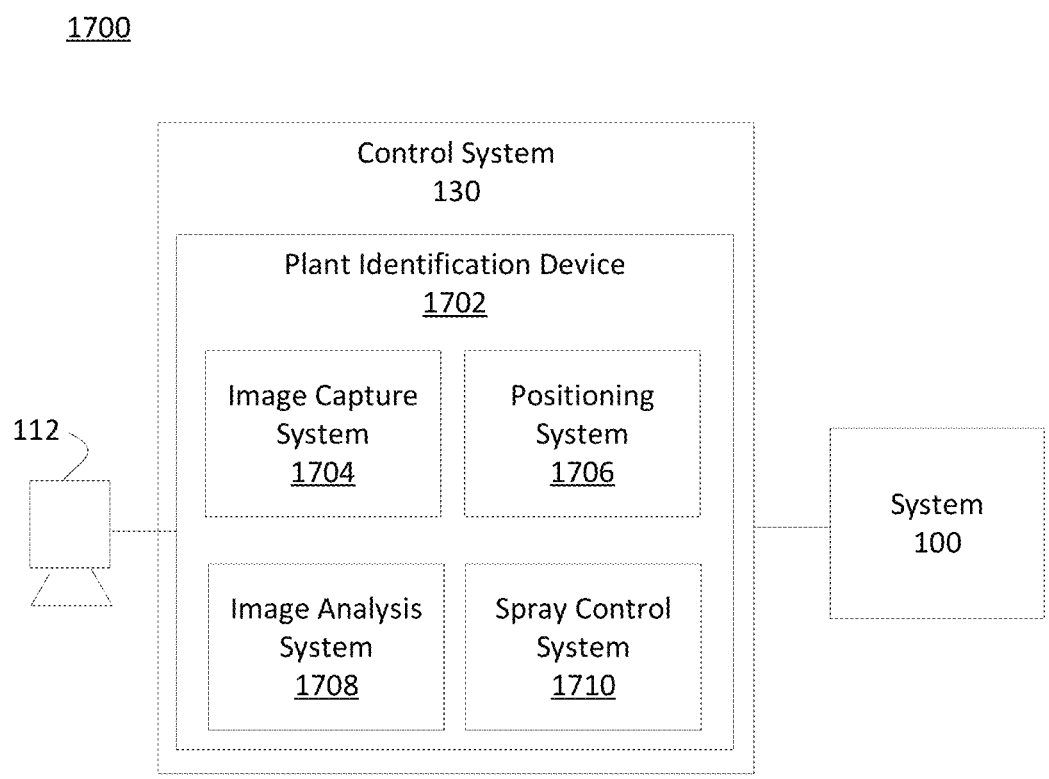
FIG. 17 is a diagram illustrating a control system including a plant identification device for identifying and spraying plants in the field, according to one example embodiment.

FIG. 17 is a block diagram of a combined system 1700 for capturing images that can be used to identify unique plant features to be sprayed as the system 100 moves through the field, according to one embodiment. In this example, plant identification device 1702 is either a part of, or is physically connected to the control system 130 of the system 100. One or more cameras 112 of the detection system 110 associated with the device 1702 capture images of crops being grown in the field.

Generally, the cameras 112 capture data in a digital format where image data is stored at the granularity of pixels or subpixels. The cameras 112 are affixed to the device 1702 so as to be relatively close to the crops themselves when images captured. In one example embodiment, the approximate distance between the cameras and plants is on the order of 1-100 inches, or up to 20 feet, a specific example of which is 34 inches. The cameras 112 may include appropriate lenses so that they are each able to capture light over a very wide angle. This allow a single image captured by a camera 112 to capture not only a plant directly in front of the camera 112, but also plants located adjacent to the center plant along the row the vehicle 120 is traveling, something that would not be possible with a lens with a narrower field of view given the short distance between the cameras 112 and the crops.

The image capture system 1704 includes logic for communicating with the camera/s 112 to initiate image capture, receive image data, perform any desired processing on it, and communicate it to the crop image analysis system 1708. The image capture system 1704 may be embodied as computer program software instructions running on computer hardware (e.g., processor, memory, etc.) present on device 1702, or it may be dedicated computing hardware (e.g., a field programmable gate array (FPGA)) designed to carry out these processes. This hardware may be shared in common with the positioning system 1706, or it may be dedicated and independent hardware included in device 1702 to carry out these tasks.

The positioning system 1706 includes logic for determining the real-world position of the device 1702. This may include global positioning, which may, for example, be provided by a global positioning system (GPS). Global positioning information includes position information at a first scale, and would inform which field, among many, device 1702 is located in, and a first order approximation of where the device 1702 is within the field, such as which row of crops.

The crop image analysis system 1708 receives position and image information from the device 1702, analyses it, and stores it for later use depending upon how the information is going to be used. The positions of unique plant features identified by the control system 130 can be used in a variety of different processes as mentioned above, some of which involve using the analyses provided by the control system 130 to carry out some action on device 1702, such as the activation of a sprayer via the spray control system 1710.

The spray control system 1710 determines the activation conditions of sprayers as the system 100 moves through field. Generally, the spray control system sends electrical control signals to the nozzles and valve assemblies to control when the nozzles release treatment fluid. The spray control system may also be configured to change the orientation and configuration of the manifold assemblies, the manifolds, the cassettes, the nozzles, the spray groups, nozzle subsets, and spray patterns to spray plant materials with treatment fluid based on the processes described above. Further, the spray control system may send electrical signals that control the parameters of the spray such as volume of spray, area of spray, duration of spray, pressure of spray, or any other characteristic of the spray.

Depending upon the implementation, the control system 130 may either be a part of the system 100, such as part of a computer physically mounted within the system 100, or it may be a separate computer system communicatively coupled to the system 100, for example via a CAN bus, a short range wireless network (e.g., Bluetooth), a long range wireless network (e.g., Wi-Fi), etc.

The control system 130 may be embodied as computer program software instructions running on computer hardware (e.g., processor, memory, etc.) 102 or it may be dedicated computing hardware itself (e.g., a field programmable gate array (FPGA). This hardware may be shared in common with systems 104 and 106, particularly if they are all co-located, or it may be implemented with its own dedicated and independent hardware.

XII. Additional Configurations

Most generally, the system 100 allows for spraying liquid onto a plant in a field using an array of N nozzle and valve assemblies (e.g., sixteen, however, the exact number may vary in practice) spaced a distance apart (e.g., one inch) that precisely target plant material over a crop's seed line in addition to the space between the adjacent seed lines. This array of nozzles can be grouped into any number sprayer groups and further subdivided into any number of sprayer subsets. The array of nozzles and valve assemblies can be coupled into cassettes and is generally called the manifold. The manifold is placed on an implement towed behind a farming machine such as a tractor. The manifold is oriented such that the line of N sprayers is orthogonal to the direction of travel and parallel to a seed line.

This system 100 can work where the seed lines can be variably spaced, for example anywhere from 8" rows to 42" rows. To allow the system to change between row widths, the manifold is shaped such that adjacent manifolds can nest for close spacing, or be expanded out for wider spaced seed lines.

The manifold assembly 200 (e.g., as showing in FIGS. 2A-2H) allows precision spraying of a plant of any size without affecting neighboring plants or soil. This allows the quantity of chemicals sprayed to be reduced by up to 99% of the quantity used in a traditional broadcast sprayer. The variety of chemicals that can be used in the manifold apparatus is much greater than traditional broadcast sprayers as the manifold can spray chemicals on a weed right next to a crop plant with minimal effect on the crop. This selective spraying allows for a reduction of weeds that build up herbicide resistance yielding a useful lifespan of future crop protectants that can be far longer than what exists today.

The resolution of the manifold can also be configured based on the nozzle types. Some nozzles can be selected to apply treatment to a wide area (e.g. 5" by 1" rectangle) while others may be selected to apply treatment to large circle (e.g. a 4" diameter circle). An example resolution for the smallest target can be as small as a 1 inch by 1 inch square, if not smaller. The nozzles can also include replaceable nozzle inserts that allow a single nozzle to have multiple spray patterns In some embodiments, there can be two different types of treatment fluid used by the system. The system can be configured such that some manifolds, nozzles, sprayer groups, or nozzle subsets spray one treatment fluid while other manifolds, nozzles, sprayer groups, or nozzle subsets spray another treatment fluid. The fluidic couplings of the system can be configured to accomplish this with components similar to those described herein for each type of treatment fluid.

In some embodiments, the treatment reservoir can be fluidically coupled to the cassettes and valve assemblies such there is a constant circulation of treatment fluid through the system during operation. The manifolds and manifold assemblies may include any number of treatment feed tubes and pumps coupled to any part of the system to accomplish this. Constant circulation of treatment fluid through the system minimizes the risk of valve assemblies and nozzles clogging and increases the particulate filtration through the system such that general operation is improved.

The components of the described embodiments of the manifolds, manifold assemblies, and nozzles have described in specific orientations and directions for ease of description and clarity. However, one skilled in the art will note that these orientations and directions can take other formations such that the functionality of the components is maintained.

In some embodiments, electrical control circuits may be coupled to more than one valve assembly to control multiple nozzles.

XIII. Additional Considerations

In the description above, for purposes of explanation, numerous specific details are set forth in order to provide a thorough understanding of the illustrated system and its operations. It will be apparent, however, to one skilled in the art that the system can be operated without these specific details. In other instances, structures and devices are shown in block diagram form in order to avoid obscuring the system.

Reference in the specification to "one embodiment" or "an embodiment" means that a particular feature, structure, or characteristic described in connection with the embodiment is included in at least one embodiment of the system. The appearances of the phrase "in one embodiment" in various places in the specification are not necessarily all referring to the same embodiment.

Some portions of the detailed descriptions, like the processes described in FIGS. 4-5, are presented in terms of algorithms and symbolic representations of operations on data bits within a computer memory. An algorithm is here, and generally, conceived to be steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The operations described herein can be performed by an apparatus. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, solid state memory devices, or any type of media suitable for storing electronic instructions.

The figures and the description above relate to various embodiments by way of illustration only. It should be noted that from the following discussion, alternative embodiments of the structures and methods disclosed herein will be readily recognized as viable alternatives that may be employed without departing from the principles of what is claimed.

One or more embodiments have been described above, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct physical or electrical contact with each other, but yet still co-operate or interact with each other. The embodiments are not limited in this context.

Also, some embodiments of the system, like the ones described in FIGS. 2-3, may be further divided into logical modules. One of ordinary skill in the art will recognize that a computer or another machine with instructions to implement the functionality of one or more logical modules is not a general purpose computer. Instead, the machine is adapted to implement the functionality of a particular module. Moreover, the machine embodiment of the system physically transforms the electrons representing various parts of content and data representing user interaction with the content into different content or data representing determined resonance.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B is true (or present).

In addition, use of the "a" or "an" are employed to describe elements and components of the embodiments herein. This is done merely for convenience and to give a general sense of the system. This description should be read to include one or at least one and the singular also includes the plural unless it is obvious that it is meant otherwise.

Upon reading this disclosure, those of skill in the art will appreciate still additional alternative structural and functional designs for a system and a process for detecting potential malware using behavioral scanning analysis through the disclosed principles herein. Thus, while particular embodiments and applications have been illustrated and described, it is to be understood that the disclosed embodiments are not limited to the precise construction and components disclosed herein. Various modifications, changes and variations, which will be apparent to those, skilled in the art, may be made in the arrangement, operation and details of the method and apparatus disclosed herein without departing from the spirit and scope defined in the appended claims.

What is claimed is:

1. A nozzle for dispensing a treatment fluid to one or more plants in a field, the nozzle comprising:
 a nozzle housing comprising:
  a top casing comprising a fluid inlet for treatment fluid to enter the nozzle housing, and
  a bottom casing comprising one or more fluid outlets for treatment fluid to exit the nozzle housing, the bottom casing removably coupled to the top casing; and
 an insert assembly positioned internal the nozzle housing, the insert assembly comprising:
  one or more nozzle inserts configured to removably couple to the insert assembly, each of the one or more nozzle inserts fluidically coupling the fluid inlet and the one or more fluid outlets such that fluid enters the nozzle through the fluid inlet and exits the nozzle through the one or more fluid outlets;
  a nozzle seal coupling the one or more nozzle inserts to the bottom casing; and
  one or more seal bridges removably coupling the nozzle seal to the top casing.

2. The nozzle of claim 1, wherein the nozzle seal comprises:
 one or more nozzle insert slots to couple the one or more nozzle inserts to the fluid outlets of the bottom casing when the bottom casing is coupled to the top casing.

3. The nozzle of claim 1, wherein the nozzle seal is structured to couple the one or more nozzle inserts to the one or more fluid outlets of the bottom casing, the coupling of the one or nozzle inserts in the one or more fluid outlets forming a liquid tight seal such that treatment fluid exits the nozzle through the one or more nozzle inserts.

4. The nozzle of claim 3, wherein the liquid tight seal is formed by a pressure exerted from the top casing onto the nozzle seal when the top casing is coupled to the bottom casing, the pressure causing the nozzle insert to couple to the fluid outlet such that a liquid tight seal is created at an interface between the one or more nozzle inserts and the fluid outlet and treatment fluid exits the fluid outlet through the one or more nozzle inserts.

5. The nozzle of claim 1, wherein the nozzle seal comprises one or more of the following:
 a plastic material; or
 a ceramic material.

6. The nozzle of claim 1, wherein the nozzle seal comprises:
 one or more seal bridge slots structured to couple the nozzle seal to the one or more seal bridges when a seal bridge of the one or more seal bridges is inserted into a seal bridge slot of the one or more seal bridge slots.

7. The nozzle of claim 1, wherein the top casing comprises one or more pin receivers and each of the one or more seal bridges comprise:
 one or more pins structured to couple to the pin receivers of the top casing such that each of the one or more seal bridges couple the insert assembly to the top casing when the pins of each of the one or more seal bridges are inserted into the pin receivers of the top casing.

8. The nozzle of claim 1, wherein the one or more seal bridges are structured to couple the nozzle seal to the top casing, the coupling of the nozzle seal to the top casing securing a position of the nozzle seal within the nozzle housing such that the nozzle seal couples to the one or more nozzle inserts to form a liquid tight seal.

9. The nozzle of claim 8, wherein the position of the nozzle seal is secured within the nozzle housing by a pressure exerted by each seal bridge, the pressure causing the seal bridge to couple to the seal bridge slots such that additional liquid tight seals are created at each of the seal bridge slots.

10. The nozzle of claim 1, wherein the one or more nozzle inserts comprise:
one or more nozzle orifices, the nozzle orifices aligned with the fluid outlets of the bottom casing when the one or more nozzle inserts couple with the bottom casing.

11. The nozzle of claim 10, wherein the nozzle orifices fluidically couple the fluid inlet to the fluid outlet such fluid entering the nozzle through the fluid inlet exits the nozzle from the fluid outlets.

12. The nozzle of claim 10, wherein the nozzle orifices comprise one or more sizes, the one or more sizes controlling a set of characteristics of the treatment fluid.

13. The nozzle of claim 1, wherein the one or more nozzle inserts affect a set of characteristics of the treatment fluid exiting the nozzle through the fluid outlets, the set of characteristics comprising:
a spray pattern of treatment fluid exiting the nozzle;
a droplet size of treatment fluid exiting the nozzle;
a flow rate of treatment fluid exiting the nozzle; and
an orientation of treatment fluid exiting the nozzle.

14. The nozzle of claim 1, wherein the one or more nozzle inserts comprise one or more of the following:
a plastic material; or
a ceramic material.

15. The nozzle of claim 1, wherein the insert assembly comprises the one or more nozzle inserts, each nozzle insert having a width between 0.5 inches to 2.5 inches, the width describing a length over a longest axis of the one or more nozzle inserts.

16. The nozzle of claim 1, wherein the insert assembly comprises the one or more nozzle inserts having a position between the top casing and the bottom casing, the position of the one or more nozzle inserts aligned with the fluid outlets to form a liquid tight seal such that treatment fluid flows through the nozzle orifices of the nozzle inserts and exits the fluid outlets of the bottom casing.

17. The nozzle of claim 1, wherein the top casing is structured to couple to the bottom casing, the top casing and the bottom casing forming a liquid tight seal around one or more edges of the nozzle housing when coupled such that treatment fluid enters from the fluid inlet and flows through the fluid outlet.

18. The nozzle of claim 1, wherein the top casing is removably coupled to the bottom casing by one or more of the following:
a latch system;
a lock mechanism;
a physical alignment of the top casing with the bottom casing;
a semi-removable seal compliant material;
one or more screws;
one or more pins;
one or more clamps; or
one or more fasteners.

19. The nozzle of claim 1, wherein the bottom casing is removably coupled to the top casing by a latch system, the latch system comprising one or more ridges along an edge of the top casing and one or more clasps along an edge of the bottom housing assembly, the one or more clasps coupled to the one or more ridges when latched.

20. The nozzle of claim 1, wherein the top casing is coupled to the bottom casing by one or more of the following:
a plastic injection molding routine; or
a seal compliant material bound to the housing.

21. The nozzle of claim 1, wherein the fluid inlet of the nozzle is coupled to a valve assembly to control a volume of treatment fluid entering the fluid inlet.

22. The nozzle of claim 1, wherein the nozzle is mounted to a system comprising a plurality of coaxial wheels, the coaxial wheels configured to navigate the system through the field.

23. The nozzle of claim 1, wherein the nozzle comprises one or more types of nozzle inserts, the types of nozzle inserts configured to control a set of characteristics of the treatment fluid exiting the nozzle through the fluid outlets.

24. The nozzle of claim 1, wherein the insert assembly comprises a nozzle housing of having a width within a range of 0.5 inches to 6 inches, the width describing a length over the longest axis of the nozzle housing.

25. A nozzle for dispensing a treatment fluid to one or more plants in a field, the nozzle comprising:
a nozzle housing comprising:
a top casing comprising a fluid inlet for treatment fluid to enter the nozzle housing, and
a bottom casing comprising one or more fluid outlets for treatment fluid to exit the nozzle housing, the bottom casing removably coupled to the top casing; and
an insert assembly positioned internal the nozzle housing, the insert assembly comprising one or more nozzle inserts configured to removably couple to the insert assembly, each of the one or more nozzle inserts fluidically coupling the fluid inlet and the one or more fluid outlets such that fluid enters the nozzle through the fluid inlet and exits the nozzle through the one or more fluid outlets,
wherein the fluid inlet of the nozzle is coupled to a valve assembly to control the volume of treatment fluid entering the fluid inlet;
wherein the nozzle is coupled to a manifold assembly by the valve assembly, the manifold assembly positioned relative to each of the one or more plants in the field such that treatment fluid exits the nozzle housing and sprays the one or more plants; and wherein the one or more nozzle inserts are dynamically interchangeable and determine characteristics of the treatment fluid.

26. The nozzle of claim 25, wherein the nozzle is coupled to a fluid reservoir by the manifold assembly, the fluid reservoir configured to supply treatment fluid to the fluid inlet in response to controls from the valve assembly.

27. A treatment system for treating one or more plants in a field comprising:

a farming machine configured to treat the one or more plants in the field by spraying the one or more plants in a field with treatment fluid, the farming machine comprising:

a nozzle comprising:

a nozzle housing comprising:

a top casing comprising a fluid inlet for treatment fluid to enter the nozzle housing; and a bottom casing comprising one or more fluid outlets for treatment fluid to exit the nozzle housing, the bottom casing removably coupled to the top casing;

an insert assembly positioned internal the nozzle housing, the insert assembly comprising one or more nozzle inserts configured to removably couple to the insert assembly, each of the one or more nozzle inserts fluidically coupling the fluid inlet and the one or more fluid outlets such that fluid enters the nozzle through the fluid inlet and exits the nozzle through the one or more fluid outlets, and wherein each of the one or more nozzle inserts is configured to be dynamically interchangeable to determine characteristics of the treatment fluid sprayed by the farming machine;

a valve assembly coupled to the fluid inlet of the nozzle and configured to control a volume of treatment fluid entering the fluid inlet; and a manifold assembly coupled to the nozzle by the valve assembly, the manifold assembly positioned relative to each of the one or more plants in the field such that treatment fluid exits the nozzle housing and sprays the one or more plants as the farming machine treats the one or more plants.

* * * * *